US006400318B1

(12) United States Patent
Kasami et al.

(10) Patent No.: US 6,400,318 B1

(45) Date of Patent: Jun. 4, 2002

(54) ADAPTIVE ARRAY ANTENNA

(75) Inventors: Hideo Kasami; Shuichi Obayashi, both of Yokohama; Hiroki Shoki, Kawasaki, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/559,573

(22) Filed: Apr. 28, 2000

(30) Foreign Application Priority Data

Apr. 30, 1999 (JP) .......................................... 11-125323
Sep. 21, 1999 (JP) .......................................... 11-267741

(51) Int. Cl.[7] ................................................ G01S 3/16

(52) U.S. Cl. ....................................... 342/383; 342/372

(58) Field of Search ................................ 342/378, 380, 342/383, 372

(56) References Cited

U.S. PATENT DOCUMENTS 5,933,112 A * 8/1999 Hiramatsu et al. .......... 342/372
6,087,986 A * 7/2000 Shoki et al. ................ 342/383
6,172,970 B1 * 1/2001 Ling et al. .................. 370/347

* cited by examiner

*Primary Examiner*—Theodore M. Blum
(74) *Attorney, Agent, or Firm*—Oblon, Spivak, McClelland, Maier & Neustadt, P.C.

(57) ABSTRACT

In an adaptive array antenna, the phase-shifted amount of one of a plurality of phase shifters is changed to a value obtained by increasing a currently set phase-shifted amount by a predetermined angle, and then, to a value obtained by decreasing the currently set phase-shifted amount by a predetermined angle. The variation in strength of a received signal combined at this time is detected by a signal strength detector, and a partial differential coefficient of a performance function with respect to the phase-shifted amount is derived using only the detected variation in strength of the received signal. Thus, the phase control based on the partial differential coefficient of the performance function with respect to the phase-shifted amount is carried out with a simple circuit construction without the need of signals of each antenna element.

22 Claims, 40 Drawing Sheets

ADAPTIVE ARRAY ANTENNA

BACKGROUND OF THE INVENTION

The present invention relates generally to an adaptive array antenna. More specifically, the invention relates to a radio communication system, a radio base station for use in the radio communication system, and an adaptive array antenna for use in the radio base station.

At present, the development of technologies for inexpensively constructing channels directly to subscribers using a radio transmission called a wireless local loop (WLL) has been started. Among these technologies, the form of a system capable of housing a plurality of terminal stations with respect to one base station is called a point-to-multipoint (PTMP). FIG. 1 is an illustration of a WLL in this PTMP form.

Usually, in the PTMP, a base station uses an antenna having a relatively large half angle of 60 degrees to 120 degrees since it is required to communicate to a plurality of terminal stations in different directions viewed from the base station. On the other hand, the terminal stations generally use an antenna having a small half angle of about 10 degrees and a large gain. Therefore, in the PTMP, when a base station receives, the interference from other base stations than a desired terminal station causes serious problems. FIG. 2 shows the incoming status of interference waves when a sector antenna having a half angle of 120 degrees in used. In particular, during a call to a base station, a control channel becomes a random access system wherein the base station can not carry out scheduling. Therefore, there is every possibility that many interference waves are generated, so that there is some possibility that the control channel can not accept calls to make communication impossible.

Therefore, when a usual sector antenna is used, there is some possibility that a signal transmitted from a terminal having a sharp directional antenna arrives at a very far base station, so that it is required to insure the distance for the frequency repetition. Specifically, frequency is reused by setting one unit of about 4 cells to about 7 cells, dividing frequency channels in this unit and carrying out the frequency repetition every unit. FIG. 3 shows the incoming status of interference waves in the case of the four cell frequency repetition. However, in this case, there is a limit to the repeated use of frequency, and there is a limit to the frequency channels assigned to the system, so that there is a disadvantage in that the capacity of subscribers capable of being housed by the system as a whole is limited to a small capacity.

In order to avoid interference without the need of the frequency repetition or by decreasing the number of repetitions, it has been studied to use an adaptive array antenna for directing the null direction of the antenna to another interference station, with an interference canceller for removing signals from the interference station from the original received signals by the signal processing.

However, as the control channel of the PTMP system, interference signals are generated at random timing which can not be predicted, and the duration of the interference signals is very short, i.e., in the range of from several micro seconds to tens micro seconds. Therefore, in order to sequentially detect the interference waves from the terminal and the incoming direction thereof by the base station for the terminal to carry out a control using a digital signal processing for directing the null with respect to the direction of the terminal, there is a problem in that a very high signal processing speed is required.

In addition, as shown in FIG. 4, in the case of a digital beam forming (DBF) adaptive antenna which has been mainly studied in recent years, if the transmission rate increases to 1 Mband or more which has been studied in the PTMP system, there is a problem in that a very high digital signal processing must be carried out in order to carry out a real-time receiving.

On the other hand, also in the case of the PTMP system similar to mobile communication, in order to inhibit undesired interference waves from being generated, it is considered to control a transmitted power from a mobile station to substantially fix a received power at a base station. However, also in this case, there are some cases where the actual received power can not be constant due to the influence of fading and shadowing. Therefore, in order to substantially fix the signal level at the final stage of a receiver, a base station including an adaptive array antenna must have an automatic gain control (AGC) function. For example, as shown in FIG. 5, it is considered to provide the AGC function by inserting a variable gain amplifier 3801 at the output after combining the adaptive array antennas. However, for example, when signals from terminals other than a desired terminal are stopped in a cell to continuously change a phase-shifted amount by means of a phase shifter to scan the null point, it is predicted that the dynamic range of the signal level after combining is very large, whereas the strength of signals from each of antennas before combining substantially has the same level. In this case, as shown in FIG. 5, if the gain of the variable gain amplifier 3801 for AGC provided in the signal line after combining is raised in accordance with the decrease of the level of the received signal after combining, there is a problem in that a part of the flow of the signals before combining is saturated.

To the contrary, after the direction of the terminal can be substantially identified, or after the weighting coefficient substantially converges at the optimum weighting coefficient, when beams are combined so as to be directed to that direction, the signal strength after combining is stable so that the variation in strength is small. On the other hand, there are some cases where the level of signals from each of the antennas before combining is increased by the combining of signals from a plurality of terminal stations. In this case, since the AGC function is hardly operated, there is a problem in that a part of the flow of the signal before combining is saturated.

In addition, when an adaptive array antenna is used for transmission, if transmitted power control is carried out by only a variable gain amplifier 3901 before division to each of elements as shown in FIG. 6, or if transmitted power control is carried out by only a plurality of variable gain amplifiers 4001 provided in signal paths for each of the elements after division as shown in FIG. 7, there is a problem in that the effective radiation power (ERP) taking account of the directional gain of the adaptive array antenna exceeds a legal limit, or high frequency circuit elements for individual elements are saturated.

As described above, in the prior art, there is a problem in that it is required to provide a very high signal processing speed if an adaptive array antenna is used for reducing interference from terminal stations in the PTMP.

In addition, in the case of the digital beam forming (DBF) adaptive array antenna which has been mainly studied in recent years, if the transmission rate increases, there is a problem in that it is required to carry out a very rapid digital signal processing in order to carry out a real time receiving.

In addition, when the AGC function is provided by inserting a variable gain amplifier in the output after combining the adaptive array antenna, if the gain of the AGC amplifier is increased in accordance with the decreased level of the received signal after combining, there is a problem in that a part of the flow of the signal before combining is saturated.

Moreover, when an adaptive array antenna is used for the base station transmission, if the transmitted power is controlled by only the variable gain amplifier before the division to each of the elements or if the transmitted power is controlled by only the plurality of variable gain amplifiers provided in the signal paths to each of the elements after the division, there is a problem in that there are some cases where the effective radiation power taking account the directional gain of the adaptive array antenna exceeds a predetermined value, or the high frequency circuit elements for individual elements are saturated.

SUMMARY OF THE INVENTION

It is therefore an object of the present invention to eliminate the aforementioned problems and to provide an adaptive array antenna capable of carrying out a real number weight control based on the maximum diving method by deriving a differential coefficient of the performance function with respect to a real number weight using a plurality of individual element signal strengths, which are detected by individual element signal strength detecting means, and a combined signal strength which are detected by combined signal strength detecting means, the adaptive array antenna being capable of realizing a simper circuit construction than that in the prior art wherein the demodulated signal of each of antenna elements is used.

It is another aspect of the present invention to provide an adaptive array antenna comprising a plurality of antenna elements, a plurality of high-frequency circuits, each of which is connected to a corresponding one of the antenna elements, and a high-frequency combining circuit for combining the outputs of the plurality of high-frequency circuits, the adaptive array antenna being capable of controlling the output signal level after combining to be within a predetermined range and of preventing the high-frequency circuits for the respective individual elements from being saturated.

It is a further object of the present invention to an adaptive array antenna comprising a plurality of antenna elements, a plurality of high-frequency circuits, each of which is connected to a corresponding one of the antenna elements, and a high-frequency dividing circuit for dividing outputs to the plurality of high-frequency circuits, each of the high-frequency circuits having a weight control circuit for weighting amplitude or phase of each of the antenna elements, the adaptive array antenna capable of controlling so that an effective radiation power taking account of the directional gain of each of the antenna elements does not exceed a predetermined value, and of controlling so that the high-frequency circuits for the respective individual elements are not saturated.

In order to accomplish the aforementioned and other objects, according to a first aspect of the present invention, an adaptive array antenna comprises: a plurality of antenna elements; a plurality of weighting means for weighting received signals, which are received by said antenna elements, by weights which are set, respectively; combining means for combining the received signals weighted by said plurality of weighting means; signal strength detecting means for detecting the strength of the received signal combined by said combining means; and weight control means for calculating a weight on the basis of the strength of the received signal detected by said signal strength detecting means, and for setting the calculated weight in each of said plurality of weighting means, wherein said weight control means comprises: a changing part for changing the weight which is set in one of said plurality of weighting means; and a setting part for calculating a weight on the basis of the variation in strength of the received signal detected by said signal strength detecting means when said weight is changed by said changing part, and for setting the calculated weight in said one of said plurality of weighting means.

According to a second aspect of the present invention, an adaptive array antenna comprises: a plurality of element antennas; a plurality of high-frequency circuits, each of which is connected to a corresponding one of said element antennas; and a local signal phase-shifting circuit for varying the phase of a local signal, which is added to a frequency converting circuit in said high-frequency circuit, every one of said high-frequency circuits for each of said element antennas, wherein each of said plurality of high-frequency circuits has a coupler for branching a part of signals from each of said element antennas, and a quadrature demodulator for an individual element antenna, to which signals are inputted from said coupler.

According to a third aspect of the present invention, an adaptive array antenna comprises: a plurality of antenna elements; a plurality of high-frequency circuits, each of which is connected to a corresponding one of said antenna elements; a high-frequency combining circuit for combining the outputs of said plurality of high-frequency circuits; at least one first RSSI circuit for monitoring at least one signal level of RF or IF signals from a plurality of individual antenna elements; a second RSSI circuit for monitoring the signal level of the combined RF or IF signal from said high-frequency combining circuit; (N−1) first variable gain circuits for allowing the variation in relative levels of all of RF or IF signals of each of individual elements; a second variable gain circuit capable of varying the signal level of the RF or IF signal from high-frequency combining circuit; and a gain control circuit for controlling the output signal level after combining to be within a predetermined range on the basis of RSSI signals from said first RSSI circuit and second RSSI circuit, and for controlling said first variable gain circuit and said second variable gain circuit so as to prevent a high-frequency circuit element for each of said individual elements from being saturated. In the above sentence, the term RSSI is an abbreviation of a received signal strength indication, which is a numerical value of the strength of en electric wave signal during receiving.

DESCRIPTION OF THE PREFERRED EMBODIMENTS

Figure 8:
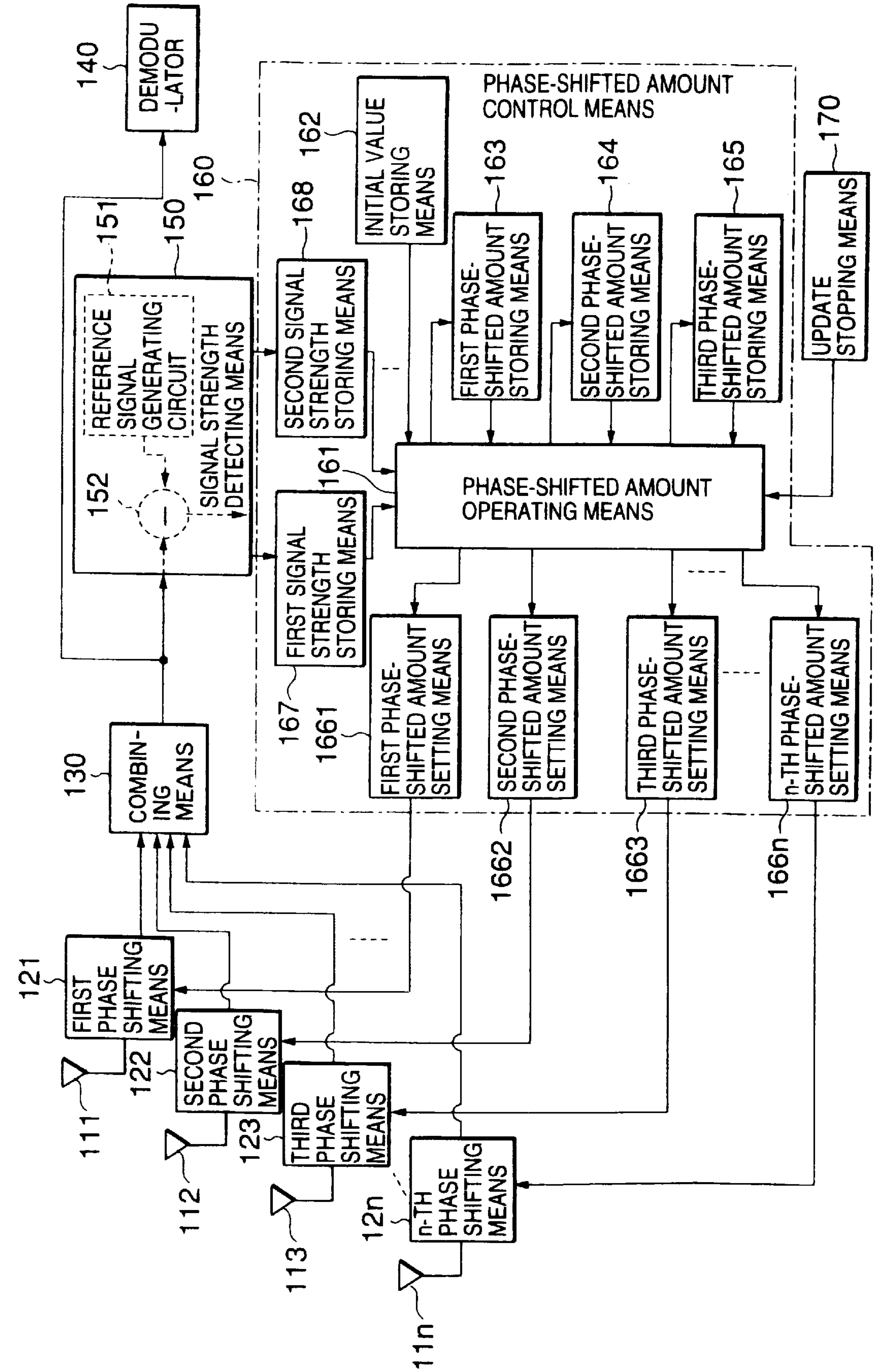
FIG. 8 is a block diagram of an adaptive array antenna as the basic concept of the present invention.

Referring now to the accompanying drawings, the preferred embodiments of an adaptive array antenna according to the present invention will be described in detail below. Before describing the preferred embodiments, referring to FIG. 8, the basic concept of the present invention will be described. FIG. 8 explains the basic principle of an adaptive array antenna as the superordinate concept for the first and second preferred embodiments.

In FIG. 8, an adaptive array antenna comprises: first through n-th antenna elements 111 through 11*n*; first through n-th phase shifting means 121 through 12*n* for phase-controlling received signals, which are received by the antenna elements 111 through 11*n*, in accordance with phase-shifted amounts, which are set, respectively; combining means 130 for combining the received signals which are phase-controlled by the phase shifting means 121 through 12*n*; signal strength detecting means 150 for detecting the strength of the received signal which is combined by the combining means 130; and phase-shifted amount control means 160 for calculating a phase-shifted amount on the basis of the strength of the received signal, which is detected by the signal strength detecting means 150, to set the calculated phase-shifted amount to each of the phase-shifting means 121 through 12*n*. The output of the combining means 130 is usually demodulated by a demodulator 140.

The phase-shifted amount control means 160 comprises: phase-shifted amount operating means 161 for operating and outputting phase-shifted amounts in the plurality of phase shifting means 121 through 12*n*, on the basis of various signal strengths outputted from the signal strength detecting means 150 and a plurality of phase-shifted amounts, by a plurality of cycles; initial value storing means 162 for storing the initial values of the plurality of phase shifting means 121 through 12*n*; first phase-shifted amount storing means 163 for storing first phase-shifted amounts which are operated, as those to be set in the plurality of phase shifting means 121 through 12*n*, by the phase-shifted amount operating means 161 on the basis of the respective initial values which are stored in the initial value storing means 162; second phase-shifted amount storing means 164 for storing second phase-shifted amounts in the plurality of phase shifting means 121 through 12*n*, which are operated by the operating means 161 so as to increase the first phase-shifted amount by a predetermined angle X, respectively; and third phase-shifted amount storing means 165 for storing third phase-shifted amounts in the plurality of phase shifting means 121 through 12*n*, which are operated by the operating means 161 so as to decrease the first phase-shifted amounts by the predetermined angle X, respectively.

The phase-shifted amount control means 160 further comprises: first through n-th phase-shifted amount setting means 1661 through 166*n* for setting the phase-shifted amounts of the plurality of phase shifting means, which are calculated by the phase-shifted amount operating means 161 on the basis of the phase-shifted amount which is stored in any one of the first through third phase-shifted amount storing means 163 through 165; first signal strength storing means 167 for storing a first signal strength which is detected by the signal strength detecting means 150 while the second phase-shifted amounts are set in the plurality of phase-shifted amount setting means 1661 through 166*n*; and second signal strength storing means 168 for storing a second signal strength which is detected by the signal strength detecting means 150 while the third phase-shifted amounts are set in the plurality of phase shifting means.

The phase-shifted amount operating means 161 operates a new phase-shifted amount by increasing the first phase-shifted amount by a value in proportion to a difference between the first signal strength and the second signal strength when the difference is inputted, and inputs the new phase-shifted amount to the first phase-shifted amount to repeat operations in a plurality of cycles until the difference is zero. In addition, the adaptive array antenna has update stopping means 170 for stopping the operation of the phase-shifted amount control means 160 on the basis of predetermined conditions.

The signal strength detecting means 150 may directly detect the signal strength of the received signal. Alternatively, the signal strength detecting means 150 may be provided with reference signal generating means 151 shown by a broken line in FIG. 8, and may detect the signal strength of an error signal which is outputted from a subtracter 152 for detecting an error from the reference signal. In this case, the first and second signal strength storing means 167 and 168 serve as error signal strength detecting means, respectively, although the details thereof will be described in the second preferred embodiment.

Although this basic principle arranges the most significant concept of the present invention as the superordinate concept for the first through tenth and fourteenth preferred embodiments of the present invention which will be described later, the first and second preferred embodiments of an adaptive array antenna according to the present invention are considered as intermediate concepts. These preferred embodiments will be described in detail below.

(First Preferred Embodiment)

Figure 9:
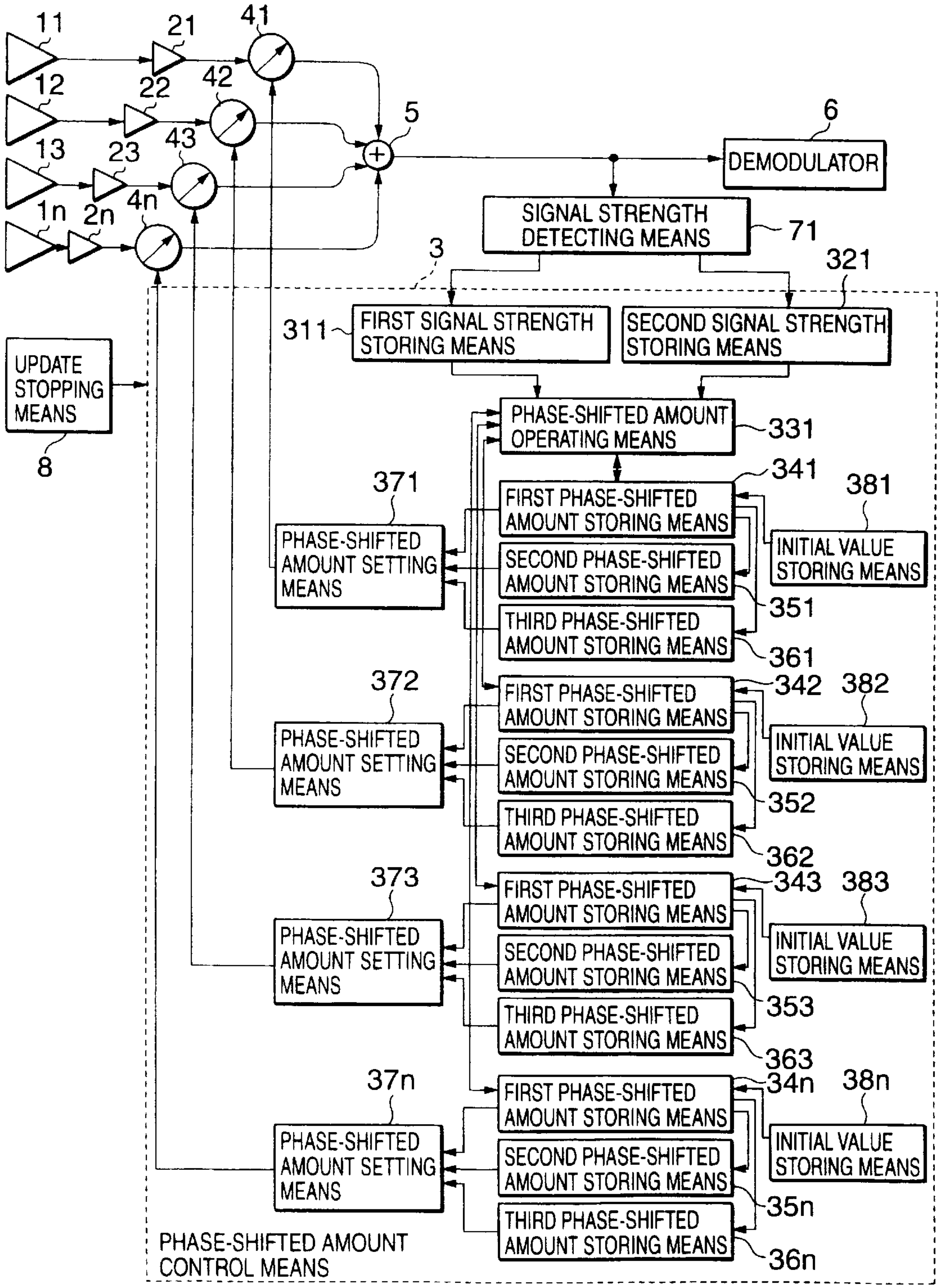
FIG. 9 is a block diagram of the first preferred embodiment of an adaptive array antenna according to the present invention.

FIG. 9 is a block diagram of the first preferred embodiment of an adaptive array antenna according to the present invention. In FIG. 9, reference numbers 11 through 1n denote antenna elements; 21 through 2*n* denote amplifiers for amplifying signals, which are received by the antenna elements 11 through 1*n*, respectively; reference number 41 through 4*n* denote variable phase shifters for phase-controlling the amplified received signals in accordance with phase-shifted amounts which are set by phase-shifted amount control means 3 which will be described later; reference number 5 denotes a combining for combining the phase-controlled received signals; reference number 6 denotes a demodulator for demodulating the combined received signal; reference number 71 denotes signal strength detecting means for detecting the strength of the received signal which is combined by the combining 5; reference number 3 denotes phase-shifted amount control means for calculating a newly set phase-shifted amounts on the basis of the detected strength of the received signal to set the calculated phase-shifted amount in each of the variable phase shifters 41 through 4*n*; and reference number 8 denotes update stopping means for stopping the operation of the phase-shifted amount control means 3 after the operation of the phase-shifted means 3 is repeated predetermined times.

Reference numbers 341 through 34*n* denote first phase-shifted amount storing means for storing phase-shifted amounts Φ1(k) through Φn(k) (n is the number of antenna elements, and k is the number of phase-shifted amount updating operations), which are set in the variable phase shifters 41 through 4*n*; reference numbers 351 through 35*n* denote second phase-shifted amount storing means for calculating and storing phase-shifted amounts Φ1'(k) through Φn'(k), which are calculated by increasing the stored phase-shifted amount Φ1(k) through Φn(k) by 90 degrees, respectively; reference number 361 through 36*n* denote third phase-shifted amount storing means for calculating and storing phase-shifted amounts Φ1"(k) through Φn"(k), which are calculated by decreasing the phase-shifted amounts Φ1(k) through Φn(k), which are stored in the first phase-shifted amount storing means 341 through 34*n*, by 90 degrees, respectively; reference numbers 371 through 37*n* denote phase-shifted amount setting means for setting a phase-shifted amount, which is stored in any one of the first phase-shifted amount storing means 341 through 34*n*, the second phase-shifted amount storing means 351 through 35*n* and the third phase-shifted amount storing means 361 through 36*n*; reference number 311 denotes first signal strength storing means for storing the strengths Pi' of the received signals which are detected by the signal strength detecting means 71 while Φ1(k), Φ2(k), . . . , Φi−1(k), Φi'(k), Φi+1(k), . . . , Φn(k) ($1 \leqq i \leqq n$) are set in the variable phase shifters 41 through 4*n*, respectively; reference number 321 denotes second signal strength storing means for storing the strengths Pi" of the received signals which are detected by the signal strength detecting means 71 while Φ1(k), Φ2(k), . . . , Φi−1(k), Φi"(k), Φi+1(k), . . . , Φn(k) are set in the variable phase shifters 41 through 4*n*, respectively; reference number 331 denotes phase-shifted amount operating means for operating a new phase-shifted amount Φi(k+1), which is operated by increasing the Φi(k) stored in the i-th phase-shifted amount storing means by a value in proportion to the difference between Pi' and Pi", to input the operated new phase-shifted amount to the i-th phase-shifted amount storing means; and reference numbers 381 through 38*n* denote initial value storing means for storing initial values Φ1(0) through Φ*n*(0), respectively, and for inputting the initial values Φ1(0) through Φ*n*(0) to Φ(k) through Φ*n*(k) of the first phase-shifted amount storing means 341 through 34*n*, respectively.

Figure 10:
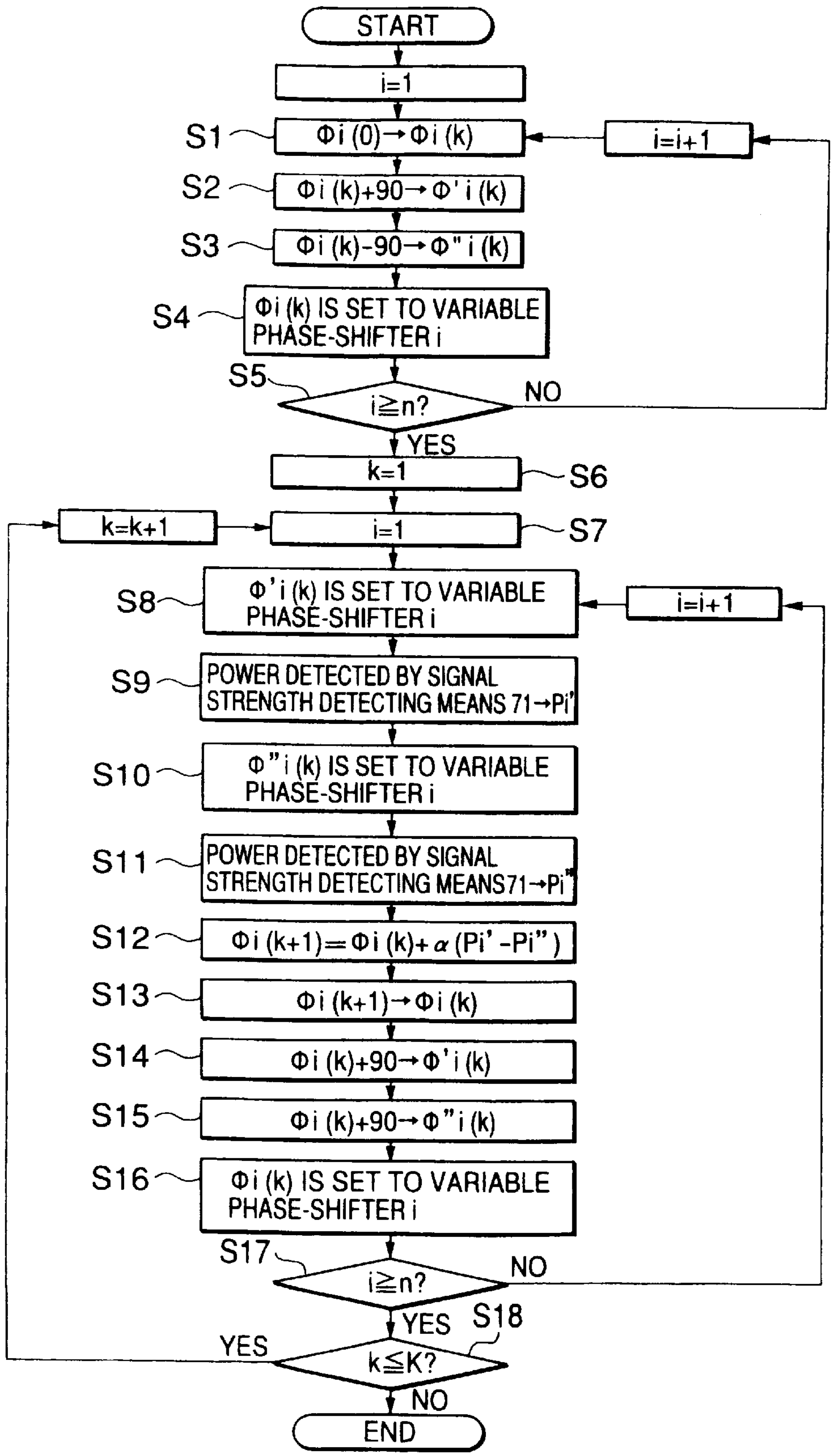
FIG. 10 is a flow chart showing the operation of the first preferred embodiment of an adaptive array antenna according to the present invention.

With this construction, the operation of the adaptive array antenna will be described below. FIG. 10 is a flow chart showing the operation of the adaptive array antenna.

First, a phase-shifted amount Φ1(0) stored in the initial value storing means 381 is inputted to the first phase-shifted amount storing means 341. On the basis of this, Φ1(0) is stored in Φ1(k) by the phase-shifted amount storing means 141 as follows (step S1).

$$\Phi_1(k)=\Phi_1(\mathbf{0})$$

Subsequently, the phase-shifted amount Φ1(k) stored in the first phase-shifted amount storing means 341 is inputted to the second phase-shifted amount storing means 351. On the basis of this, Φ1'(k) is derived by the second phase-shifted storing means 341 as follows (step S2).

$$\Phi_1'('k)=\Phi_1('k)-90$$

Subsequently, the phase-shifted amount Φ1(k) stored in the first phase-shifted amount storing means 341 is inputted to the third phase-shifted storing means 361. On the basis of this, Φ1"(k) is derived by the third phase-shifted amount storing means 361 as follows (step S3).

$$\Phi_1''(k)=\Phi_1(k)-90$$

The processing at steps S2 and S3 may be carried out in order of S3→S2. Subsequently, the phase-shifted amount Φ1(k) stored in the first phase-shifted amount storing means 341 is inputted to the phase-shifted amount setting means 371. This phase-shifted amount is set in the variable phase shifter 41 by the phase-shifted amount setting means 371 (step S4). Subsequently, phase-shifted amounts Φ2(0) through Φ*n*(0) stored in the initial value storing means 382 through 38*n* are similarly set in the variable phase shifters 43 through 4*n* by the phase-shifted amount setting means 372 through 37*n.*

The initial values a Φ1(0) through Φ*n*(0) of the phase-shifted amounts may be a phase-shifted amount for in-phase combining a desired wave. Then, it is determined at step S5 whether i is n or more. If i is not n or more, the processing at steps S1 through S4 is repeated, and if i is n or more, k=1 is set at step S6.

It is assumed that signals received by the antenna elements 11 through in at time t to be amplified by the amplifiers 21 through 2n are S1(t) through Sn(t). These signals are phase-controlled by the variable phase shifters 41 through 4*n*, and combined by the combining 5. Assuming that the phase-shifted amounts which are set in the variable phase shifters 41 through 4*n* are Φ1(k) through Φ*n*(k), the combined received signal Y(t) is expressed by formula (1).

$$y(t)=\sum_{l=1}^{n} e^{-j\Phi_l(k)}S_l(t) \tag{1}$$

The combined received signal y(t) is inputted to the signal strength detecting means 71. On the basis of this, the strength P of the received signal detected by the signal strength detecting means 71 is expressed by formula (2).

$$P=E[y(t)y*(t)]=\sum_{l=1}^{n}\sum_{m=1}^{n} e^{-j(\Phi_l(k)-\Phi_m(k))}E(S_l(t)S_m*(t)] \tag{2}$$

wherein E[·] means an expected value operation, and * means a complex conjugate. In fact, the expected value operation is replaced with a time mean operation. This can be derived by setting the time constant of the signal strength detecting means 71 to be a sufficiently large value.

This preferred embodiment is characterized in that the partial differential coefficient of the signal strength of the received signal, which is detected by the signal strength detecting means 71, with respect to the phase-shifted amount, which is set in each of the variable phase shifters 41 through 4*n*, can be derived using only the signal strength of the received signal detected by the signal strength detecting means 71. On the basis of this partial differential coefficient, the phase-shifted amount is controlled. The phase-shifted amounts which are set in the variable phase shifters 41 through 4*n* are calculated by the phase-shifted amount control means 3 one by one. A method for updating the phase-shifted amount of the variable phase shifter 41 will be described herein.

The phase-shifted amount Φ'1(t) stored in the second phase-shifted amount storing means 351 is inputted to the phase-shifted amount setting means 371. This phase-shifted amount is set in the variable phase shifter 41 by the phase-shifted amount setting means 371 (step S8). In this set state, the strength P1' of the received signal detected by the signal strength detecting means 71 is inputted to the first signal strength storing means 311 (step S9). Subsequently, the phase-shifted amount Φ"1(t) stored in the third phase-shifted amount storing means 361 is inputted to the phase-shifted amount setting means 371. This phase-shifted amount is set in the variable phase shifter 41 by the phase-shifted amount setting means 371 (step S10). In this set state, the strength P1" of the received signal detected by the signal strength detecting means 71 is inputted to the second signal strength storing means 321 (step S11). The processing at steps S8 through S11 may be carried out in order of S10→S11→S8→S9.

Subsequently, the strength P1' of the received signal stored in the first signal strength storing means 311, the strength P1 of the received signal stored in the second signal strength storing means 321, and the phase-shifted amount Φ1(k) stored in the first phase-shifted amount storing means 341 are inputted to the phase-shifted amount operating means 331. On the basis of these inputs, a new phase-shifted amount Φ1(k+1) is calculated by the phase-shifted amount calculating means 331 as follows (step S12).

$$\Phi_1(k+1)=\Phi_1(k)+\alpha(P_1'-P_1'')$$

wherein α is a real number.

Subsequently, the new phase-shifted amount Φ1(k+1) calculated by the phase-shifted amount operating means 331 is inputted to the first phase-shifted amount storing means

341. On the basis of this, Φ1(k+1) is stored in Φ1(k) by the first phase-shifted amount storing means 341 as follows (step S13).

$$\Phi_1(k)=\Phi_1(k+1)$$

Subsequently, the phase-shifted amount Φ1(k) stored in the first phase-shifted amount storing means 341 is inputted to the second phase-shifted amount storing means 351. On the basis of this, Φ1'(k) is derived by the second phase-shifted amount storing means 351 as follows (step S14).

$$\Phi_1'(k)=\Phi_1(k)+90$$

Subsequently, the phase-shifted amount Φ1(k) stored in the first phase-shifted amount storing means 341 is inputted to the third phase-shifted amount storing means 361. On the basis of this, Φ1"(k) is derived by the third phase-shifted amount storing means 361 as follows (step S15).

$$\Phi_1''(k)={}_1(k)-90$$

The processing at steps S14 and S15 may be carried out in order to S15→S14. Subsequently, the phase-shifted amount Φ1(k) stored in the first phase-shifted amount storing means 341 is inputted to the phase-shifted amount setting means 371. This phase-shifted amount is set in the variable phase shifter 341 by the phase-shifted amount setting means 371 (step S16).

Subsequently, the phase-shifted amounts of the variable phase shifters 42 through 4$n$ are updated in the same manner. After the above described operation of the update of the phase-shifted amounts of the variable phase shifters 41 through 4$n$ is repeated K times by the phase-shifted amount control means 3, the operation is stopped by the update stopping means 8 (steps S17 through S18). According to the present invention, since the phase-shifted amount greatly fluctuates during the operation of updating the phase-shifted amount, the strength of the received signal inputted to the demodulator 6 is great, so that it is difficult to carry out the demodulation processing. Therefore, after the operation of updating the phase-shifted amount is repeated predetermined times, it is required to stop the operation.

Therefore, it is determined at step S17 whether i is n or more, and if i is n or more, it is determined at step S18 whether k is K or less. If k is K or less, the numerical value is incremented by 1, and the processing at steps S7 through S17 is repeated. If k is not K or less, the update processing is stopped.

Although the operation is herein stopped by counting the number of repetitions of the update of the phase-shifted amount, there is considered, e.g., a method for stopping the operation after Pi'−Pi" is a predetermined value or less.

The Pi'−Pi" is expressed by formula (3).

$$P_i'-P_i''=-4\mathrm{Im}\left\{\sum_{\substack{l=1\\l\neq i}}^{n}e^{-j(\Phi_l(k)-\Phi_i(k))}E[S_l(t)S_i*(t)]\right\} \tag{3}$$

wherein i is an integer meeting 0≦i≦n, and Im{ } means an imaginary part.

On the other hand, the partial differential δP/δΦi of P by Φi is expressed by formula (4).

$$\frac{\delta P}{\delta\Phi_i}=-2\mathrm{Im}\left\{\sum_{\substack{l=1\\l\neq i}}^{n}e^{-j(\Phi_l(k)-\Phi_i(k))}E[S_l(t)S_i*(t)]\right\} \tag{4}$$

In view of the foregoing, δP/δΦ=(Pi'−Pi")/2 is established. Therefore, the processing at step S12 is equivalent to the processing expressed by formula (5).

$$\Phi_i(k+1)=\Phi_i(k)+2\alpha\frac{\delta P}{\delta\Phi_i} \tag{5}$$

When the real number α is negative, the phase-shifted amounts of the variable phase shifters 41 through 4$n$ are updated so as to decrease the output signal strength of the adaptive array antenna, and finally, set so that δP/δΦi=0. Therefore, when only interference waves exist, the interference waves can be suppressed. When such a phase-shifted amount control is applied to, e.g., a receiving adaptive array antenna of a base station, there is considered a method for controlling the phase-shifted amounts of variable phase shifters before a communication channel is given to a terminal station which has called for communication, calculating a phase-shifted amount, which suppresses the co-channel interference, and thereafter, giving the communication channel to the terminal station to set the phase-shifted amount, which suppresses the co-channel interference, in the variable phase shifters 41 through 4$n$ to receive a signal which is transmitted from the terminal station.

When desired waves and interference waves exist simultaneously, it is possible to avoid the suppression of the desired waves by fixing the phase-shifted amounts of one or more variable phase shifters to initial values.

On the other hand, when the real number α is positive, the phase-shifted amounts of the variable phase shifters 41 through 4$n$ are set so as to increase the output signal strength of the adaptive array antenna. Therefore, when desired waves exist, the desired waves can be in-phase combined. When such a phase-shifted amount control is applied to, e.g., a receiving adaptive array antenna of a base station, it is considered that when no co-channel interference exists, one terminal station is caused to transmit a signal, and the phase-shifted amount to be in-phase combined is calculated, and thereafter, when the terminal station carries out communication, the phase-shifted amount to be in-phase combined is set in the variable phase shifters 41 through 4$n$ to receive a signal which is transmitted from the terminal station.

While the phase-shifted amount has been increased or decreased by 90 degrees in this preferred embodiment, the same effect can be also obtained when the phase-shifted amount is increased or decreased by X degrees.

When the phase-shifted amount is increased or decreased by X degrees, Pi'−Pi" is expressed by formula (6).

$$P_i'-P_i''=-4\sin(X)\mathrm{Im}\left\{\sum_{\substack{l=1\\l\neq i}}^{n}e^{-j(\Phi_l(k)-\Phi_i(k))}E[S_l(t)S_i*(t)]\right\} \tag{6}$$

Thus, δP/δΦi=(Pi'−Pi")/(2 sin(X)) is established. Therefore, the processing at step S9 is equivalent to the processing expressed by formula (7).

$$\Phi_i(k+1) = \Phi_i(k) + 2\alpha\sin(X)\frac{\delta P}{\delta\Phi_i} \quad (7)$$

In particular, when X is 90 degrees, the difference between Pi' and Pi" is maximum, so that it is possible to accurately δP/δΦi.

As described above, according to the first preferred embodiment of the present invention, the control of the phase-shifted amount based on the partial differential coefficient of the strength of the received signal, which is combined by the combining 5, with respect to the phase-shifted amount can be carried out using only the signal strength detected by the signal strength detecting means 71. Therefore, it is possible to realize a simpler circuit construction than the prior art where a signal is used for each of antenna elements.

(Second Preferred Embodiment)

Figure 11:
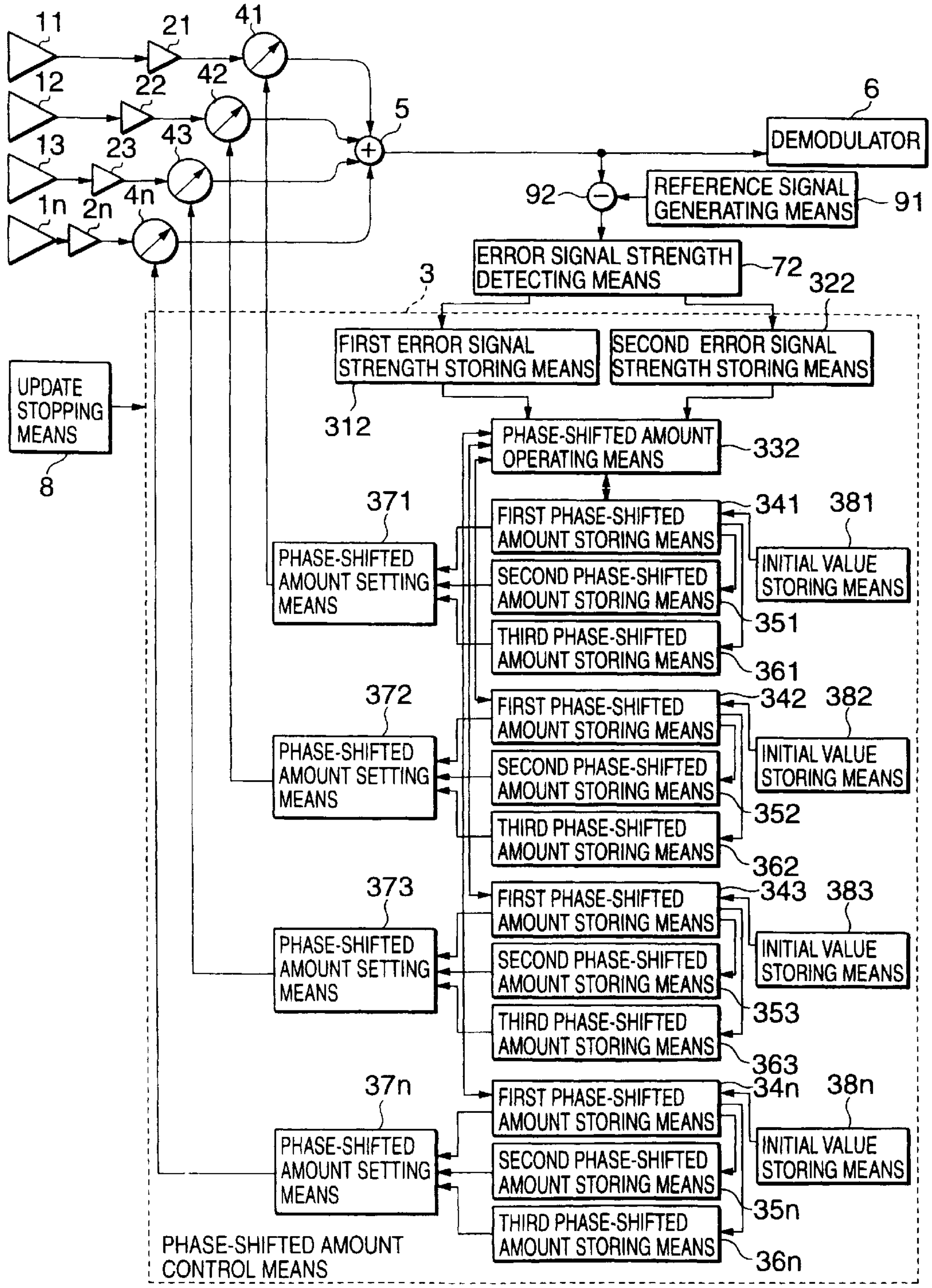
FIG. 11 is a block diagram of the second preferred embodiment of an adaptive array antenna according to the present invention.

The second preferred embodiment of the present invention will be described below. FIG. 11 is a block diagram of the second preferred embodiment of an adaptive array antenna according to the present invention. The difference between the first and second preferred embodiments is that reference signal generating means, error detecting means, error signal strength detecting means, first error signal strength storing means and second error signal strength storing means are used in the second preferred embodiment.

In FIG. 11, reference number 91 denotes reference signal generating means for generating a reference signal; reference number 92 denotes error detecting means for outputting a difference between a received signal, which is combined by the combining 5, and the reference signal which is generated by the reference signal generating means 91; reference number 72 denotes error signal strength detecting means for detecting the strength of the outputted error signal; reference number 312 denotes first error signal strength storing means for storing the strengths Qi' of the received signals which are detected by the error strength detecting means 72 while Φ1(k), Φ2(k), . . . , Φi−1(k), Φi'(k), Φi+1(k), . . . , Φn(k) (1<=i<=n) are set in the respective variable phase shifters 41 through 4*n*; reference number 322 denotes second signal strength storing means for storing the strengths Pi" of the received signals which are detected by the signal strength detecting means 72 while Φ1(k), Φ2(k), . . . , Φ−1(k), Φi"(k), Φi+1(k), . . . , Φn(k) are set in the respective variable phase shifters 41 through 4*n*; and reference number 332 denotes phase-shifted amount operating means for calculating a new phase-shifted amount Φi(k+1) by increasing Φi(k), which is stored in the first phase-shifted amount storing means i, by a value in proportional to the difference between Qi' and Qi", to input the calculated phase-shifted amount to the first phase-shifted amount storing means i. Since other constructions are the same as those in FIG. 9, duplicate descriptions thereof are omitted.

Figure 13:
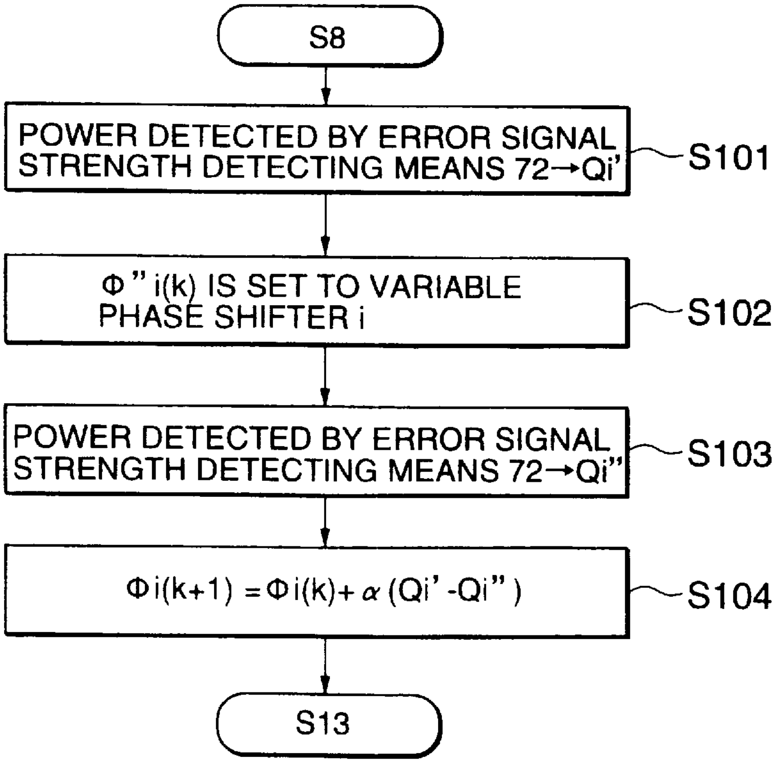
FIG. 13 is a flow chart showing the operation of the second preferred embodiment of an adaptive array antenna according to the present invention.

The operation of the adaptive array antenna with the above described construction will be described in detail below. FIG. 13 is a flow chart showing the operation of the adaptive array antenna.

Figure 12:
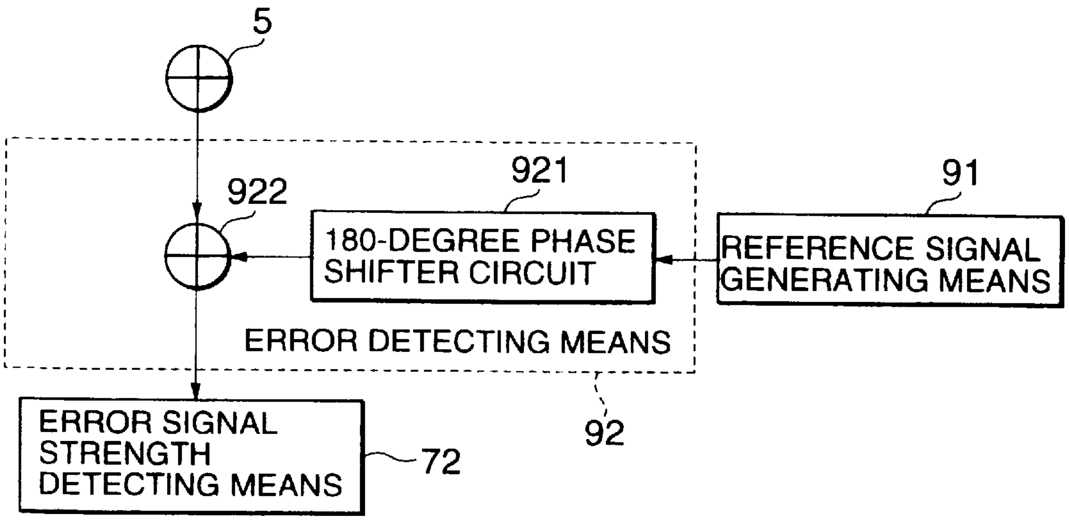
FIG. 12 is a block diagram of error detecting means in the second preferred embodiment of an adaptive array antenna according to the present invention.

First, the processing at steps S1 through S7 is carried out by the same procedure as that in the first preferred embodiment. It is assumed that received signals, which are received by the antenna elements 11 through 1*n* at time t to be amplified by the amplifiers 21 through 2*n*, are S1(t) through Sn(t). These signals are phase-controlled by the variable phase shifters 41 through 4*n*, and combined by the combining 5. On the other hand, it is assumed that the reference signal generated by the reference signal generating means 91 is D(t). The difference between the received signal, which is combined by the combining 5, and the reference signal, which is generated by the reference signal generating means 91, is outputted from the error detecting means 92. For example, as shown in FIG. 12, the error detecting means 92 comprises: a 180-degree phase shifter circuit 921 for phase-shifting the reference signal by 180 degrees; and a combining circuit 922 for combining the reference signal, which is phase-shifted by 180 degrees, with the received signal. Assuming that the phase-shifted amounts, which are set in the variable phase shifters 41 through 4*n*, are Φ1(k) through Φn(k) (n is the number of antenna elements, and k is the number of phase-shifted amount updating operations), the error signal E(t) outputted from the error detecting means 92 is expressed by formula (8).

$$E(t) = \sum_{l=1}^{n} e^{-j\Phi_l(k)} S_l(t) - D(t) \quad (8)$$

The outputted error signal E(t) is inputted to the error signal strength detecting means 72. On the basis of this, the strength Q of the error signal detected by the error signal strength detecting means 72 is expressed by formula (9).

$$\begin{aligned} Q &= E[E(t)E*(t)] \quad (9) \\ &= \sum_{l=1}^{n}\sum_{m=1}^{n} e^{-j(\Phi_l(k)-\Phi_m(k))} E[S_l(t)S_m*(t)] + \\ &\quad E[D(t)D*(t)] - \\ &\quad \sum_{l=1}^{n} e^{-j\Phi_l(k)} E[S_l(t)D*(t)] \sum_{m=1}^{n} e^{-j\Phi_m(k)} E[D(t)S_m*(t)] \end{aligned}$$

The second preferred embodiment is characterized in that the partial differential coefficient of the signal strength of the error signal, which is detected by the error signal strength detecting means 72, with respect to the phase-shifted amounts, which are set in the respective variable phase shifters 41 through 4*n*, can be derived using only the signal strength of the error signal which is detected by the error signal strength detecting means 72. On the basis of the partial differential coefficient, the phase-shifted amount is controlled. The phase-shifted amounts to be set in the variable phase shifters 41 through 4*n* are calculated by the phase-shifted amount control means 3 one by one. A method for updating the phase-shifted amount of the variable phase shifter 41 will be described herein.

The processing at step S8 is carried out by the same procedure as that in the first preferred embodiment. In this set state, the strength Q1' of the error signal detected by the error signal strength detecting means 72 is inputted to the first error signal strength storing means 312 (step S101). Subsequently, the phase-shifted amount Φ"1(t) stored in the third phase-shifted amount storing means 361 is inputted to the phase-shifted amount setting means 371. This phase-shifted amount is set in the variable phase shifter 41 by the phase-shifted amount setting means 371 (step S102). In this set state, the strength Q1" of the error signal detected by the error signal strength detecting means 72 is inputted to the second error signal strength storing means 322 (step S103).

Subsequently, the error signal strength Q1' stored in the first error signal strength storing means 312, the error signal strength Q1" stored in the second error signal strength storing means 322, and the phase-shifted amount Φ1(k)

stored in the first phase-shifted amount storing means 341 are inputted to the phase-shifted amount operating means 332. On the basis of these inputs, a new phase-shifted amount Φ1(k+1) is calculated by the phase-shifted amount calculating means 332 as follows (step S104).

$$\Phi_1(k+1)=\Phi_1(k)+\alpha(Q_1-Q_1'') \tag{10}$$

wherein α is a real number.

Subsequently, the processing at steps S13 through S16 is carried out by the same procedure as that in the first preferred embodiment. Subsequently, the phase-shifted amounts of the variable phase shifters 42 through **4*n* are updated by the same procedure. Subsequently, the processing at step S18** is carried out by the same procedure as that in the first preferred embodiment.

The Qi'–Qi" is expressed by formula (11).

$$Q_1'-Q_1''= 4\,\mathrm{Im}\left\{\sum_{\substack{l=1\\ l\neq i}}^{n} e^{-j(\Phi_l(k)-\Phi_i(k))}E[S_l(t)S_i*(t)]+e^{-j\Phi_i(k)}E[S_i(t)D*(t)]\right\} \tag{11}$$

On the other hand, the partial differential δQ/δΦi of Q by Φi is expressed by formula (12).

$$\frac{\delta Q}{\delta\Phi_i}=-2\,\mathrm{Im}\left\{\sum_{\substack{l=1\\ l\neq i}}^{n} e^{-j(\Phi_l(k)-\Phi_i(k))}E[S_l(t)S_i*(t)]+e^{-j\Phi_i(k)}E[S_i(t)D*(t)]\right\} \tag{12}$$

In view of the foregoing, δQ/δΦi=(Qi'–Qi")/2 is established. Therefore, the processing at step S104 is equivalent to the processing expressed by formula (13).

$$\Phi_i(k+1)=\Phi_i(k)+2\alpha\frac{\delta Q}{\delta\Phi_i} \tag{13}$$

When the real number α is negative, the phase-shifted amounts of the variable phase shifters 41 through **4*n* are updated so as to decrease the difference between the output of the adaptive array antenna and the reference signal, and finally, set so that δQ/δΦi=0. Therefore, when desired waves and interference waves exist, the interference waves can be suppressed. When such a phase-shifted amount control is applied to, e.g., a receiving adaptive array antenna of a base station, there is considered a method for transmitting a known signal before a terminal station starts communication, allowing the base station to control the phase-shifted amounts of the variable phase shifters using the same signal as the known signal as a reference signal to operate a phase-shifted amount which suppresses the co-channel interference, and thereafter, allowing the terminal station to start communication, and allowing the base station to set the phase-shifted amount, which suppresses the co-channel interference, to the variable phase shifters 41 through 4*n*** to receive a signal transmitted from the terminal station.

While the phase-shifted amount has been increased or decreased by 90 degrees in this preferred embodiment, the same effect can be also obtained when the phase-shifted amount is increased or decreased by X degrees.

When the phase-shifted amount is increased or decreased by X degrees, Qi'–Qi" is expressed by formula (14).

$$Q_1'-Q_1''=-4\sin(X)\,\mathrm{Im}\left\{\sum_{\substack{l=1\\ l\neq i}}^{n} e^{-j(\Phi_l(k)-\Phi_i(k))}E[S_l(t)S_i*(t)]+e^{-j\Phi_i(k)}E[S_i(t)D*(t)]\right\} \tag{14}$$

Thus, δQ/δΦi=(Qi'–Qi")/(2 sin(X)) is established. Therefore, the processing at step S9 is equivalent to the processing expressed by formula (15).

$$\Phi_i(k+1)=\Phi_i(k)+2\alpha\sin(X)\frac{\delta Q}{\delta\Phi_i} \tag{15}$$

In particular, when X is 90 degrees, the difference between Qi' and Qi" is maximum, so that it is possible to accurately δQ/δΦi.

As described above, according to the second preferred embodiment of the present invention, in an adaptive array antenna for minimizing the strength of the difference between the received signal, which is combined by the combining, and the reference signal as a performance function, the partial differential coefficient of a performance function, which is required for controlling a phase-shifted amount, can be obtained using only the signal strength which is detected by the error signal strength detecting means 72, so that it is possible to realize a simpler circuit construction that the prior art where a signal is used for each of antenna elements.

(Third Preferred Embodiment)

Figure 14:
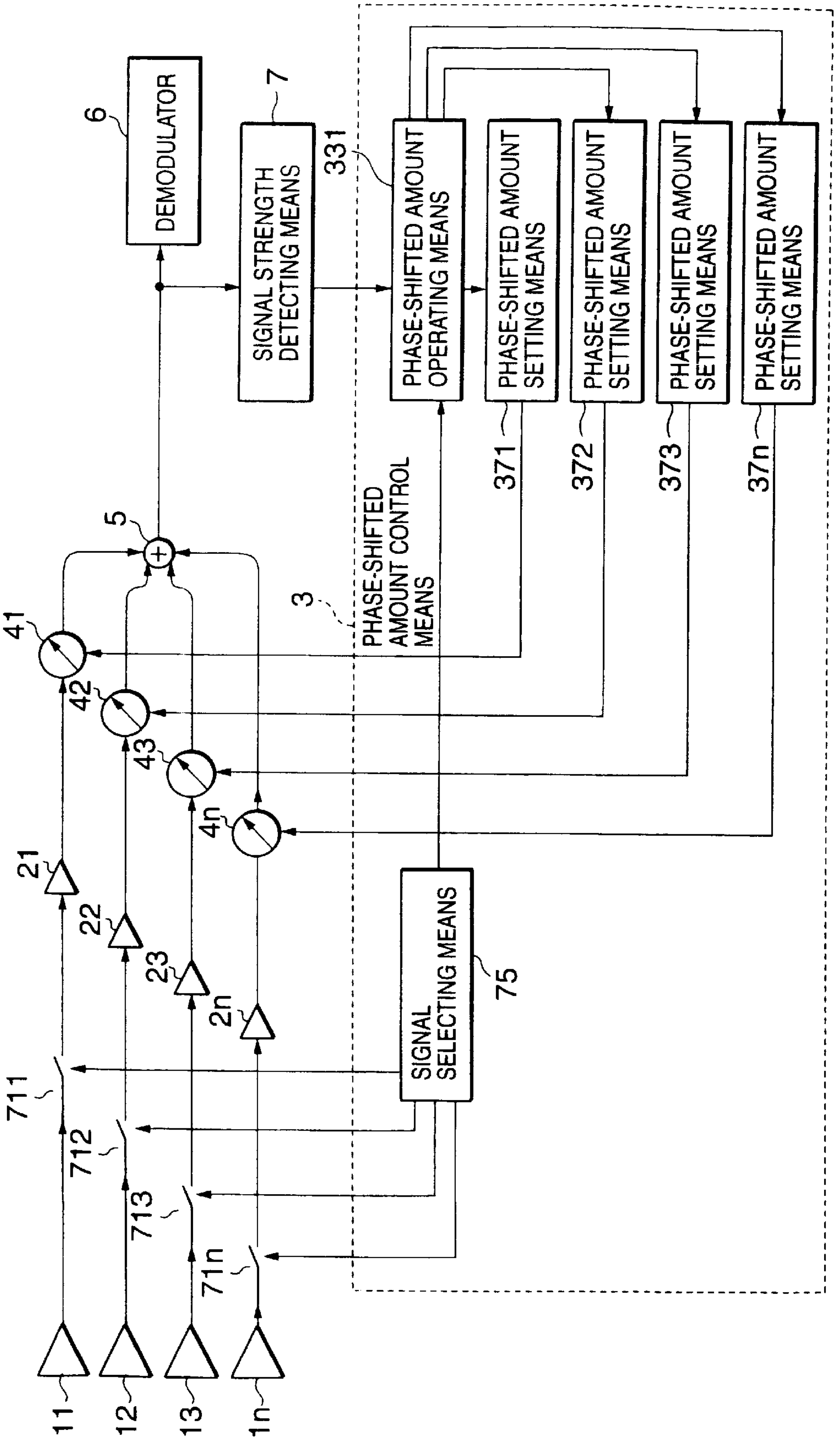
FIG. 14 is a block diagram of the third preferred embodiment of an adaptive array antenna according to the present invention.

FIG. 14 is a block diagram of the third preferred embodiment of an adaptive array antenna according to the present invention.

In FIG. 14, reference numbers 11 through **1*n* denote antenna elements; reference numbers 711 through 71*n* denote signal cut-off means for passing and interrupting signals, which are received by the antenna elements, to circuits in the subsequent stage in accordance with control signals inputted by signal selecting means 75 which will be described later; reference numbers 21 through 2*n* denote amplifiers for amplifying the received signals passing through the signal cut-off means; reference numbers 41 through 4*n* denote variable phase shifters for phase-controlling the amplified received signals in accordance with phase-shifted amounts which are set by phase-shifted amount control means 3 which will be described later; reference number 5 denotes a combining for combining the phase-controlled received signals; reference number 6 denotes a demodulator for demodulating the combined received signal; reference number 7 denotes signal strength detecting means for detecting the strength of the received signal which is combined by the combining 5; and reference number 3 denotes phase-shifted amount control means for calculating a phase-shifted amounts on the basis of the detected strength of the received signal to set the calculated phase-shifted amount in each of the variable phase shifters 41 through 4*n***.

For example, it is considered that the signal cut-off means 711 through **71*n* use the power supply switches of the amplifiers 21 through 2*n*. Reference number 75 denotes signal selecting means for setting two of the signal cut-off means 1101 through 110n on a pass side and the rest on a cut-off side; reference number 331 denotes phase-shifted amount operating means for calculating a phase-shifted amount, which minimizes the strength P of the received signal detected by the signal strength detecting means 7, on the basis of the strength P while two of the signal cut-off means 711 through 71***n* are set on the pass side and the other signal cut-off means are set on the cut-off side; and reference numbers 371 through 37*n* denote phase-shifted amount setting means for setting the calculated phase-shifted amount in a variable phase shifter i of the variable phase shifters 41 through 4*n*, which is connected to signal cut-off means i (1≦i≦n) set on the pass side by the signal selecting means 75.

Figure 15:
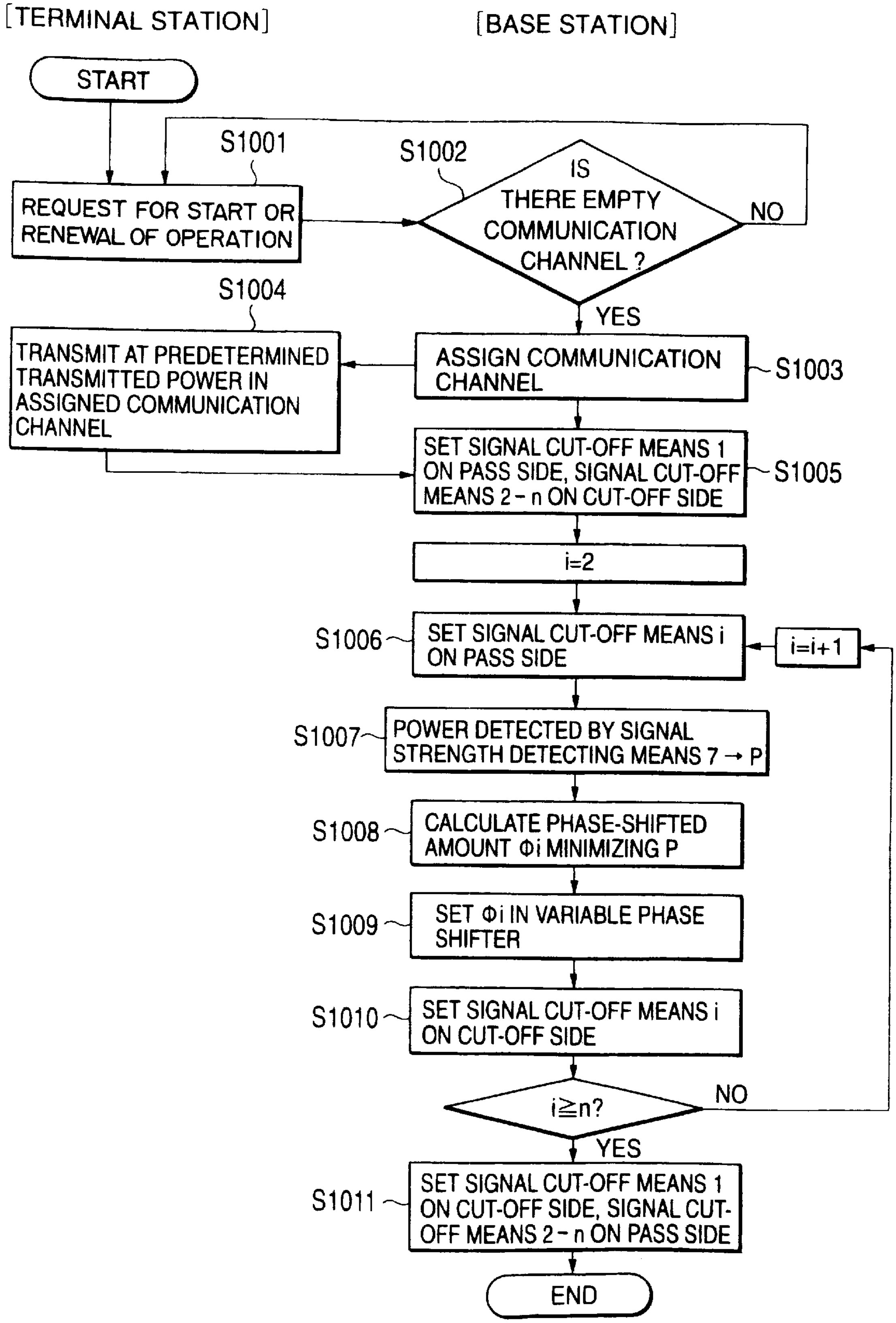
FIG. 15 is a flow chart showing the operation of the third preferred embodiment of an adaptive array antenna according to the present invention.

With this construction, the operation of the third preferred embodiment of an adaptive array antenna according to the present invention will be described below. FIG. 15 is a flow chart showing the operation of the adaptive array antenna.

When a terminal station newly starts operation, or when the existing terminal station restarts operation first after changing its position, the terminal station transmits a first control signal to a base station. When a communication channel is empty, the base station uses a second control signal to assign one or a plurality of communication channels for carrying out the subsequent transmission and receiving, and the terminal station carries out transmission at a predetermined transmitted power in a communication channel which is assigned by the base station (step S1001 through S1004).

Subsequently, the signal selecting means 75 sets the first signal cut-off means 711 on the pass side, and the second through n-th signal cut-off means 712 through 71*n* on the cut-off side (step S1005).

The third preferred embodiment is characterized in that the phase-shifted amount is controlled on the basis of the signal strength of the received signal, which is detected by the signal strength detecting means 7, so that the phase of the received signal phase-controlled by the second through n-th variable phase shifters 42 through 4*n* is the opposite phase to the phase of the received signal which is phase-controlled by the first variable phase shifter 41, i.e., so that the phases of the received signals, which are phase-controlled by the variable phase shifters 2 through *n* (1042 through 104*n*), are the same. The phase-shifted amounts to be set in the variable phase shifters 2 through *n* (1042 through 104*n*) are calculated by the phase-shifted amount control means 1003 one by one. A method for setting the phase-shifted amount of the variable phase shifter 2 (1042) will be described herein.

The signal selecting means 75 sets the second signal cut-off means 712 on the pass side, and informs the phase-shifted amount operating means 331 that such setting has been carried out (step S1006). In this state, the strength P of the received signal detected by the signal strength detecting means 7 is inputted to the phase-shifted amount operating means 331 (step S1007). On the basis of this, a phase-shifted amount Φ2, which minimizes the strength P, is calculated by the phase-shifted amount operating means 331 (step S1008).

Figure 16:
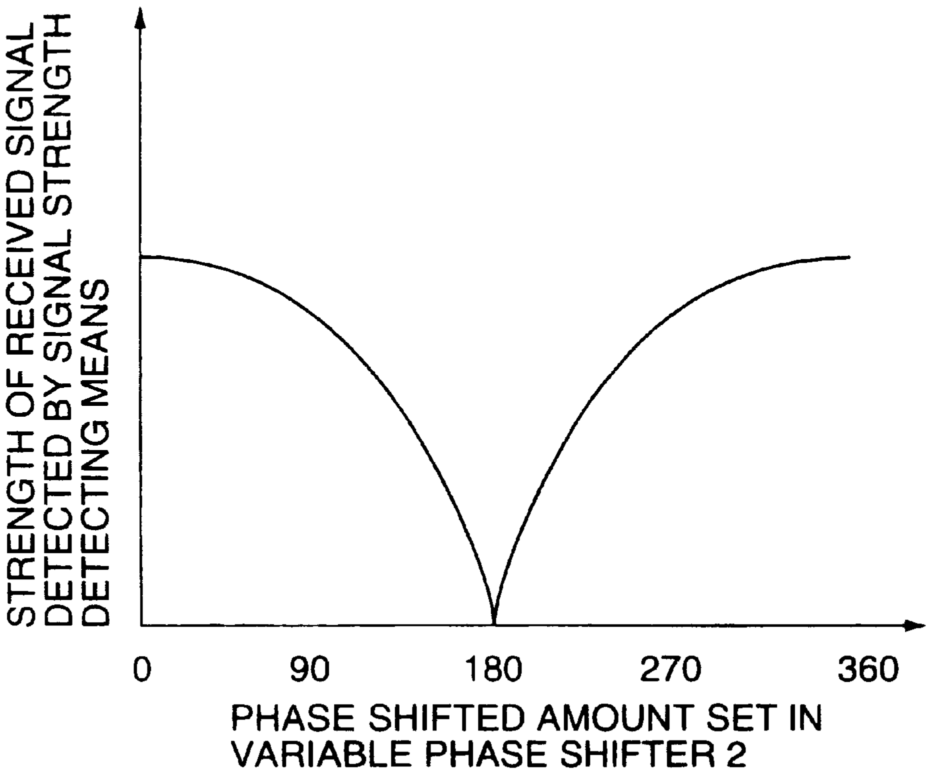
FIG. 16 is a graph showing the variation in received strength with respect to the phase-shifted amount in the third preferred embodiment of an adaptive array antenna according to the present invention.

As a method for minimizing the signal strength P, there are considered a method as described by using FIG. 10, a method for sequentially setting a phase-shifted amount to determine a phase-shifted amount which minimizes the signal strength P, and so forth. FIG. 16 shows the variation in strength P by dB when the phase-shifted amount is sequentially set. As shown in FIG. 16, the minimum point of the received strength has a sharp characteristic, so that it is possible to accurately determine the phase-shifted amount.

Subsequently, on the basis of the notice from the signal selecting means 75, the phase-shifted amount Φ2 calculated by the phase-shifted amount operating means 331 is inputted to the phase-shifted amount setting means 372. This phase-shifted amount Φ2 is set in the second variable phase shifter 42 by the phase-shifted amount setting means 372 (step S1009). Then, the second signal cut-off means 712 is set on the cut-off side by the signal selecting means 75 (step S1010). Then, the phase-shifted amounts of the third through n-th variable phase shifters 43 through 4*n* are set by the same procedure.

By the above described processing, the phase of the received signal phase-controlled by each of the second through n-th variable phase shifters 42 through 4*n* is the opposite phase to the phase of the received signal which is phase-controlled by the first variable phase shifter 41. Subsequently, the signal selecting means 75 sets the first signal cut-off means 711 on the cut-off side, and the second through n-th signal cut-off means 712 through 71*n* on the pass side (step S1011).

By the above described processing, the phases of the received signals, which are phase-controlled by the variable phase shifters 2 through *n* (1042 through 104*n*), are the same, so that a signal transmitted from a terminal unit can be in-phase combined by the combining 5. For example, if the calculated phase-shifted amount has been stored, this can also be used when a call restarts after a call ends. The effects of the third preferred embodiment of the present invention are arranged as follows.

On the basis of the signal strength of the received signal detected by the signal strength detecting means 7, the phase-shifted amount for in-phase combining and receiving the signal which is transmitted from the terminal station can be obtained by a simple processing. Therefore, there are advantages in that it is possible to realize a simple circuit construction, and the processing time is short. In particular, this is effective when it is required to carry out a real time processing in a rapid transmission radio communication system.

Even if there is deviation in device connected to each of antenna elements, an error in arrangement of antenna elements, or deviation in phase due to multi-path propagation and so forth, it is possible to take account of this to obtain a phase-shifted amount for in-phase combining and receiving. Unlike a conventional method using a beam steering, it is not required to set the phase-shifted amount so as to compensate the deviation in phase, and it is possible to omit or simplify compensation based on the measurement of the deviation.

The optimum phase-shifted amount once stored can be reused since the propagation environment for radio waves is substantially temporally fixed particularly when base stations and terminal stations are three-dimensionally fixed like a wireless local loop (WLL), so that it is possible to simplify control during communication.

(Fourth Preferred Embodiment)

The fourth preferred embodiment of an adaptive array antenna according to the present invention will be described below. Since the hardware construction of the fourth preferred embodiment of an adaptive array antenna according to the present invention is the same as that of the third preferred embodiment, the hardware construction thereof will be described in accordance with the construction shown in FIG. 14.

The difference between the third and fourth preferred embodiments is that, in the fourth preferred embodiment, after step S1011 in FIG. 15 which shows the processing operation of the third preferred embodiment, when a new phase-shifted amount is set in the first variable phase shifter 41 to determine the optimum phase-shifted amount, which is to be set, to in-phase combine signals which are transmitted from terminal stations, the signals received by the first antenna element 11 are also used.

Figure 17:
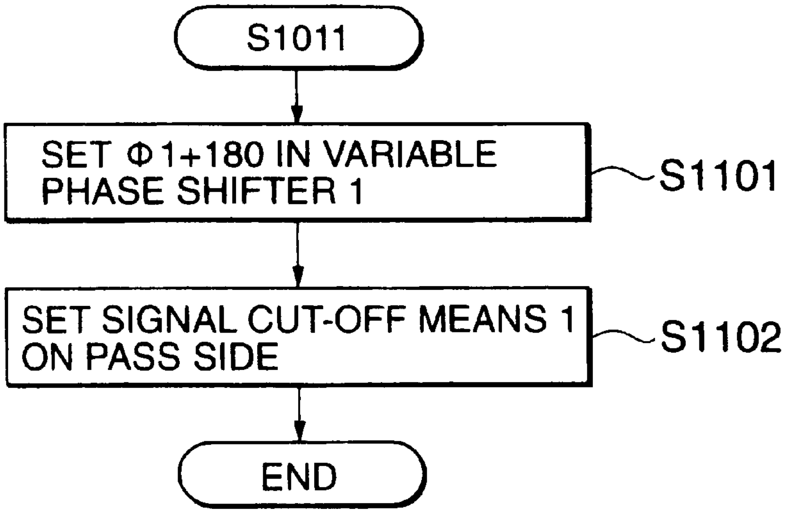
FIG. 17 is a flow chart showing the operation of the fourth preferred embodiment of an adaptive array antenna according to the present invention.

The operation of the fourth preferred embodiment will be described in detail below. FIG. 17 is a flow chart showing the operation of the adaptive array antenna.

The processing at steps S1001 through S1011 shown in FIG. 15 is carried out by the same procedure as that in the third preferred embodiment. Subsequently, a phase-shifted amount obtained by increasing the phase-shifted amount Φ1, which is currently set in the variable phase shifter 41, by 180 degrees is set in the first variable phase shifter 41 by the first phase-shifted amount setting means 371 (step S1101). Then, the first signal cut-off means 711 is set on the pass side by the signal selecting means 75 (step S1102).

By the above described processing, the phases of the received signals, which are phase-controlled by the second through n-th variable phase shifters 42 through 4*n*, are the same, so that the signals transmitted from the terminal station can be in-phase combined by the combining 5.

As described above, according to the fourth preferred embodiment of the present invention, it is possible to increase the directional gain with respect to the terminal station by also using the signals received by the first antenna element 11 when the signals transmitted from the terminal station are in-phase combined.

(Fifth Preferred Embodiment)

Figure 18:
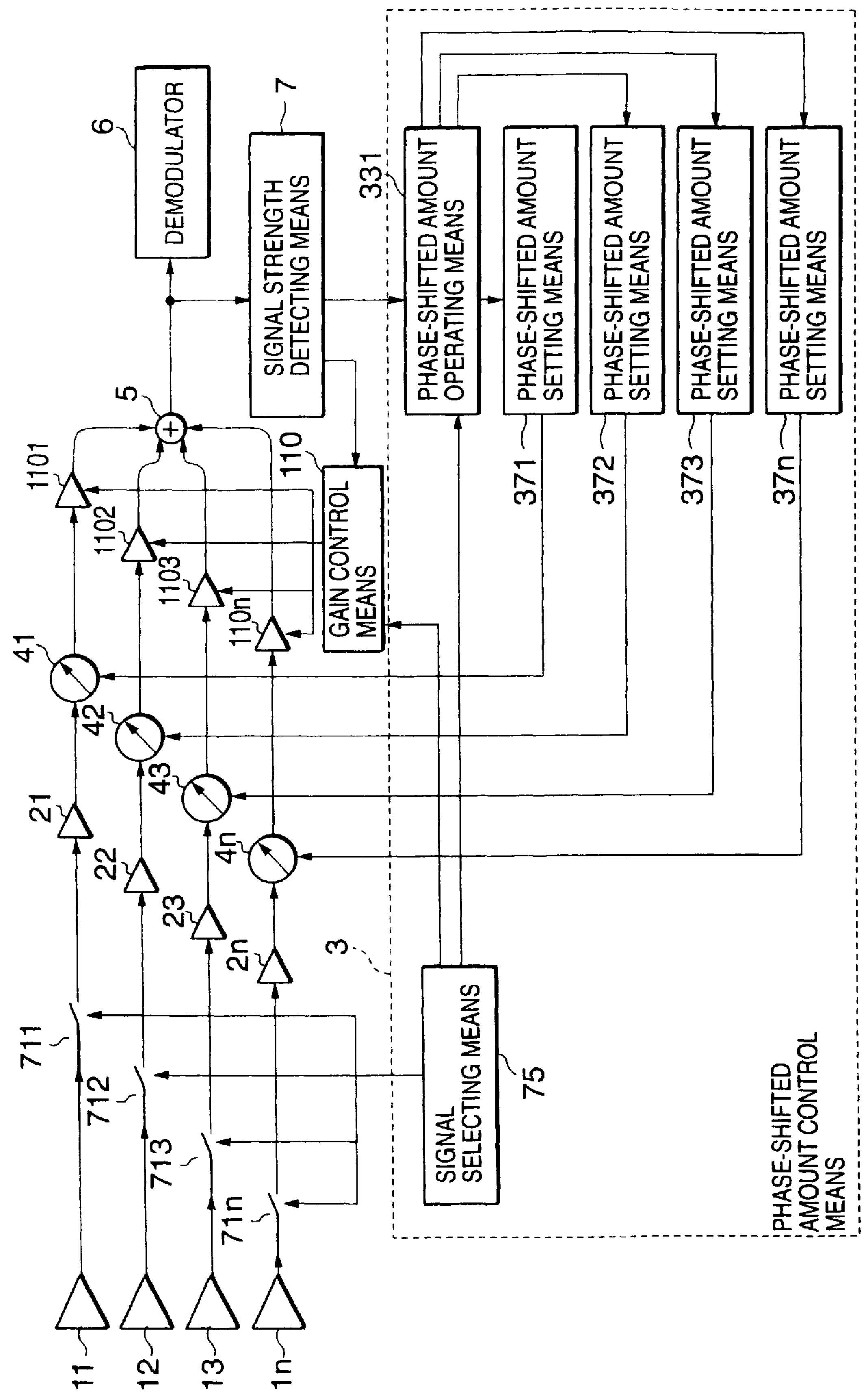
FIG. 18 is a block diagram of the fifth preferred embodiment of an adaptive array antenna according to the present invention.

The fifth preferred embodiment of the present invention will be described below. FIG. 18 is a block diagram showing the fifth preferred embodiment of an adaptive array antenna according to the present invention.

The difference between the fifth preferred embodiment and the third preferred embodiment is that variable gain circuits and gain control means are used in the fifth preferred embodiment. In FIG. 18, reference numbers 1101 through 110n denote first through n-th variable gain circuits for amplifying received signals, which are phase-controlled by the variable phase shifters 41 through 4*n*, in accordance with control signals inputted from the outside, and for inputting the amplified received signals to the combining 5; and reference number 110 denotes gain control means for setting the gains of the variable gain circuits 1101 through 110*n* on the basis of the strengths of the received signals, which are detected by the signal strength detecting means 7, so that the strengths of the received signals, which are amplified by the first through n-th variable gain circuits 1101 through 110*n*, are equal to each other. Since other constructions are the same as those in FIG. 14 showing the third preferred embodiment, the same reference numbers are used for omitting the duplicate descriptions thereof.

Figure 19:
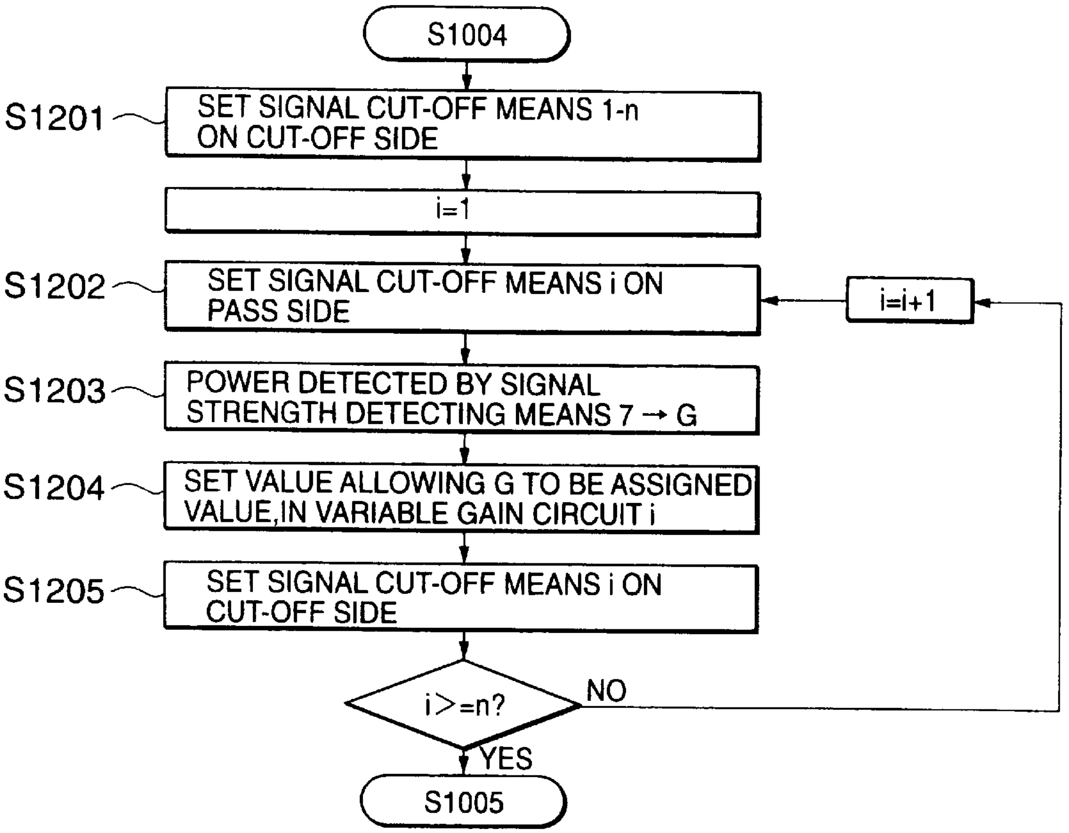
FIG. 19 is a flow chart showing the operation of the fifth preferred embodiment of an adaptive array antenna according to the present invention.

With this construction, the operation of the adaptive array antenna will be described in detail below. FIG. 19 is a flow chart showing the operation of the adaptive array antenna.

First, the processing at steps S1001 through S1004 shown in FIG. 15 is carried out by the same procedure as that in the third preferred embodiment. Subsequently, the first through n-th signal cut-off means 711 through 71*n* are set on the cut-off side by the signal selecting means 75 (step S1201).

The fifth preferred embodiment is characterized in that the gains of the variable gain circuits 1101 through 110*n* are controlled on the basis of the signal strengths of the received signals detected by the signal strength detecting means 7 so that the strengths of the received signals amplified by the first through n-th variable gain circuits 1101 through 110*n* are equal to each other. The gains to be set in the first through n-th variable gain circuits 1101 through 110*n* are set by the gain control means 110 one by one. A method for setting the gain of the first variable gain circuit 1101 will be described herein.

The signal selecting means 75 sets the first signal cut-off means 711 on the pass side, and informs the gain control means 110 of this (step S1202). In this state, the strength Q of the received signal, which is detected by the signal strength detecting means 1007, is inputted to the gain control means 110 (step S1203). On the basis of this, the gain of the first variable gain circuit 1101 is set by the gain control means 110 so that the strength of the received signal amplified by the first variable gain circuit 1101 is a predetermined value (step S1204). Subsequently, the first signal cut-off means 711 is set on the cut-off side by the signal selecting means 75. Then, the gains of the second through n-th variable gain circuits 1102 through 110*n* are set by the same procedure.

Subsequently, the processing at steps S1005 through S1011 shown in FIG. 15 is carried out by the same procedure as that in the third preferred embodiment.

Figure 20:
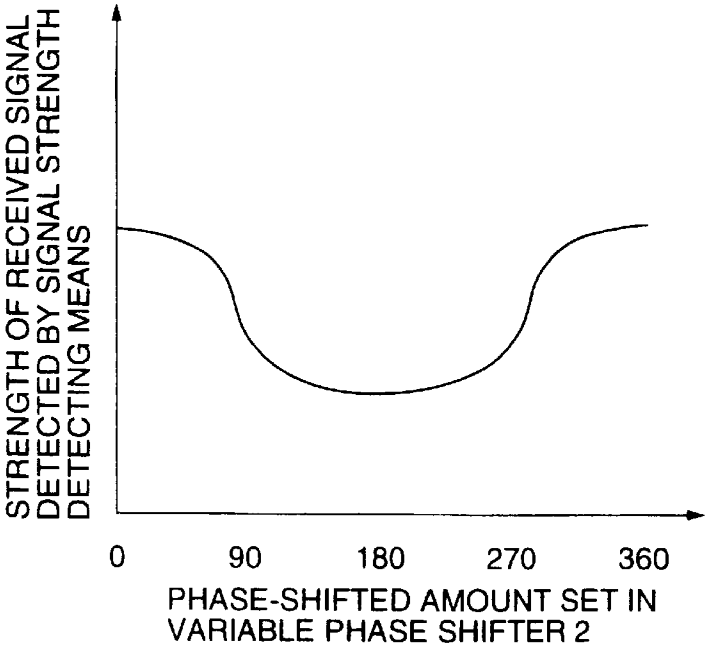
FIG. 20 is a graph showing the variation in received strength with respect to the phase-shifted amount in the fifth preferred embodiment of an adaptive array antenna according to the present invention.

In the third preferred embodiment, it is assumed that the signal strengths of the received signals which are received by the respective antenna elements are the same. However, it is supposed that the signal strengths of the signals received by the respective antenna elements are different under the influence of the reflection of the signals transmitted from the terminal station and the influence of the deviation of the amplifiers connected to the respective antenna elements. In that case, the signal strength of the received signal shown in FIG. 16 does not have the sharp characteristic at the minimum point as shown in FIG. 20, so that it is not possible to accurately carry out the phase adjustment between the antenna elements.

On the other hand, in the fifth preferred embodiment, even if the signal strengths of the signals which are received by the respective antenna elements are different, the gain control of the first through n-th variable gain circuits 1101 through 110*n* is carried out so that the strengths of the received signals, which are amplified by the first through n-th variable gain circuits 1101 through 110*n*, are equal to each other, before the optimum phase-shifted amount is determined. Therefore, the minimum point of the signal strengths of the received signals has a sharp characteristic as shown in FIG. 9, so that it is possible to accurately carry out the phase adjustment between the antenna elements.

Furthermore, signal strength measuring means may be provided after each of the variable gain circuit 1101 through 110*n* to measure the strength of each of the received signals which are amplified by the respective variable gain circuits 1101 through 110*n*.

(Sixth Preferred Embodiment)

Figure 21:
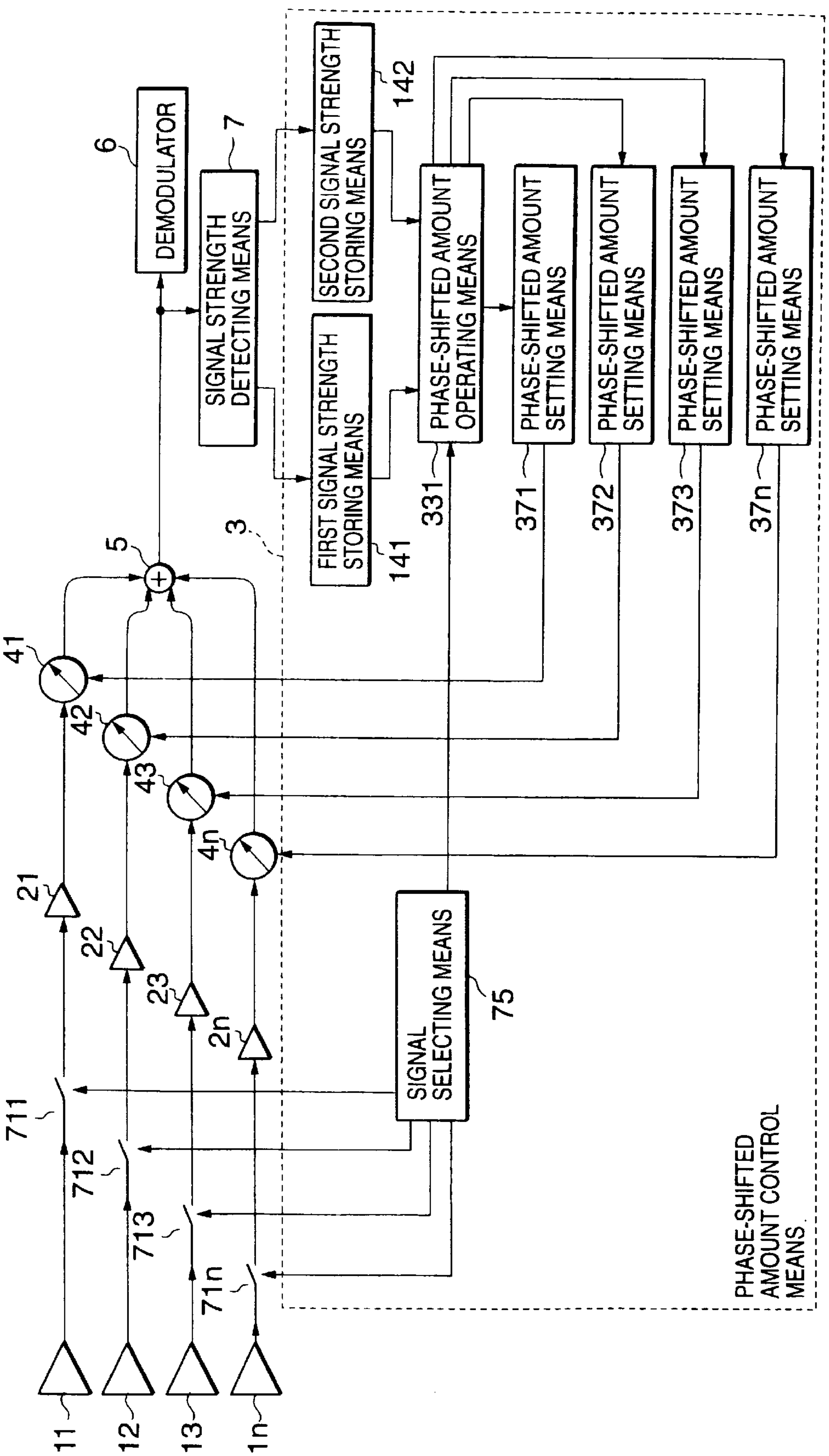
FIG. 21 is a block diagram of the sixth preferred embodiment of an adaptive array antenna according to the present invention.

The sixth preferred embodiment of the present invention will be described below. FIG. 21 is a block diagram of the sixth preferred embodiment of an adaptive array antenna according to the present invention.

The difference between the sixth preferred embodiment and the third preferred embodiment is that the sixth preferred embodiment uses first signal strength storing means, second signal strength storing means and phase-shifted amount operating means. In FIG. 21, the phase-shifted amount control means 3 comprises: first signal strength storing means 141 for storing a first strength P1 of a received signal which is detected by the signal strength detecting means 7 while desired waves and interference waves exist; second signal strength storing means 142 for storing a second strength P2 of a received signal which is detected by the signal strength detecting means 7 while only interference waves exist; and phase-shifted amount operating means 331 for calculating a phase-shifted amount, which minimizes the difference "P1–P2" between the first and second strengths P1 and P2, on the basis of the first and second strengths P1 and P2 while two of the signal cut-off means 711 through 71*n* are set on the pass side and the rest is set on the cut-off side. Since other constructions are the same as those in FIG. 14, the same reference numbers are used for omitting the duplicate descriptions thereof.

Figure 22:
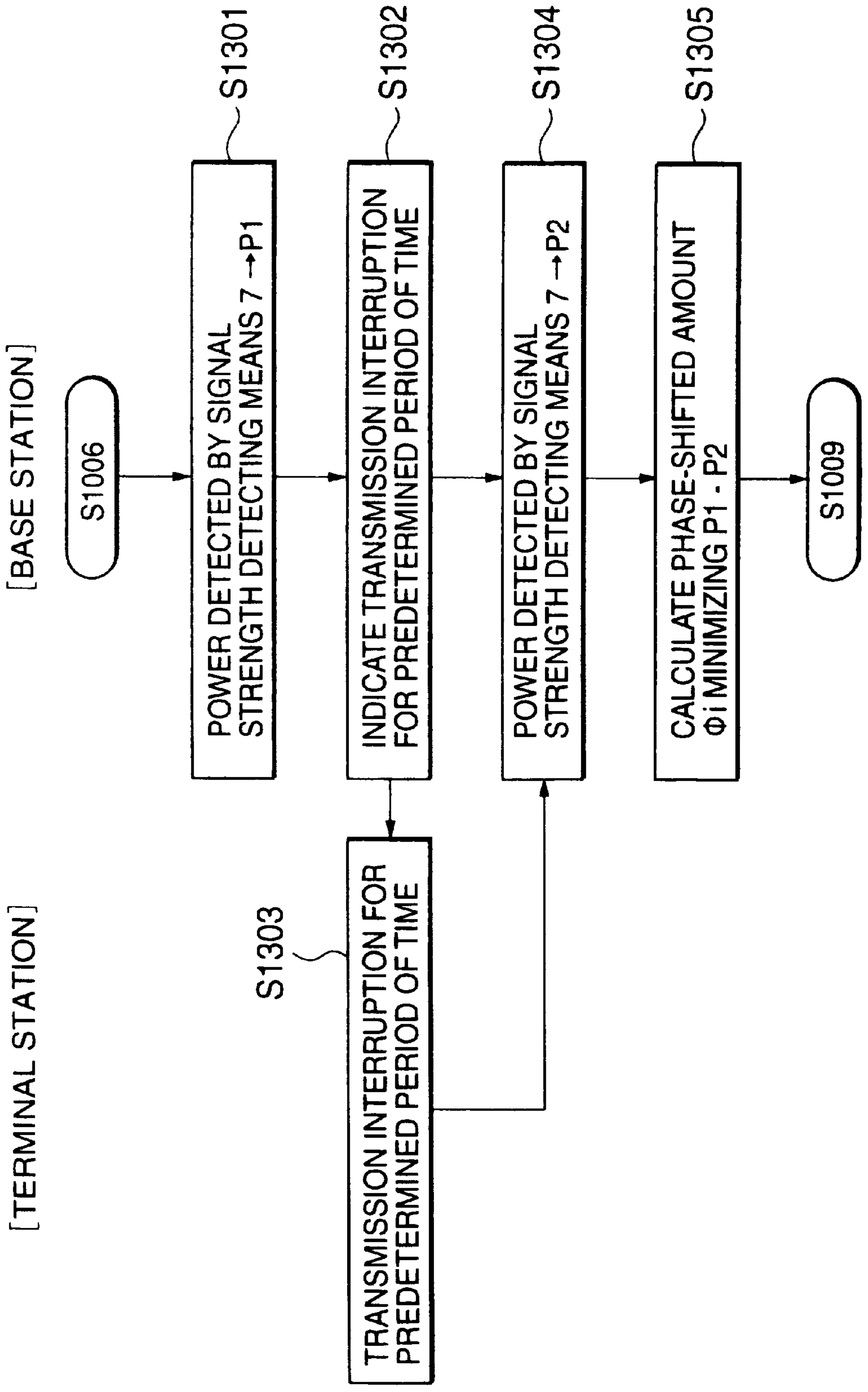
FIG. 22 is a flow chart showing the operation of the sixth preferred embodiment of an adaptive array antenna according to the present invention.

The operation of the adaptive array antenna with the above described construction will be described in detail below. FIG. 22 is a flow chart showing the operation of the adaptive array antenna. A method for setting the phase-shifted amount of the second variable phase shifter 42 will be described herein.

First, the processing at steps S1001 through S1006 is carried out by the same procedure as that in the third preferred embodiment. Then, the first strength P1 of the received signal detected by the signal strength detecting means 7 is inputted to the first signal strength storing means 141 (step S1301). Subsequently, the base station instructs a desired terminal station to interrupt transmission for a predetermined period of time, and the terminal station interrupts transmission for the predetermined period of time in accordance with the instruction (steps S1302 through S1303). In this state, the strength P2 of the received signal detected by the signal strength detecting means 7 is inputted to the second signal strength storing means 42 (step S1304). On the basis of this, a phase-shifted amount Φ2, which minimizes the difference between the first and second strengths, i.e., "P1–P2", is calculated by the phase-shifted amount operating means 331 (step S1305). Subsequently, the processing at steps S1009 through S1011 shown in FIG. 15 is carried out by the same procedure as that in the third preferred embodiment.

In the third preferred embodiment, it is supposed that only the received strengths of signals transmitted from a desired terminal station are detected by the signal strength detecting means 7 when the phase-shifted amount is calculated. Therefore, if another terminal station simultaneously transmits signals, the received strengths of signals transmitted from the other terminal station are added to the received strengths of the signals transmitted from the desired terminal station. In that case, it is not possible to accurately carry out the phase adjustment.

On the other hand, in the sixth preferred embodiment, even if signals transmitted from other terminal stations exist, when the phase-shifted amount is calculated, the received strengths of the signals transmitted from the other terminal stations are detected to remove the influence thereof, so that it is possible to accurately carry out the phase adjustment between the antenna elements.

(Seventh Preferred Embodiment)

Figure 23:
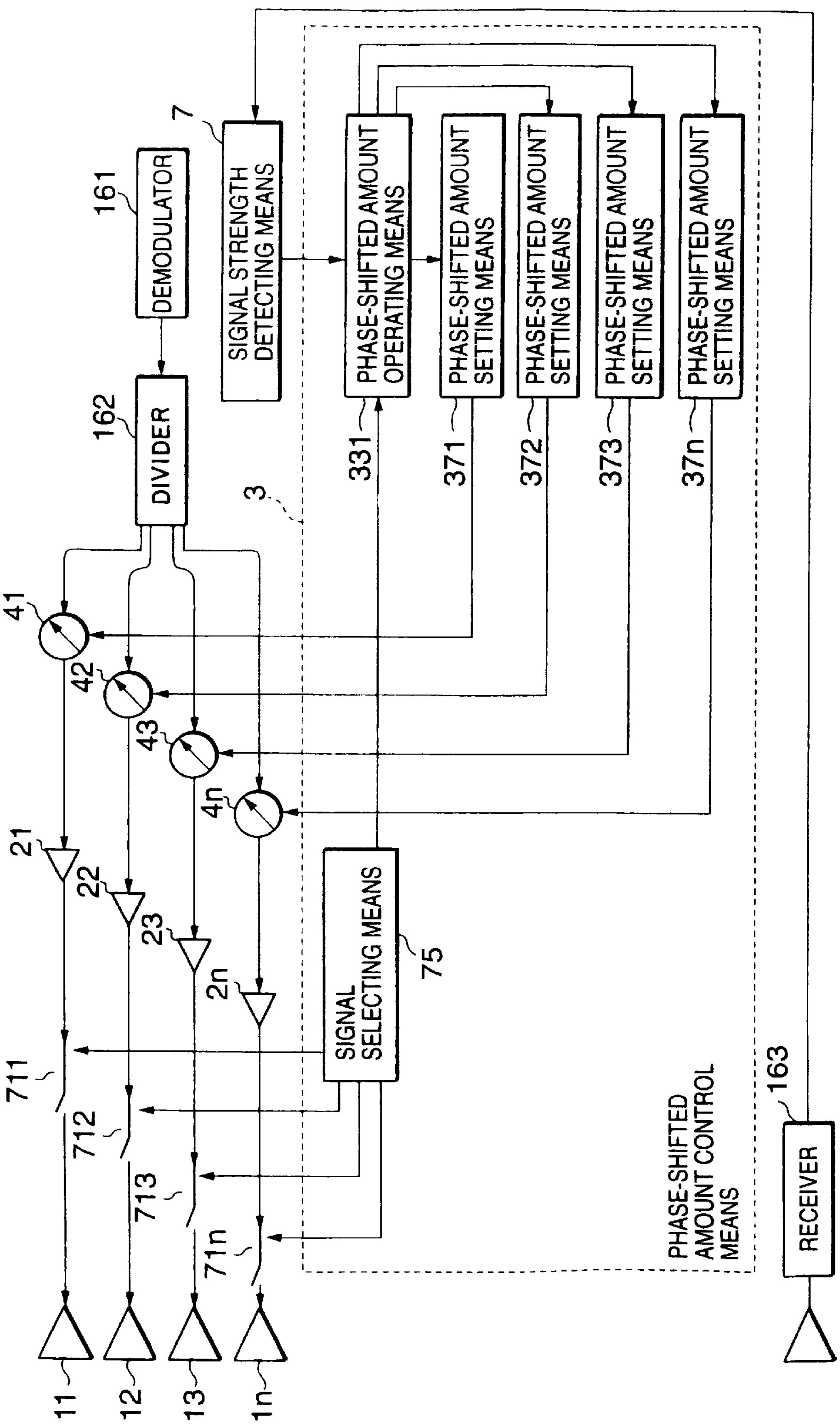
FIG. 23 is a block diagram of the seventh preferred embodiment of an adaptive array antenna according to the present invention.

FIG. 23 is a block diagram of the seventh preferred embodiment of an adaptive array antenna according to the present invention, which is used for transmission. In FIG. 23, the antenna system comprises: a transmitter 161; a divider 162 for dividing signals transmitted from the transmitter 161; variable phase shifters 41 through 4*n* for phase-controlling the distributed transmitted signals in accordance with phase-shifted amounts, each of which is set by the phase-shifted amount control means 3 which will be described later; amplifiers 21 through 2*n* for amplifying the phase-controlled transmitted signals, respectively; signal cut-off means 711 through 71*n* for passing or interrupting the amplified transmitted signal to a circuit in the subsequent stage in accordance with control signals inputted by signal selecting means 75 which will be described later; antenna elements 11 through in for transmitting the transmitted signals passing through the signal cut-off means; signal strength detecting means 7 for detecting the signal strength of the signals received in a terminal station on the basis of the notice from a terminal station communicating therewith; and phase-shifted amount control means 3 for calculating a phase-shifted amount on the basis of the strength of the detected received signal, to set the calculated phase-shifted amount to the first through n-th variable phase shifters 41 through 4*n*, respectively.

The signal strength detected by the signal strength detecting means can be obtained by, e.g., receiving the notice of the signal strength information from the terminal station by the receiver 163 and inputting the signal strength information to the signal strength detecting means 7. In the seventh preferred embodiment, the phase-shifted amount control means 3 comprises: signal selecting means 75 for setting two of the signal cut-off means 711 through 71*n* on the pass side, and the rest on the cut-off side; phase-shifted amount operating means 331 for calculating a phase-shifted amount, which minimizes the strength P of the received signal detected by the signal strength detecting means 7, on the basis of the strength P while two of the signal cut-off means 711 through 71*n* are set on the pass side and the rest is set on the cut-off side; and phase-shifted amount setting means 371 through 37*n* for setting the calculated phase-shifted amount to a variable phase shifter i ($1 \leqq i \leqq n$) connected to signal cut-off means i of the variable phase shifters 41 through 4n, which is set on the pass side by the signal selecting means 75.

Figure 24:
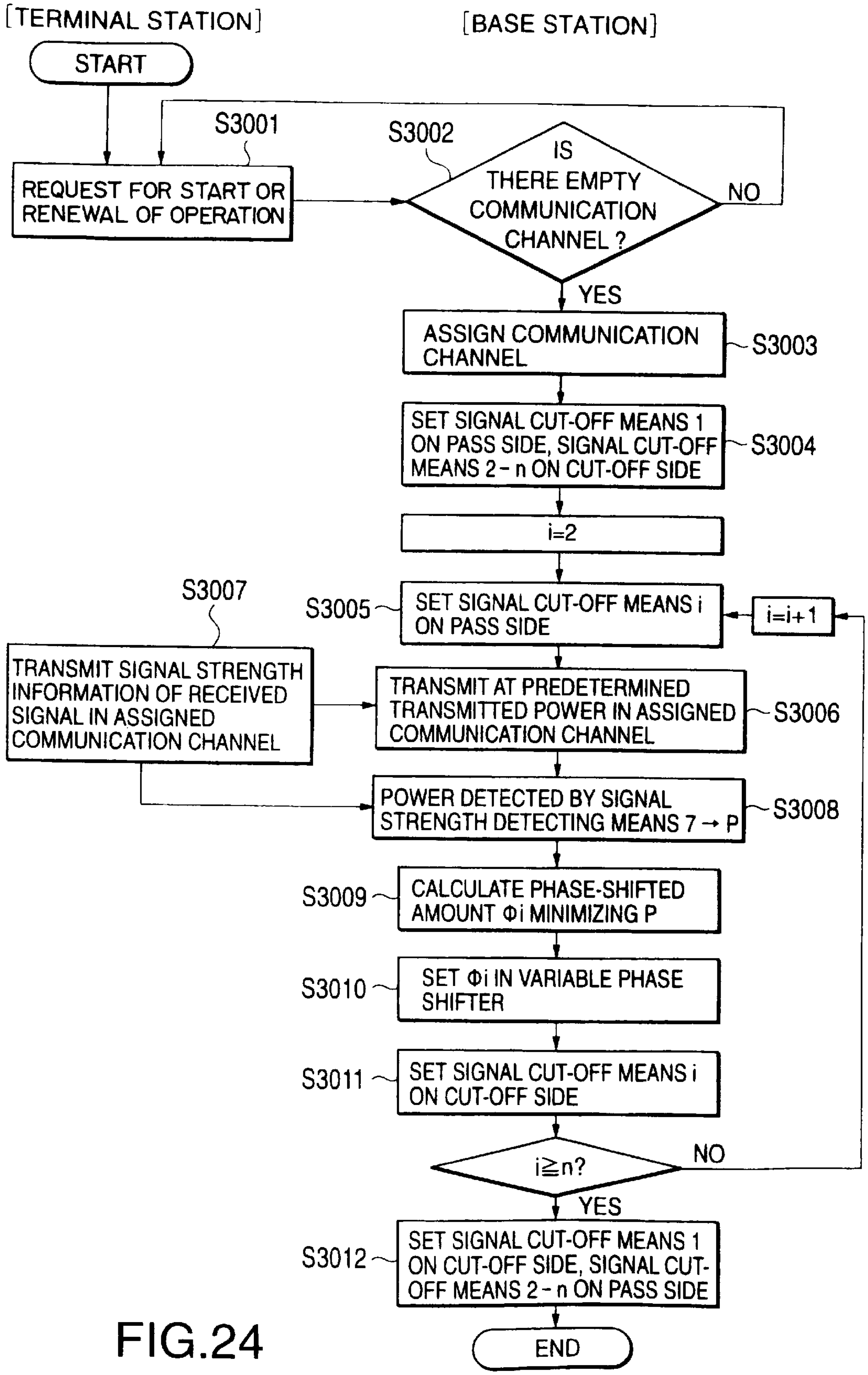
FIG. 24 is a flow chart showing the operation of the seventh preferred embodiment of an adaptive array antenna according to the present invention.

With this construction, the operation of the seventh preferred embodiment of an adaptive array antenna according to the present invention will be described below. FIG. 24 is a flow chart showing the operation of the adaptive array antenna.

When a terminal station newly starts operation, or when the existing terminal station restarts operation first after changing its position, the terminal station transmits a first control signal to a base station. When a communication channel is empty, the base station uses a second control signal to assign one or a plurality of communication channels for carrying out the subsequent transmission and receiving (steps S3001 through S3003). Subsequently, the signal selecting means 75 sets the first signal cut-off means 711 on the pass side, and the second through n-th signal cut-off means 712 through 71*n* on the cut-off side (step S3004).

The seventh preferred embodiment is characterized in that the phase-shifted amount is controlled on the basis of the signal strength of the received signal, which is detected by the signal strength detecting means 7, so that the phase of the received signal, which is phase-controlled by the second through n-th variable phase shifters 712 through 71*n*, is opposite to the phase of the transmitted signal which is phase-controlled by the first variable phase shifter 41 in the terminal station, i.e., so that the phases of the transmitted signals, which are phase-controlled by the second through n-th variable phase shifters 42 through 4*n*, are the same in the terminal station. The phase-shifted amounts which are set in the second through n-th variable phase shifters 42 through 4*n* are calculated by the phase-shifted amount control means 1003 one by one. A method for setting the phase-shifted amount of the first variable phase shifter 42 will be described herein.

The signal selecting means 75 sets the second signal cut-off means 712 on the pass side, and informs the phase-shifted amount operating means 331 of this (step S3005). Subsequently, the base station carries out transmission at a predetermined transmitted power by the assigned communication channel (step S3006). In this state, the strength P of the received signal detected by the signal strength detecting means 7 is inputted to the phase-shifted amount operating means 331 (steps S3007 through S3008). On the basis of this, a phase-shifted amount Φ2, which minimizes the strength P, is calculated by the phase-shifted amount operating means 331 (step 83009).

Subsequently, on the basis of the notice from the signal selecting means 75, the phase-shifted amount Φ2 calculated by the phase-shifted amount operating means 331 is inputted to the second phase-shifted amount setting means 372. This phase-shifted amount Φ2 is set in the second variable phase shifter 42 by the phase-shifted amount setting means 372 (step S3010). Then, the second signal cut-off means 712 is set on the cut-off side by the signal selecting means 3032 (step S3010). Then, the phase-shifted amounts of the third through n-th variable phase shifters 43 through 4*n* are set by the same procedure.

By the above described processing, the phase of the transmitted signal which is phase-controlled by each of the second through n-th variable phase shifters 42 through 4*n* is opposite to the phase of the transmitted signal which is phase-controlled by the first variable phase shifter 41. Subsequently, the signal selecting means 75 sets the first signal cut-off means 711 on the cut-off side, and the second through n-th signal cut-off means 712 through 71*n* on the pass side (step S3011).

By the above described processing, the phases Of the received signals which are phase-controlled by the second through n-th variable phase shifters 42 through 4*n* are the same in the terminal station, so that the signals transmitted from the base station can be in-phase received by the terminal station. For example, if the calculated phase-shifted amount has been stored, this can also be used when a call restarts after a call ends.

(Eighth Preferred Embodiment)

The eighth preferred embodiment of an adaptive array antenna according to the present invention will be described below. The block diagram of the eighth preferred embodiment of an adaptive array antenna according to the present invention is the same as that of FIG. 23 showing the seventh preferred embodiment.

The difference between the eighth preferred embodiment and the seventh preferred embodiment is that, in the eighth preferred embodiment, after step S3012 in the seventh preferred embodiment, a new phase-shifted amount is set in the first variable phase shifter 41, the optimum phase-shifted amount to be set is determined, and the signals transmitted by the first antenna element are also used when the base station transmits signals.

Figure 25:
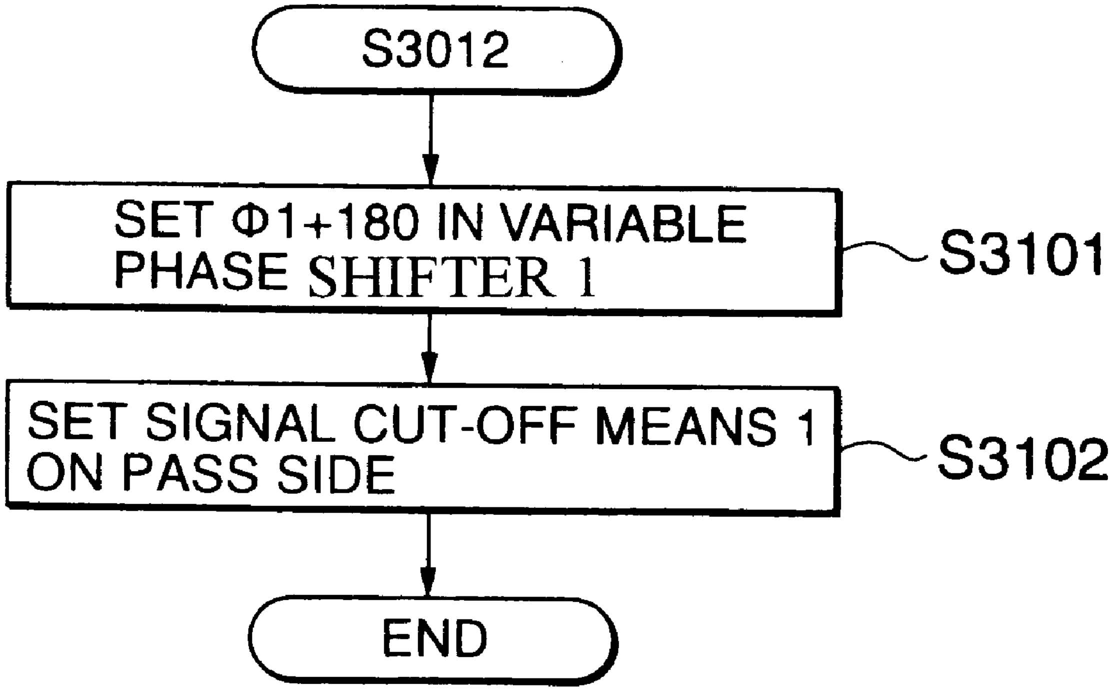
FIG. 25 is a flow chart showing the operation of the eighth preferred embodiment of an adaptive array antenna according to the present invention.

The operation of the eighth preferred embodiment will be described in detail below. FIG. 25 is a flow chart showing the operation of the adaptive array antenna.

The processing at steps S3001 through S3012 is carried out by the same procedure as that in the seventh preferred embodiment. Subsequently, a phase-shifted amount obtained by increasing the phase-shifted amount Φ1, which is currently set in the first variable phase shifter 41, by 180 degrees is set in the first variable phase shifter 41 by the first phase-shifted amount setting means 371 (step S3101). Then, the first signal cut-off means 711 is set on the pass side by the signal selecting means 75 (step S3102).

By the above described processing, the phases of the transmitted signals which are phase-controlled by the second through n-th variable phase shifters 42 through 4*n* are the same, so that it is possible to increase the directional gain with respect to the base station.

As described above, according to the eighth preferred embodiment of the present invention, it is possible to increase the directional gain with respect to the terminal station by also using the signals transmitted by the first antenna element 11 when the base station transmits signals.

(Ninth Preferred Embodiment)

Figure 26:
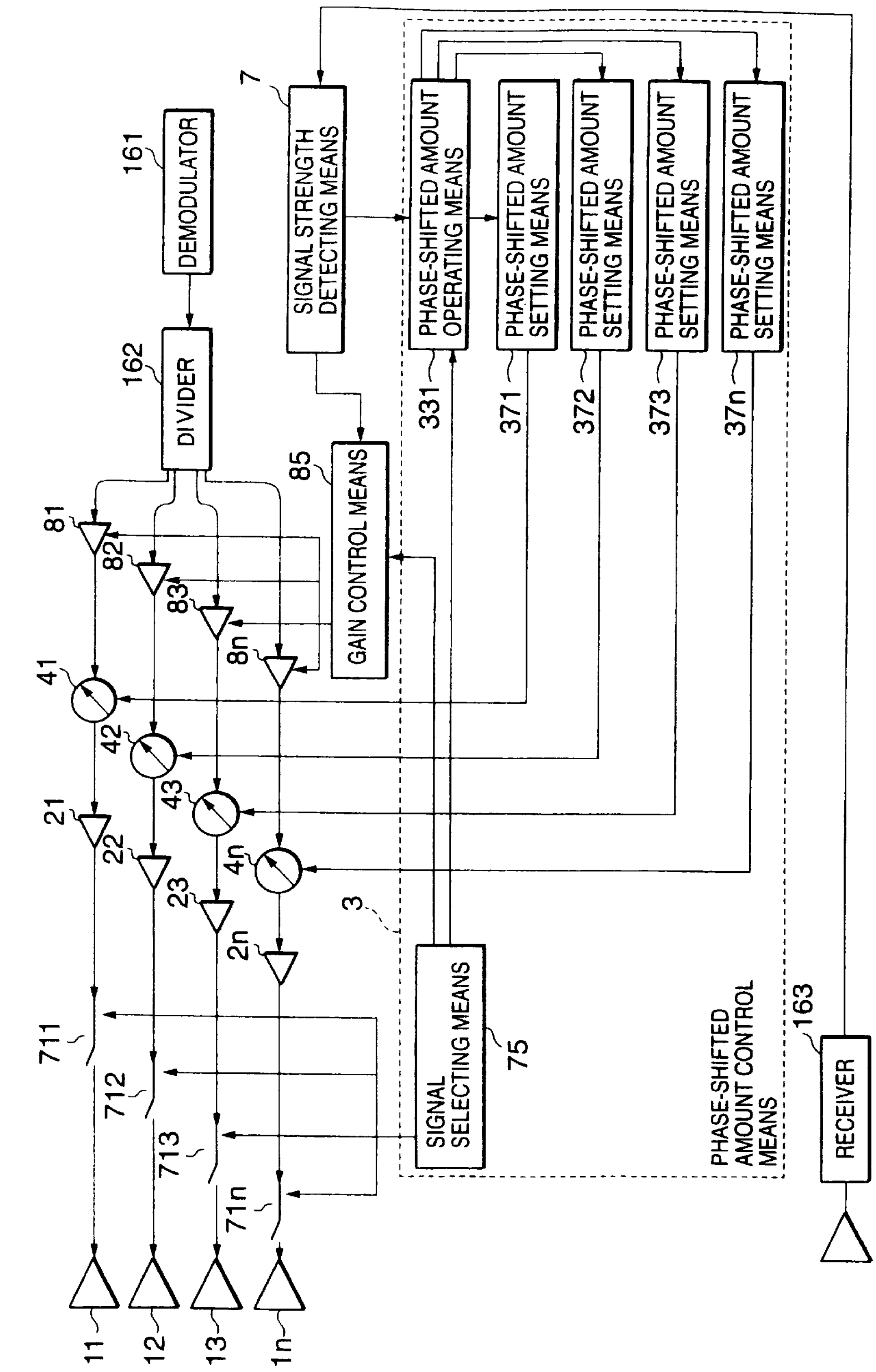
FIG. 26 is a block diagram of the ninth preferred embodiment of an adaptive array antenna according to the present invention.

The ninth preferred embodiment of an adaptive array antenna according to the present invention will be described below. FIG. 26 is a block diagram of the ninth preferred embodiment of an adaptive array antenna according to the present invention.

The difference between the ninth preferred embodiment and the seventh preferred embodiment is that the ninth preferred embodiment uses variable gain circuits and gain control means. In FIG. 26, the adaptive array antenna comprises: variable gain circuits 81 through 8*n* for amplifying transmitted signals which are distributed by the divider 162 in accordance with control signals inputted from the outside and for inputting the amplified transmitted signals to the respective variable phase shifters 41 through 4*n*; gain control means 85 for setting the gains of the variable gain circuits 81 through 8*n* so that the strengths of the transmitted signals which are amplified by the variable gain circuits 81 through 8*n* on the basis of the strengths of the received signals detected by the signal strength detecting means 7 are equal to each other in the terminal station. Since other constructions are the same as those in the seventh preferred embodiment shown in FIG. 23, the same reference numbers are used for the same or corresponding elements to omit the duplicate descriptions thereof.

Figure 27:
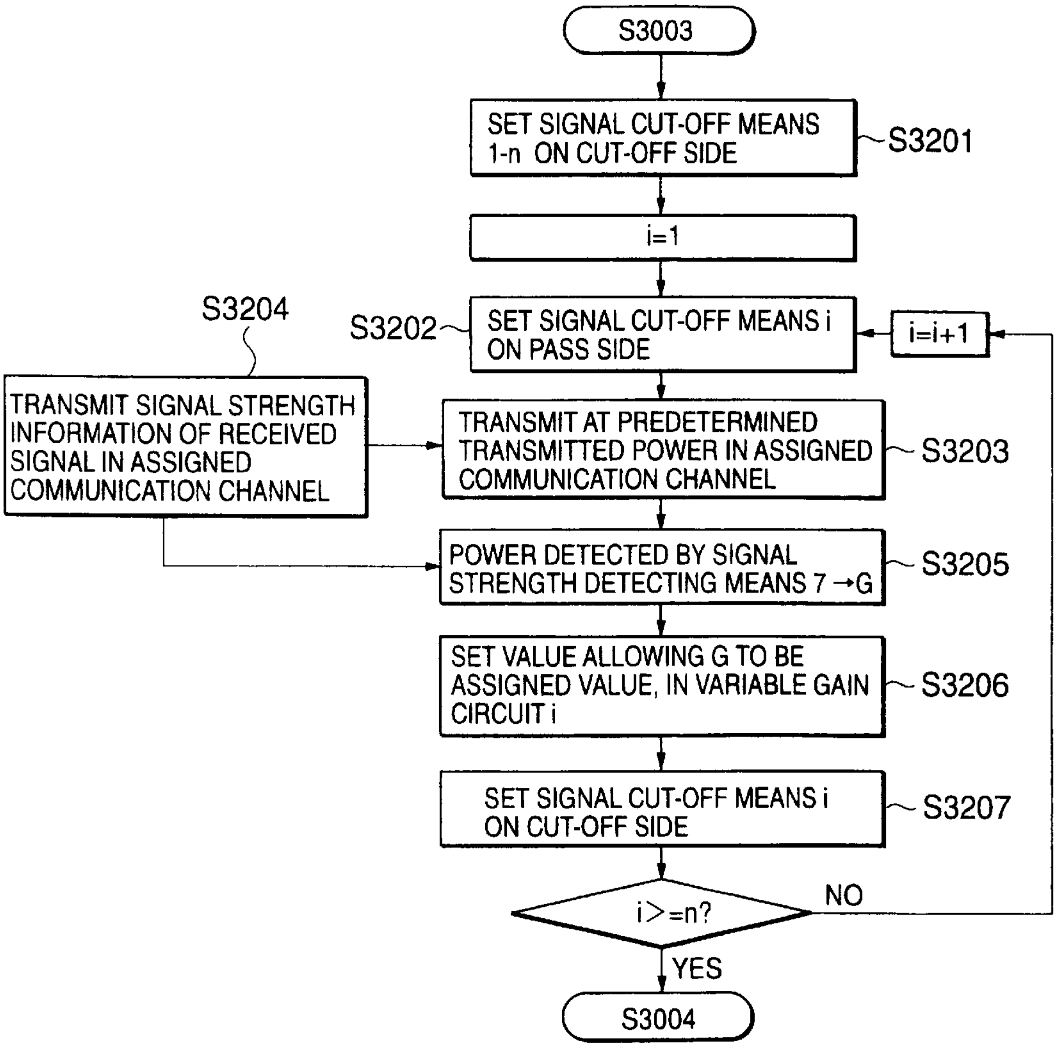
FIG. 27 is a flow chart showing the operation of the ninth preferred embodiment of an adaptive array antenna according to the present invention.

The operation of the adaptive array antenna with the above describe construction will be described in detail below. FIG. 27 is a flow chart showing the operation of the ninth preferred embodiment of an adaptive array antenna according to the present invention.

The processing at steps S3001 through S3003 is carried out by the same procedure as that in the seventh preferred embodiment. Subsequently, the first through n-th signal cut-off means 711 through 71*n* are set on the cut-off side by the signal selecting means 75 (step S3201).

The ninth preferred embodiment is characterized in that the gain control of the variable gain circuits 81 through 8*n* is carried out on the basis of the signal strengths of the received signals detected by the signal strength detecting means 7 so that the strengths of the transmitted signals amplified by the variable gain circuits 81 through 8*n* are equal to each other in the terminal station. The gains to be set in the first through n-th variable gain circuits 81 through 8*n* are set by the gain control means 85 one by one. A method for setting the gain of the first variable gain circuit 81 will be described herein.

The signal selecting means 75 sets the first signal cut-off means 711 on the pass side, and informs the gain control means 85 of this (step S3202). Subsequently, the base station transmits signals at a predetermined transmitted power by an assigned communication channel (step S3203). In this state, the strength G of the received signal detected by the signal strength detecting means 7 is inputted to the gain control means 3009 (steps S3204 through S3205). On the basis of this, the gain of the first variable gain circuit 81 is set by the gain control means 85 so that the strength of the transmitted signal amplified by the first variable gain circuit 81 is a predetermined value (step S3206). Subsequently, the first signal cut-off means 71*l* is set on the cut-off side by the signal selecting means 75 (step S3207). Then, the gains of the second through n-th variable gain circuits 82 through 8n are set by the same procedure. Finally, the processing at steps S3004 through S1012 is carried out by the same procedure as that in the seventh preferred embodiment.

In the seventh preferred embodiment, it is assumed that the signal strengths of the signals transmitted by the respective antenna elements are the same in the terminal station. However, it is supposed that the signal strengths of the signals transmitted by the respective antenna elements are different under the influence of the reflection of the signals transmitted from the terminal station and the influence of the deviation in the amplifiers connected to the respective antenna elements. In that case, it is not possible to accurately carry out the phase adjustment between the antenna elements for the same reason as that in the fifth preferred embodiment.

On the other hand, in the ninth preferred embodiment, even if the signal strengths of the signals transmitted by the respective antenna elements are different, the gain control of the first through n-th variable gain circuits 81 through **8*n* is carried out so that the strengths of the transmitted signals, which are amplified by the first through n-th variable gain circuits 81 through 8*n*** before the optimum phase-shifted amount is determined, are equal to each other in the terminal station. Therefore, it is possible to accurately carry out the phase adjustment between the antenna elements.

(Tenth Preferred Embodiment)

Figure 28:
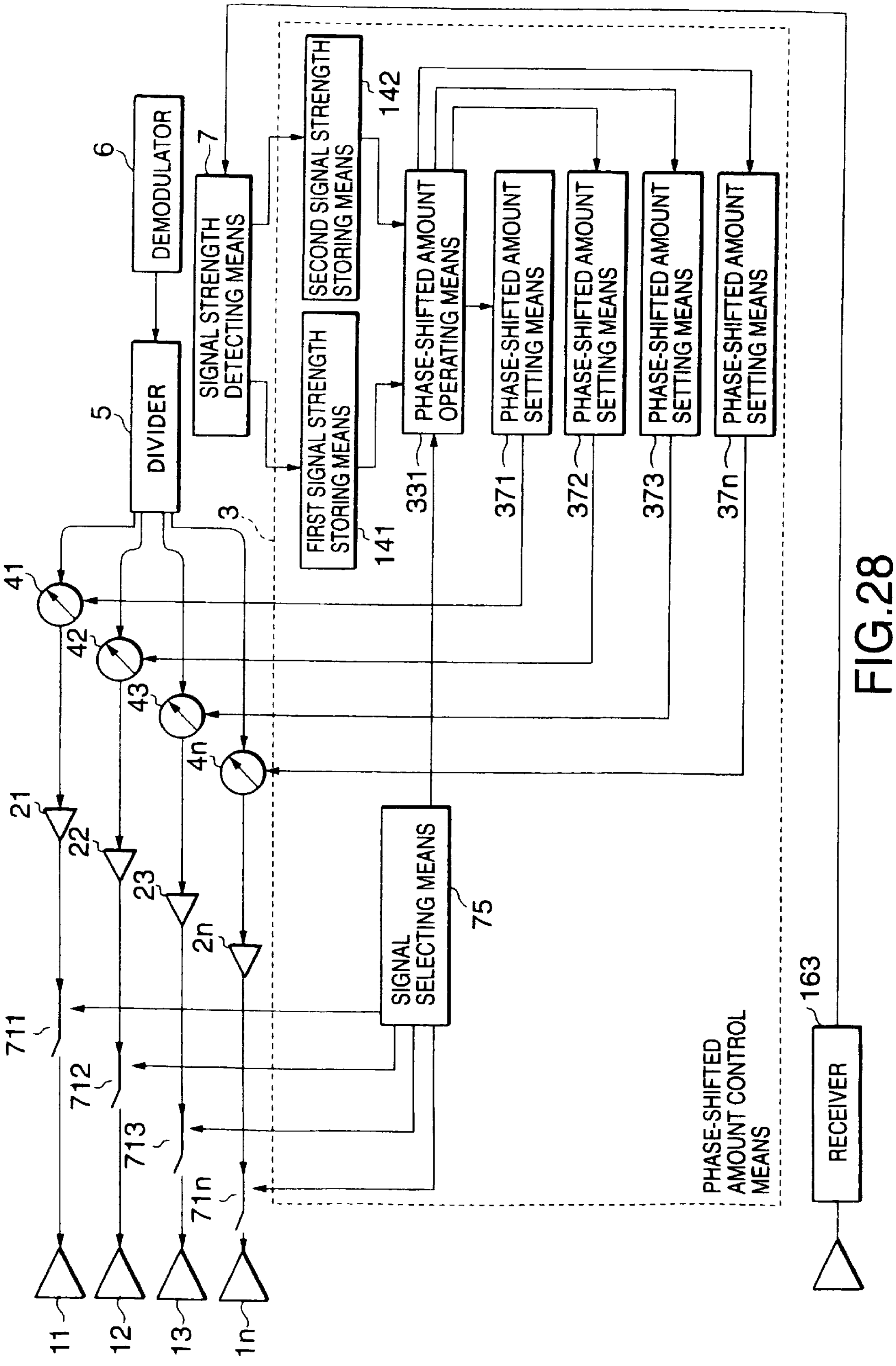
FIG. 28 is a block diagram of the tenth preferred embodiment of an adaptive array antenna according to the present invention.

The tenth preferred embodiment of an adaptive array antenna according to the present invention will be described below. FIG. 28 is a block diagram of the tenth preferred embodiment of an adaptive array antenna according to the present invention.

Similar to the construction of the sixth preferred embodiment shown in FIG. 21 on the receiving side with respect to the fifth preferred embodiment shown in FIG. 18, the difference between the tenth preferred embodiment and the seventh preferred embodiment is that the tenth preferred embodiment comprises first signal strength storing means 141 and second signal strength storing means 142, and uses phase-shifted amount operating means 331 for operating a phase-shifted amount on the basis of the first and second phase-shifted amount storing means 141 and 142. In FIG. 28, the adaptive array antenna comprises: first signal strength storing means 141 for storing a first strength P1 of a received signal detected by the signal strength detecting means 7 while the base station is transmitting; second signal strength storing means 142 for storing a second strength P2 of a received signal detected by the signal strength detecting means 7 while the base station does not transmit; and phase-shifted amount operating means 331 for calculating a phase-shifted amount, which minimizes the difference "P1–P2" between the first and second strengths P1 and P2, on the basis of the first and second strengths P1 and P2 while two of the first through n-th signal cut-off means 711 through 71n are set on the pass side and the rest is set on the cut-off side. Since other constructions are the same as those in FIG. 23, the same reference numbers are used for the same or corresponding elements to omit the duplicate descriptions thereof.

Figure 29:
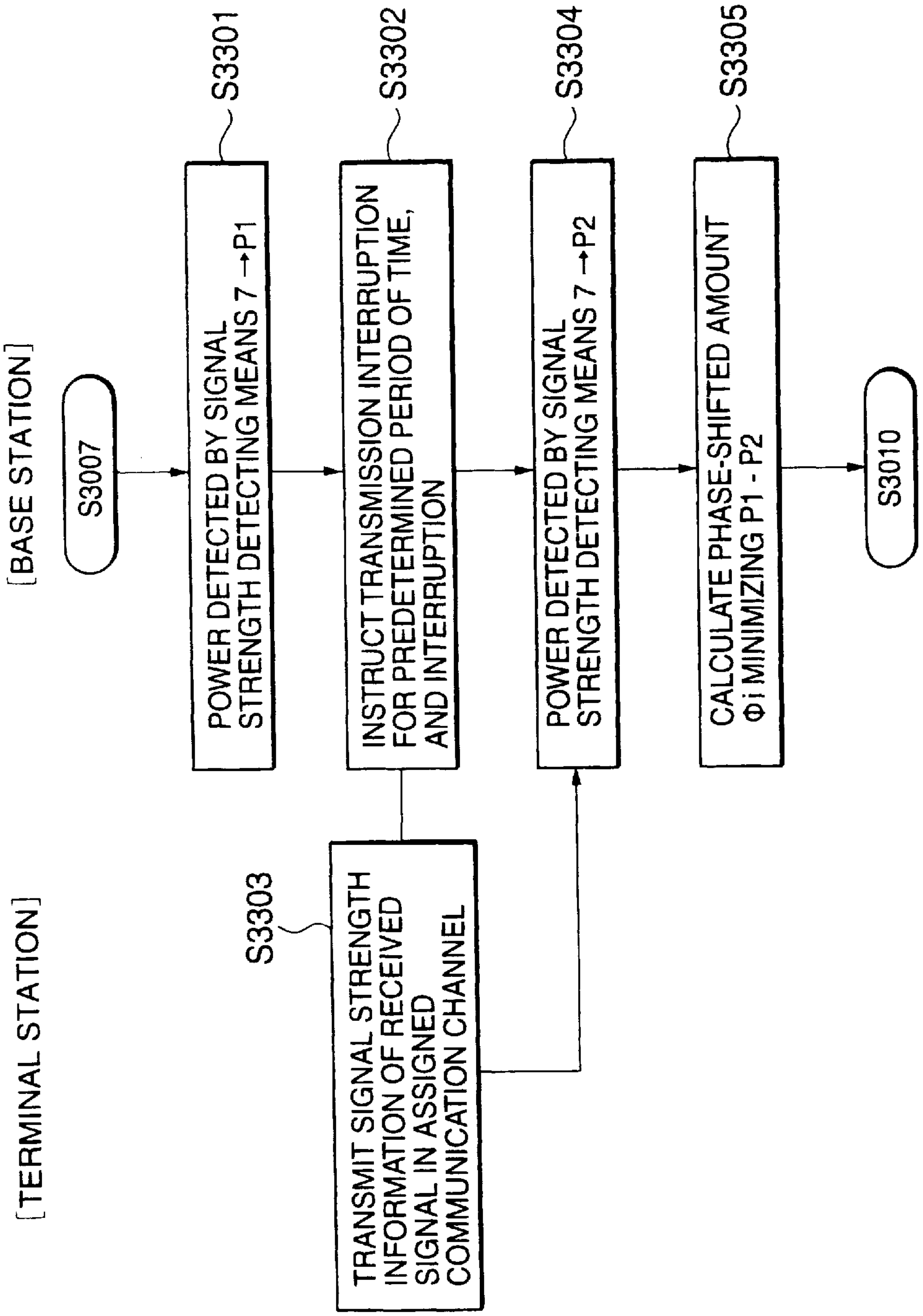
FIG. 29 is a flow chart showing the operation of the tenth preferred embodiment of an adaptive array antenna according to the present invention.

With this construction, the operation of the adaptive array antenna will be described in detail below. FIG. 29 is a flow chart showing the operation of the adaptive array antenna. A method for setting the phase-shifted amount of the second variable phase shifter 42 will be described herein.

First, the processing at steps S3001 through S3007 is carried out by the same procedure as that in the seventh preferred embodiment. Subsequently, the first strength P1 of the received signal detected by the signal strength detecting means 7 is inputted to the first signal strength storing means 141 (step S3301). Subsequently, the base station instructs a desired terminal station to interrupt transmission for a predetermined period of time, and the terminal station interrupts transmission for the predetermined period of time (step S3303). In this state, the strength P2 of the received signal detected by the signal strength detecting means 7 is inputted to the second signal strength storing means 142 (steps S3303 through S3304). On the basis of this, a phase-shifted amount Φ2, which minimizes the difference "P1–P2" between the first and second strengths P1 and P2, is calculated by the phase-shifted amount operating means 331 (step S3305). Subsequently, the processing at steps S3010 through S3012 is carried out by the same procedure as that in the seventh preferred embodiment.

In the above described adaptive array antenna in the seventh preferred embodiment, it is supposed that only the signals transmitted from the base station are received by the terminal station when the phase-shifted amount is calculated. Therefore, if another interference station transmits simultaneously, the signal strength of the received signals detected by the signal strength detecting means 3007 is the sum of the received strength of the signal transmitted from the base station and the received strength of the signal transmitted from the interference station. In that case, it is not possible to accurately carry out the phase adjustment.

On the other hand, in the adaptive array antenna in the tenth preferred embodiment, even if signals transmitted from the interference station exist, when the phase-shifted amount is calculated, the received strengths of signals, which are transmitted from the interference station, in the terminal station are detected to remove the influence thereof, so that it is possible to accurately carry out the phase adjustment between the antenna elements.

(Eleventh Preferred Embodiment)

Figure 30:
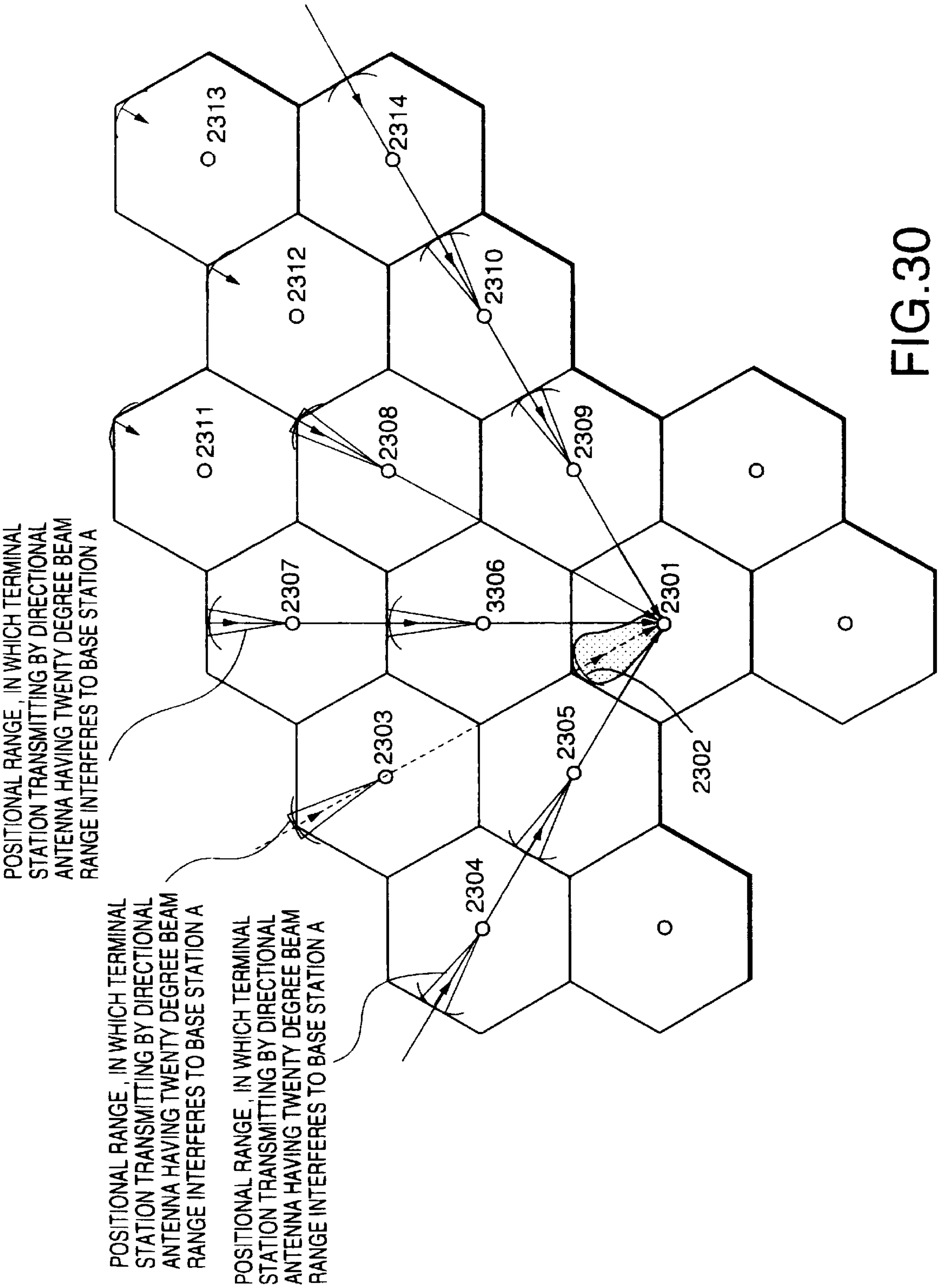
FIG. 30 is a diagram showing the eleventh preferred embodiment of an adaptive array antenna according to the present invention.

Referring to FIG. 30, the eleventh preferred embodiment of the present invention will be described below. FIG. 30 shows the eleventh preferred embodiment of an adaptive array antenna according to the present invention.

Considering a time zone wherein a radio base station 2301 communicates with a terminal station 2302, there is adopted an algorithm for controlling beams by attaching no constraint conditions, which direct the null, to another radio base station 2303 in the same direction as that of the terminal station 2302 viewed from the radio base station 2301, and attaching constraint conditions, which direct the null, to other radio base stations 2304, 2305, 2306, 2307, 2308, 2309 and 2310, which are arranged relatively in the vicinity of the base station 2301 and in an angular range capable of changing the directivity of the adaptive array antenna provided in the base station 2301.

In particular, in the case of a subscriber radio access system, an interference signal from a terminal communicating with another base station is generated at a burst at random timing which can not be predicted. In many cases, the interference signal is generated in tens to hundreds symbols as the number of transmission symbols, i.e., at a very short period of time of several micro seconds to tens micro seconds. As conventional control methods, in order to carry out a control using a digital signal processing for sequentially detecting interference waves from a certain terminal in another cell and the incoming directions thereof to direct the null with respect to the direction of the terminal, it is required to provide a very high signal processing speed. On the other hand, in the case of the adaptive array antenna in the eleventh preferred embodiment, it is possible to rapidly determine the constraint direction of the null by previously acquiring the positional information for other base stations, and by detecting the direction of a terminal station communicating with the self-base station at a first call stage by utilizing that the outline of the interference wave incoming direction can be acquired if the terminal uses a directional antenna, or by quoting the positional information for other base stations from a previously registered data base. Thus, there is an advantage in that it is possible to reduce the control processing during communication. In addition, since it is not particularly required to change the beam control with respect to the slot assigned to the terminal during communication with the terminal, there is also an advantage in that the quantity of calculation processing for the control during communication is far smaller than that in the method for sequentially detecting interference waves.

Furthermore, in the case of a cellular type radio communication system generally using the time division duplex (TDD), if the time division multiple Access (TDMA) synchronism of the base stations with each other is not established, there is considered a method for detecting the incoming direction of an interference wave from the base station in accordance with the level of the interference wave to adaptively suppress this. On the other hand, the adaptive array antenna in the eleventh preferred embodiment has specific effects that the adaptive array antenna can also be applied to a case where the frequency division duplex (FDD) is used as a doubling system and that a simple control can be carried out. In particular, in the case of a radio communication system using the FDD as the doubling system, even if the synchronism in the time division multiplex between base stations is not established, the frequency transmitted from the base station does not cause interference in the receiving of the base station, so that constraint conditions are not added to the directions of other base stations in conventional interference inhibiting algorithm. Also in the system using the FDD, when the terminal side uses a directional antenna, if constraint conditions for the directions of other base stations are used as the control method in the eleventh preferred embodiment, it is not required to detect signals from individual interference terminals, so that it is possible to carry out a very rapid control.

Furthermore, as can be understood from FIG. 30, the base stations 2304 and 2305, 2306 and 2307, and 2309 and 2310 are arranged in near directions viewed from the base station 2301. In such a case, the number of constraint conditions can be decreased by using a method for adding only the direction of a base station, which can be presumed that the level of the interference wave is maximum, of a plurality of other base stations, to the constraint conditions in addition to propagation conditions, such as the gain and distance of the adaptive array antenna, and the status of unobstructed view to a corresponding base station, or adding a direction, which is obtained by weighting and averaging the above described conditions of a plurality of base stations, to the constraint conditions, or adding the substantially center between both ends of the directions of the plurality of base stations to the constraint conditions.

Furthermore, there is a weak probability that a terminal communicating with a far base station cause interference. In addition, the number of nulls capable of forming an array antenna having N_el antenna elements is generally N_el to be limited. Therefore, it is suitably assumed that the number of the directions having the constraint conditions is less than N_el, and if necessary, the constraint conditions are suitably provided preferentially from a base station wherein it can be presumed that the level of he interference wave including the propagation conditions, such as the gain and distance of the adaptive array antenna and the status of unobstructed view to the corresponding base station, increases. Therefore, in the case of the eleventh preferred embodiment, no constraint conditions are provided for base stations 2311, 2312, 2313 and 2314 of other base stations.

Figure 1:
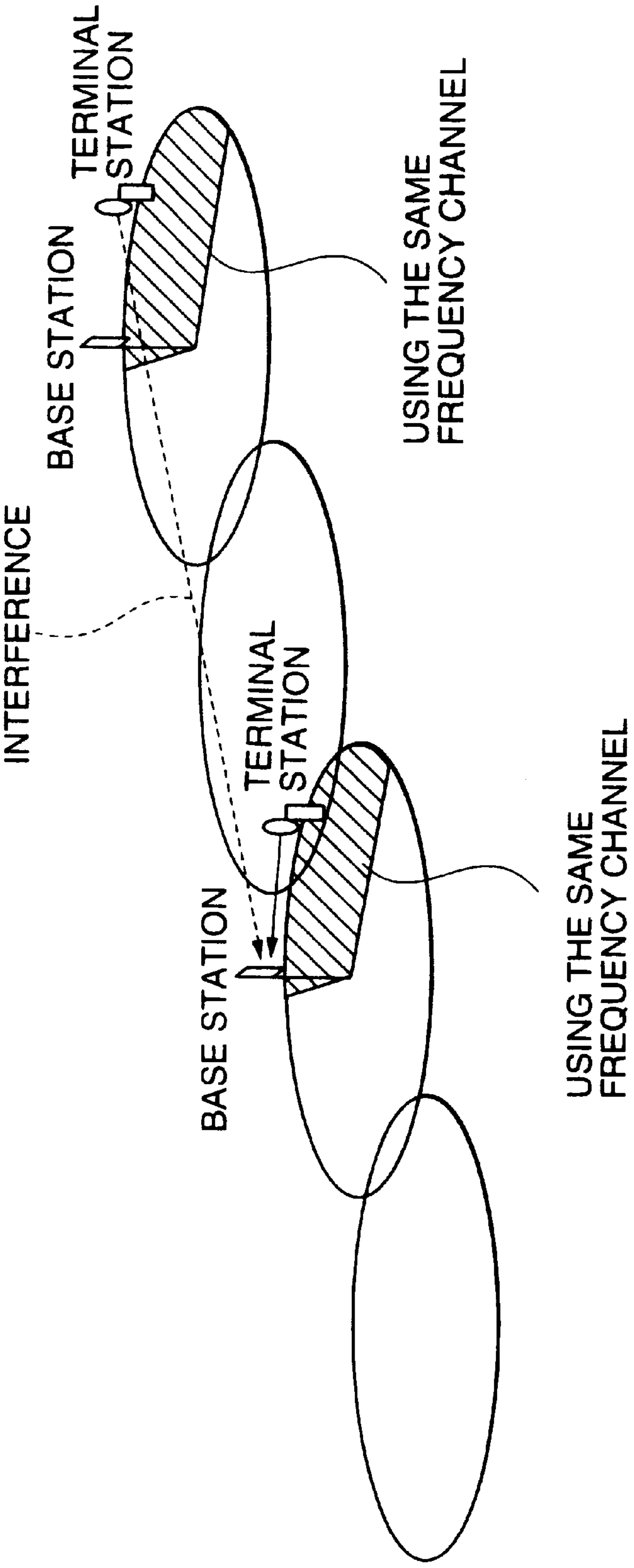
FIG. 1 is an illustration of a WLL of a typical PTMP form.
Figure 2:
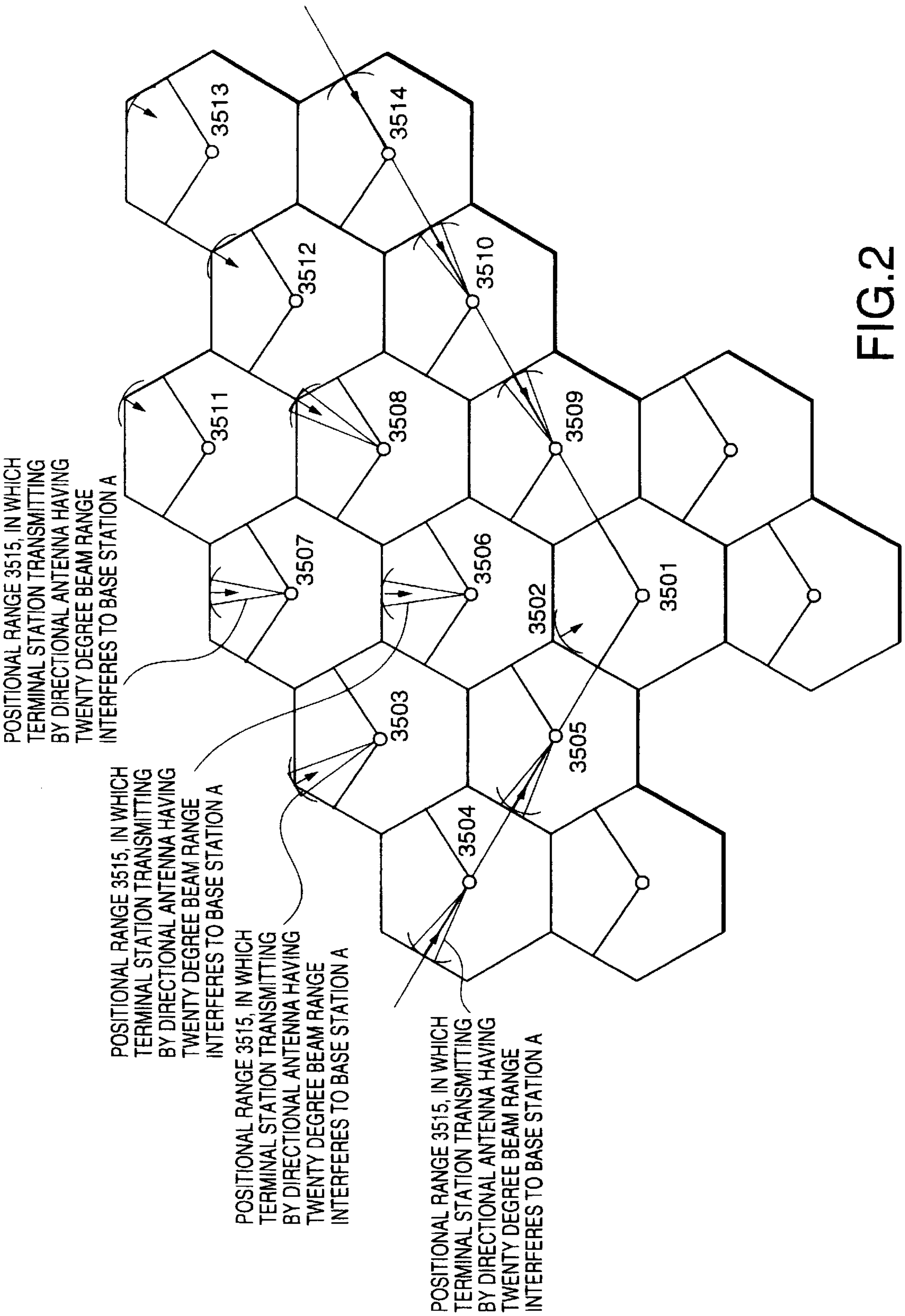
FIG. 2 is a diagram showing the incoming status of an interference wave when a sector antenna having a half angle of 120 degrees is used.
Figure 3:
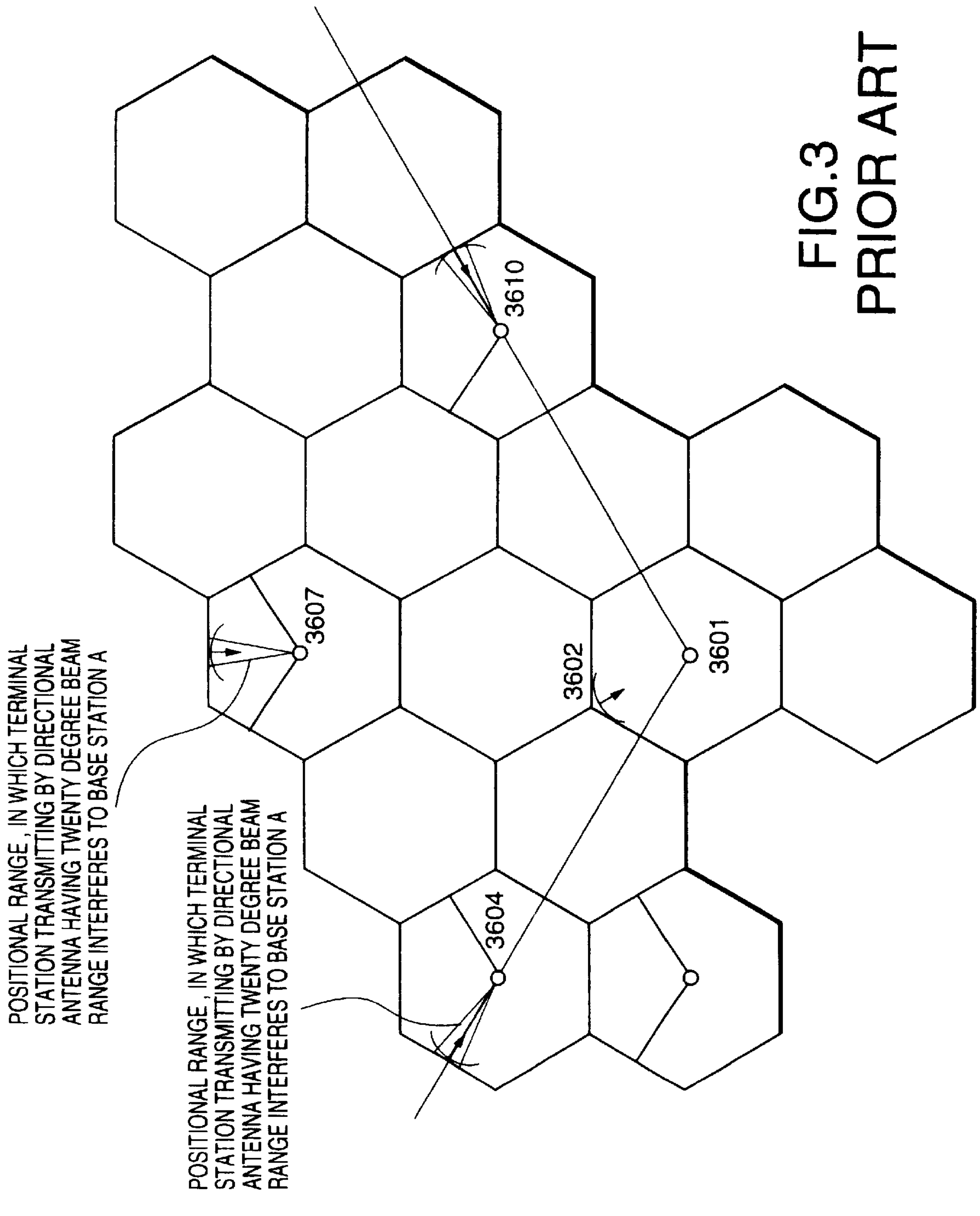
FIG.3 PRIOR ART
FIG. 3 is a diagram showing the incoming status of an interference wave in the case of a conventional 4-cell frequency repetition.
Figure 4:
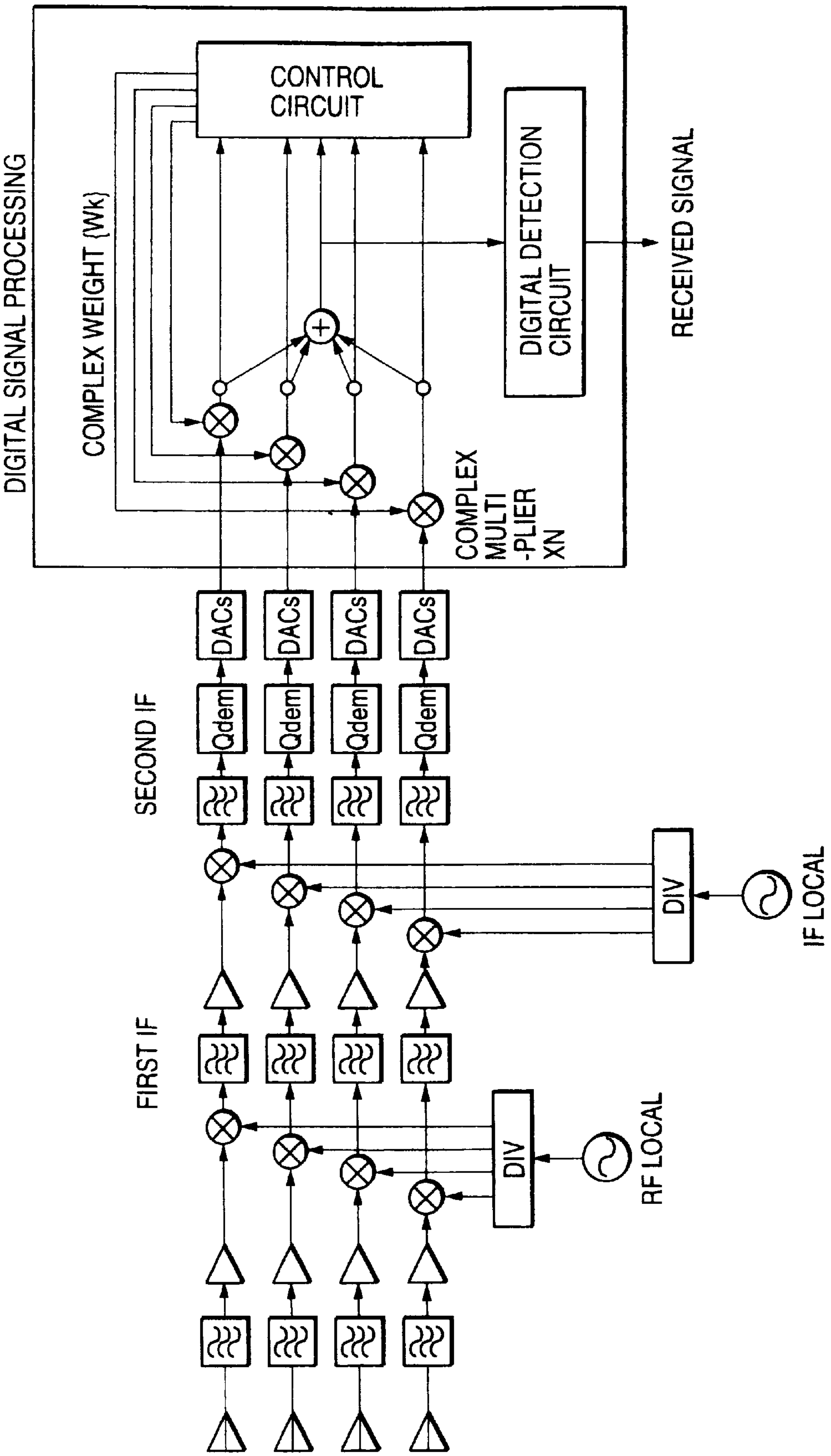
FIG.4 PRIOR ART
FIG. 4 is a diagram showing a conventional DBF type adaptive antenna.
Figure 5:
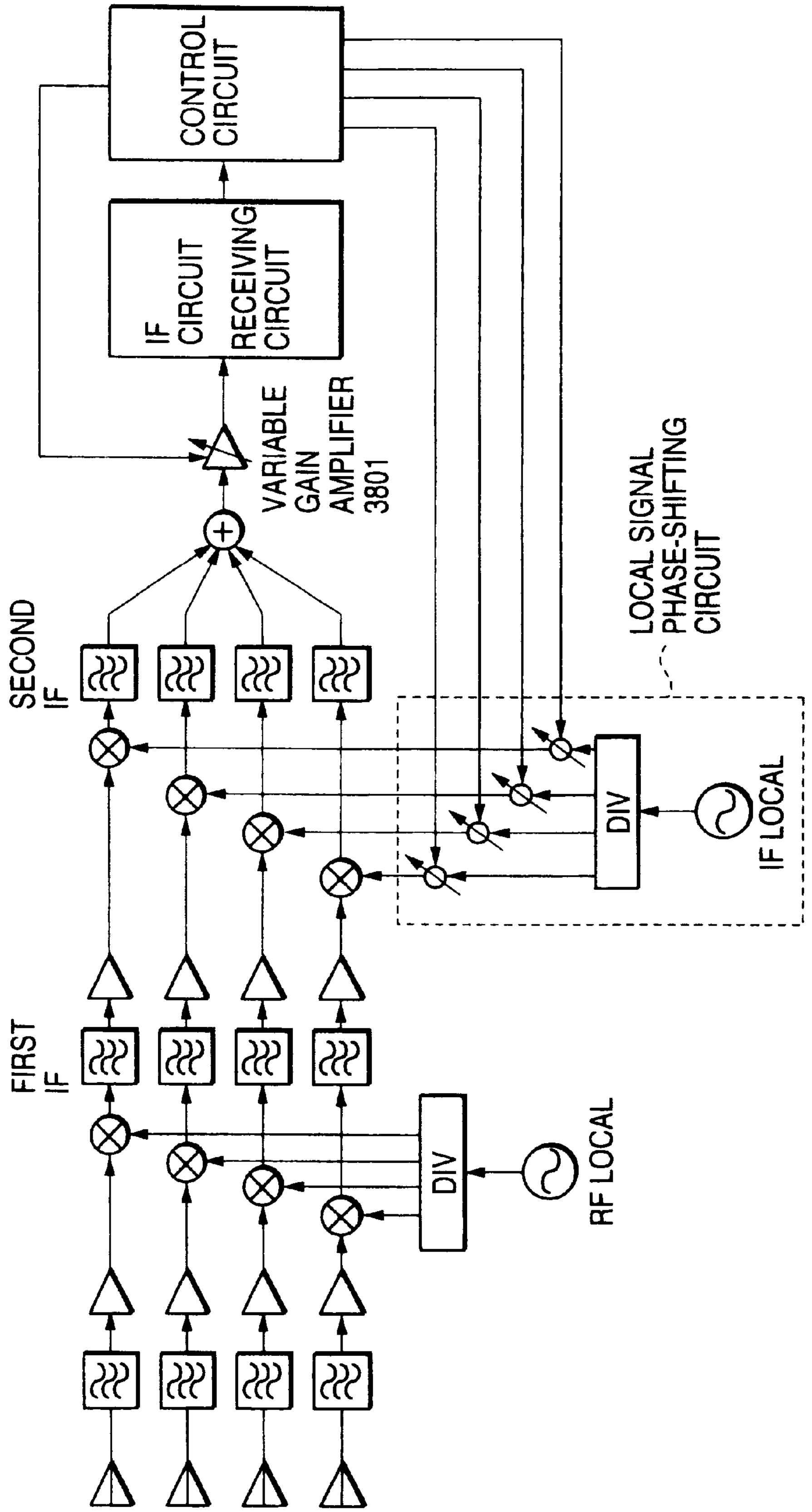
FIG.5 PRIOR ART
FIG. 5 is a diagram showing a conventional adaptive antenna wherein a variable gain amplifier for AGC is provided in an output after combining.
Figure 6:
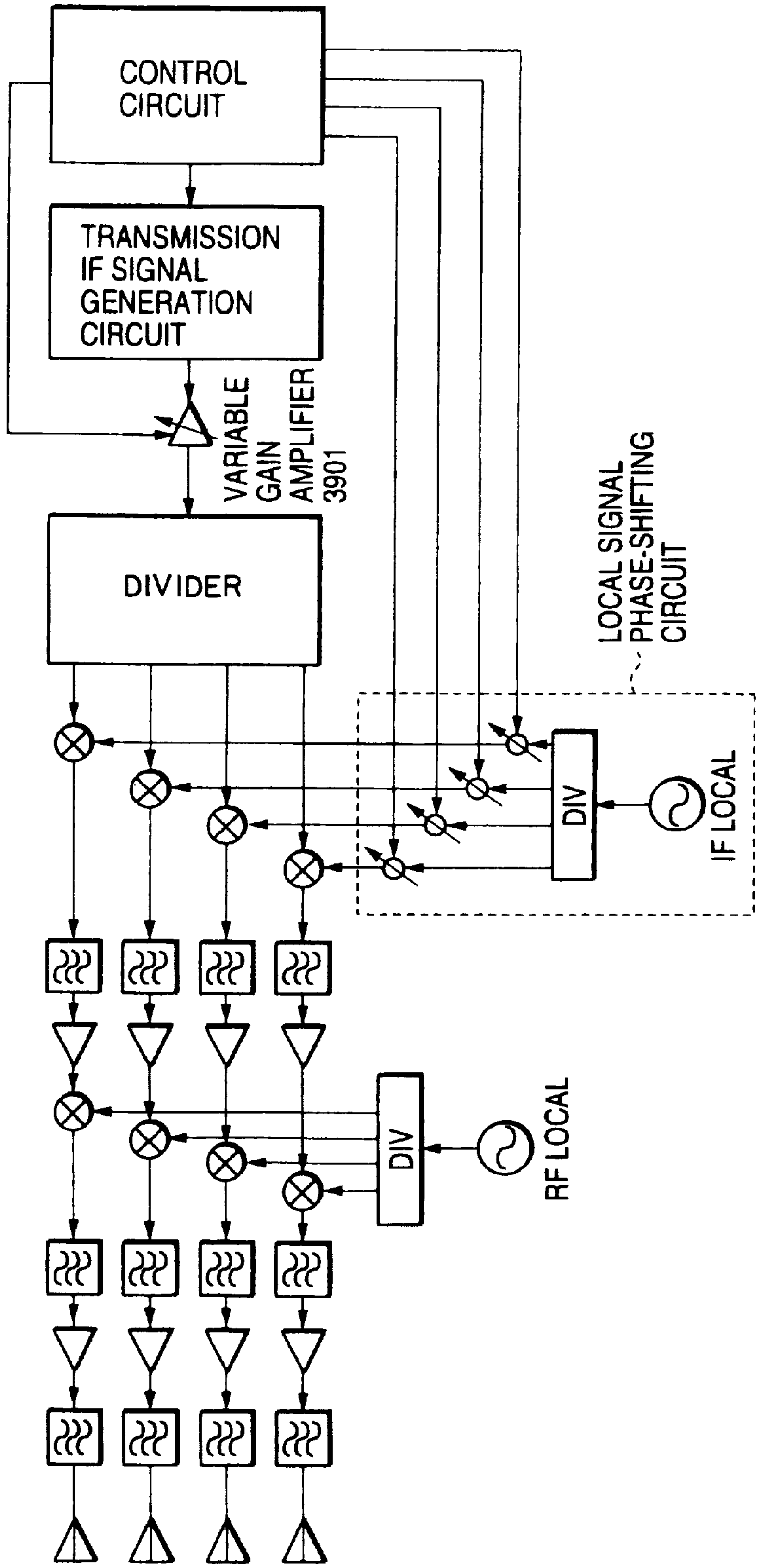
FIG.6 PRIOR ART
FIG. 6 is a diagram showing a conventional adaptive antenna for transmission wherein a variable gain amplifier is provided before division.
Figure 7:
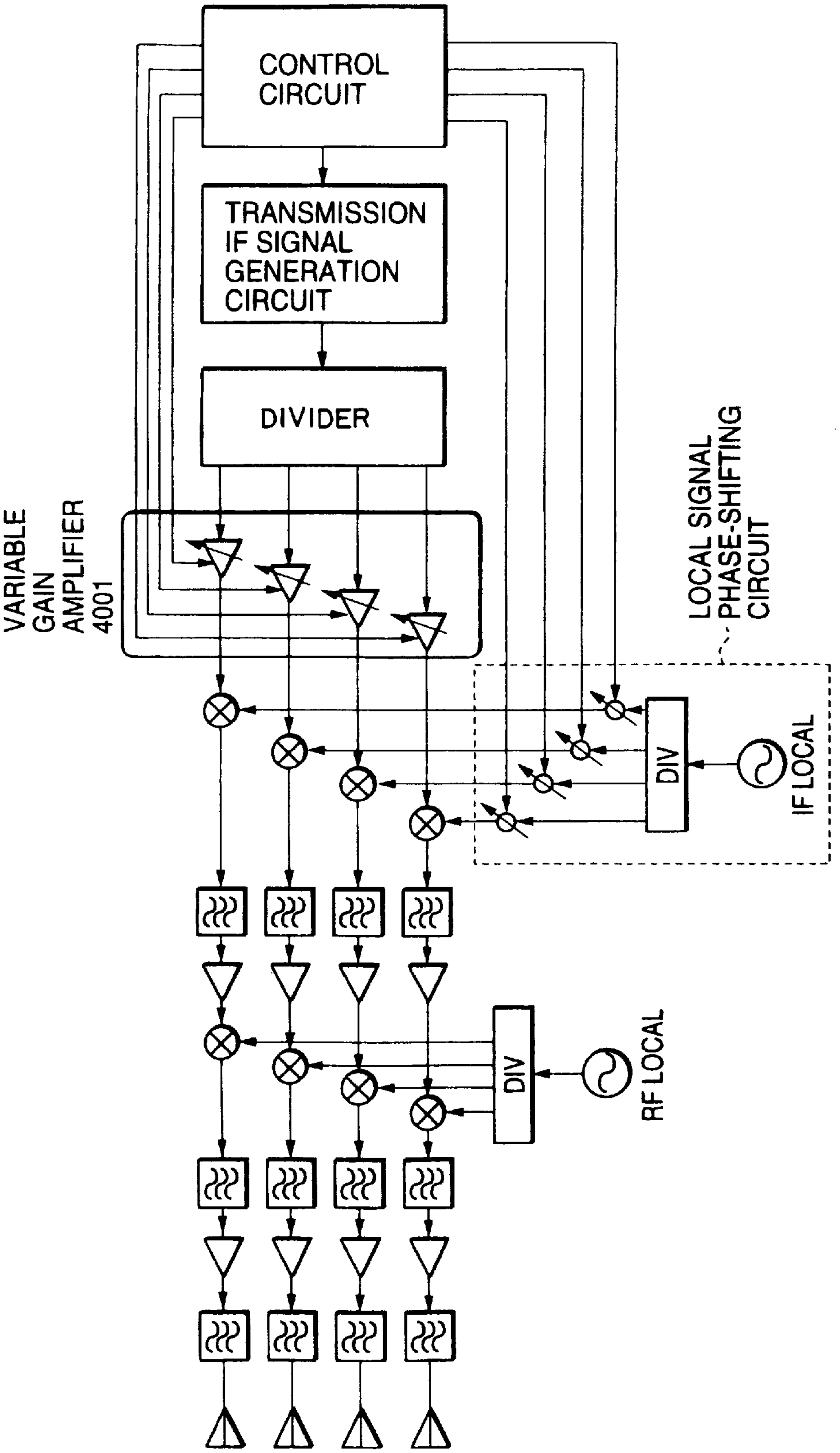
FIG.7 PRIOR ART
FIG. 7 is a diagram showing a conventional adaptive antenna for transmission wherein a plurality of variable gain antennas are provided after division.
Figure 31:
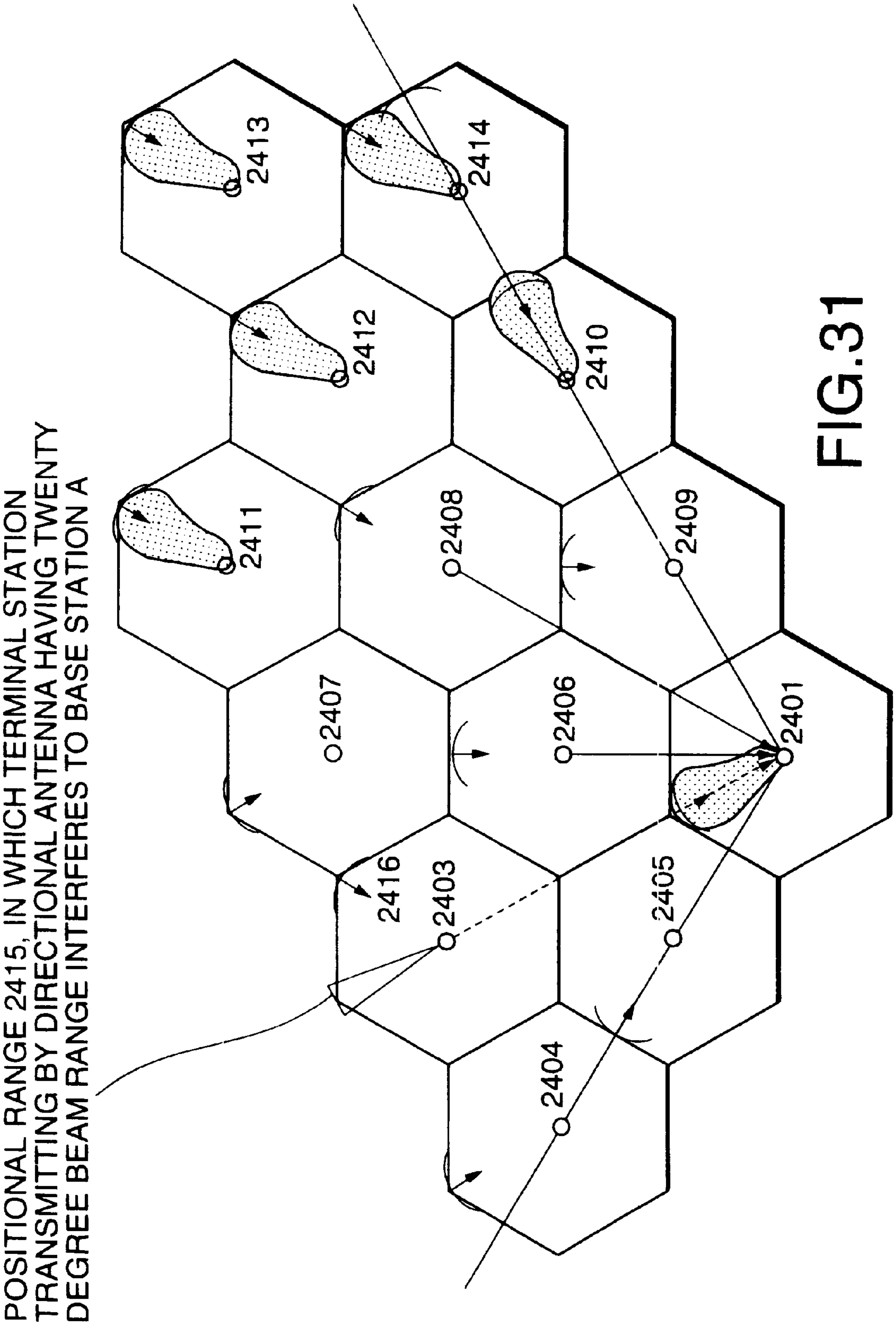
FIG. 31 is a diagram showing a case where the antenna directivity of a terminal communicating with another base station is not directed to its base station so that no interference is caused in the eleventh preferred embodiment.
Figure 32:
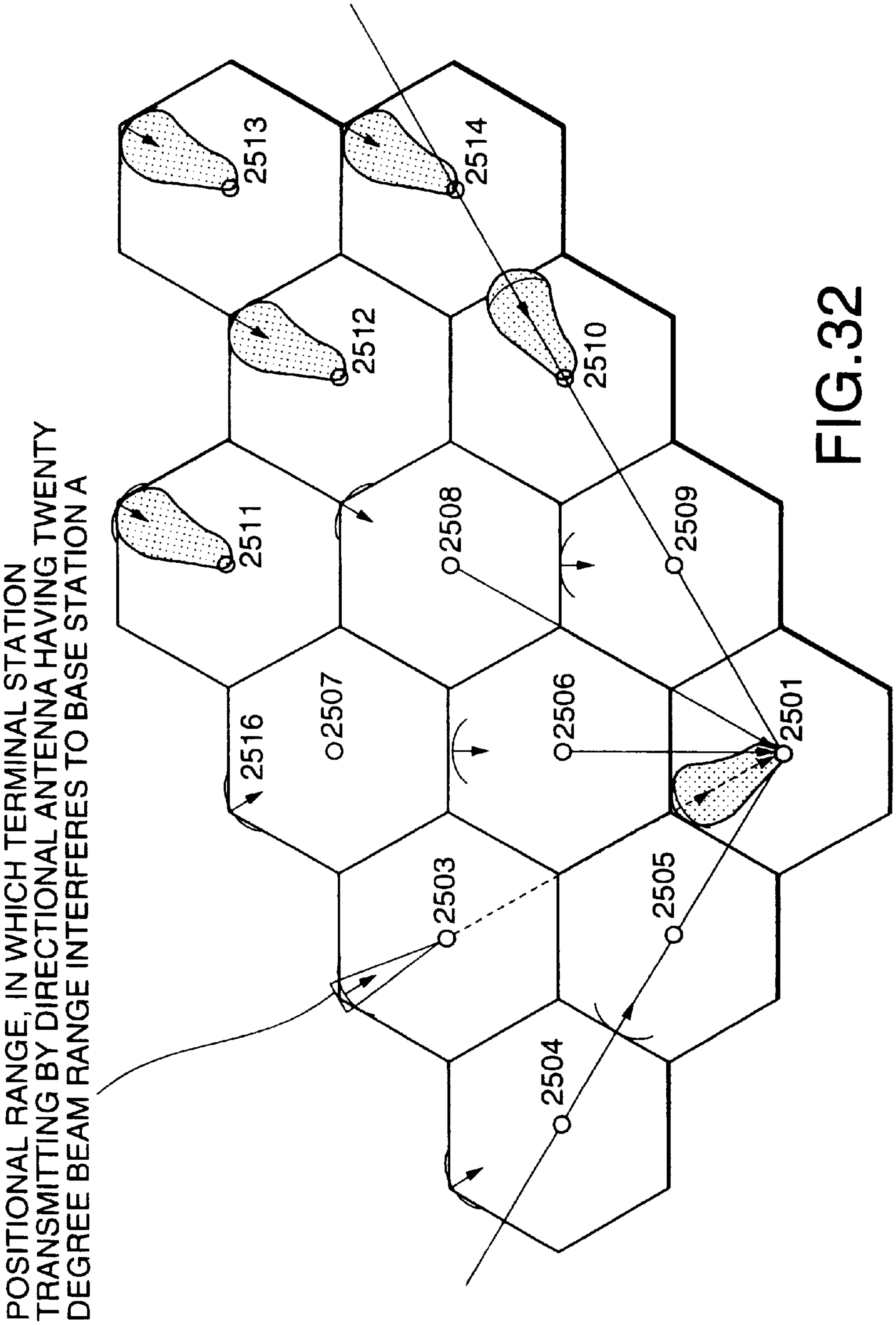
FIG. 32 is a diagram showing a case where the antenna directivity of a terminal communicating with another base station is directed to its base station so that interference is caused in the eleventh preferred embodiment.

Furthermore, in the eleventh preferred embodiment, no null is desired to be directed to another base station 2303 which is arranged in a direction near the direction of the terminal 2302 during communication viewed from the base station 2301. On the other hand, since no control information is generally exchanged between base stations, the relationship between the position of a terminal communicating with the base station 2301 and the position of a terminal communicating with the base station 2303 is random. For example, as shown in FIG. 31, while the base station 2403 communicates with the terminal 2416 while the terminal 1402 communicates, the antenna directivity of the terminal 5216 is not directed to the base station 2401, so that interference waves do not matter. In addition, as shown in FIG. 32, while the base station 2503 happens to communicate with the terminal 2516 while the terminal 2502 communicates, the antenna directivity of the terminal 2516 is directed to the base station 2501, so that the transmitted signal of the terminal 2516 becomes interference waves. However, when a conventional sector antenna shown in FIG. 2 or FIG. 3 is used, all of the terminals in a range 3515 interfering with the base station 3501 interfere with the terminal station communicating using the directional antenna while the terminal station communicates with other base stations (e.g., 3504, 3505, 3506, 3507, 3508, 3509, 3510), whereas in the case of the eleventh preferred embodiment, there is an advantage in that the terminal communicating with other base station than the base station 2503 does not interfere with the terminal station.

Figure 33:
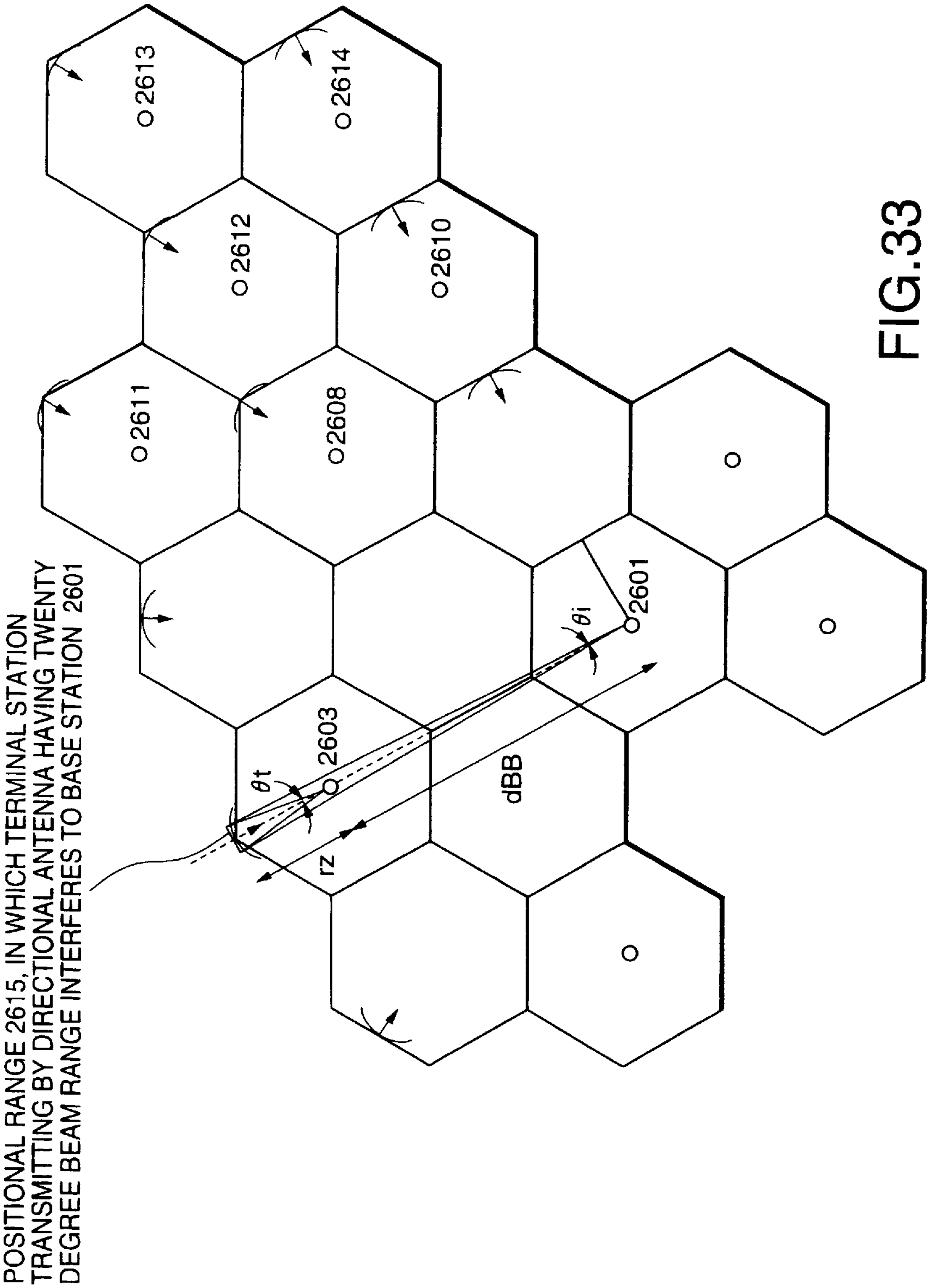
FIG. 33 is a diagram showing the relationship between an antenna beam width and a threshold of the difference in direction in the eleventh preferred embodiment.

Furthermore, as a method for knowing the directions of other radio base stations, it is considered to previously register the relationship to the positions of the existing other radio base stations or the directions of other radio base stations when the radio base stations are set. In addition, it is considered that when a new radio base station is provided, a control station for controlling a plurality of radio base stations informs each of the radio base stations of the positional information for the new radio base station as control information, and each of the radio base stations calculates the positional relationship to the self-radio base station on the basis of the positional information to add the calculated positional relationship to the existing registration, if necessary. Moreover, it is considered that when a new radio base station is provided, a control burst for the registration of the new station is transmitted toward the existing base station using a radio station capable of transmitting the control burst for the registration of the new base station at a received frequency of a base station, such as an altered radio station for terminal, and when the existing base station recognizes that the control burst is the registration of the new base station, the existing base station detects the direction and propagation conditions of the new base station on the basis of the transmitted signal and the signal strength thereof to newly register the new base station, and calculates and registers the preference and direction when null constraint conditions are provided. Furthermore, as methods for determining whether the difference (which is assumed to be $\delta\theta$ herein) between the direction of a certain base station and the direction of a terminal communicating therewith is small, the following various methods are considered. For example, assuming that the directional beam width of a terminal is $\theta_t$, as shown in FIG. 33, the range of the positions of terminal stations communicating with another base station 2603 interfering with the base station 2601 for the terminal stations is a range 2615 in an angle $\theta_t$ about the opposite line of a straight line, which passes through the base stations 2601 and 2603 in the radio zone of the other base station 2603, to the base station 2601 from the base station 2603. Using the distance d__BB between the base station 2601 and the base station 2603 and the radius r__z of the radio zone of the base station 2603, Then angle θ__i of the range 2615 expected from the base station 2601 is obtained as follows.

$$\theta\_i=2\times\arctan\{((r\_z)\times\tan((\theta\_t)/2))/((r\_z)+(d\_BB))\}$$

Therefore, if δ θ<θ__iθ×0.5 is used as a standard for determining whether the difference δθ between the direction of a certain base station and the direction of a terminal communicating therewith is small, it is possible to determine whether the direction of the terminal communicating with the base station exists in the range causing interference.

In addition, as a method for obtaining an approximation to the above described θ__i, when base stations are substantially regularly arranged as shown in FIG. 26, θ__i' expressed by the following formula can be used as an approximate value of θ__i by approximating by r__z=r__g and d__BB=3×r__g using the radio zone radius r__g of the average object system.

$$\theta\_i'=2\times\arctan\{\tan((\theta\_t)/2))/4\}$$

There is an advantage in that it is possible to remove interference waves without taking account of the distance between base stations and so forth.

In addition, since it can be clearly seen from FIG. 33 that θ__t>θ__i, if the directional beam width θ__t of a terminal is used as a threshold as a more simple method than the above described method, there is an advantage in that it is possible to remove interference waves without taking account of the distance between base stations and the size of the radio zone although there is a tendency for the angle to be slightly wide.

As described above, there is a limit to the number of nulls, which can be formed, when there is a limit to the number of the elements of an adaptive array antenna. In general, the number of nulls which can be formed by an array antenna having N__el elements is up to N__el at most. In this case, it is considered constraint conditions for directing nulls are provided by selecting the direction up to N__el using a standard, such as a small distance from the self-base station, or the direction of a base station connected to a larger number of terminal stations, or a large angular direction.

In addition, when the directional beam width θ__t of the antenna element is relatively small, the angular width capable of emitting beams as a broad side array antenna is about θ__t. Therefore, the direction to a base station in a direction outside of this angle is preferably omitted from the directions of a group of base stations in the eleventh preferred embodiment.

Figure 34:
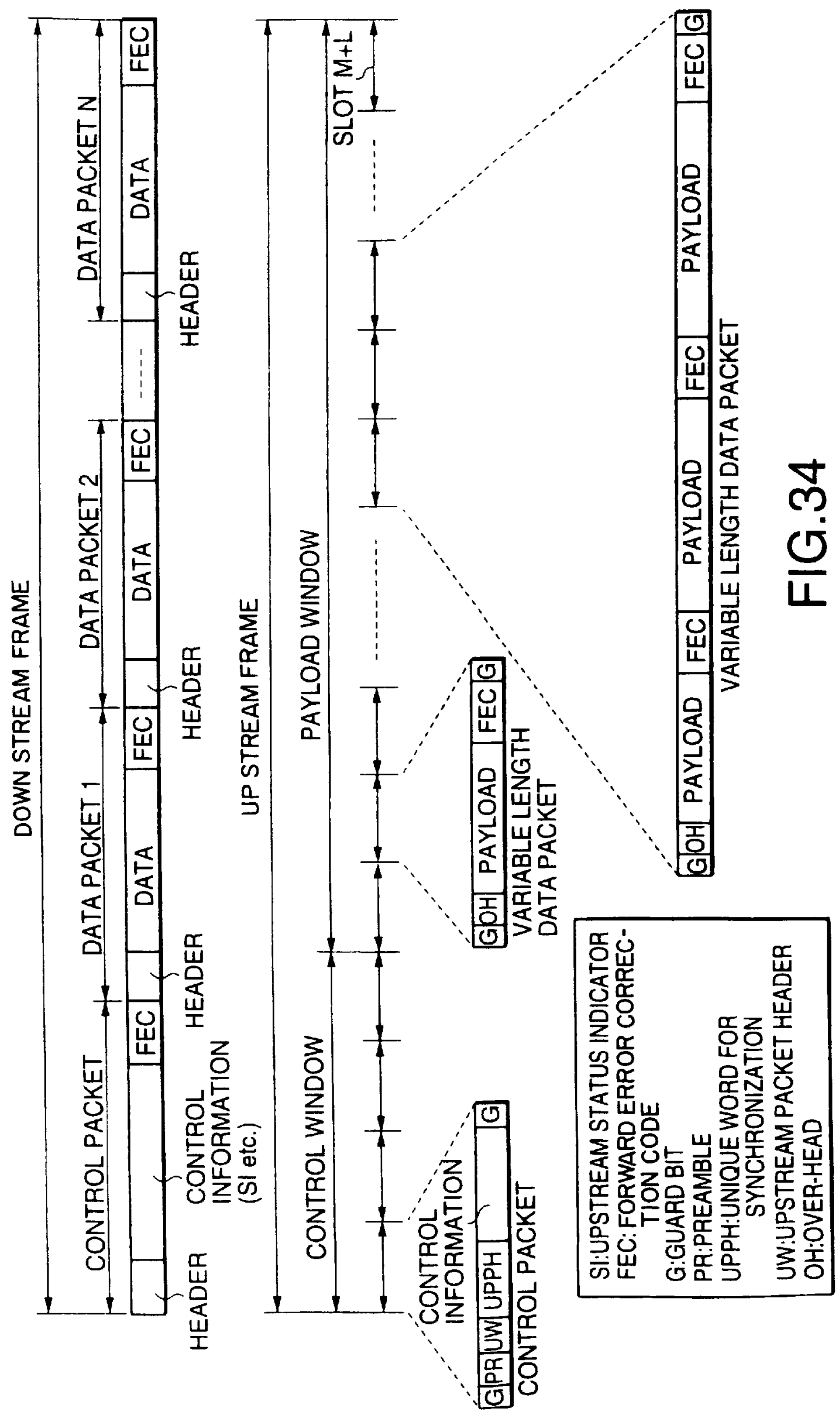
FIG. 34 is a diagram showing an example of a frame construction of a PTMP system.

Furthermore, in the eleventh preferred embodiment, the base station adaptive array antenna has been used for transmitting and receiving a data packet for communicating in a rise pay load window when a frame construction shown in, e.g., FIG. 34, is considered. However, it is considered that the following method is used for transmitting and receiving a control packet in a rise control window. That is, when the method is applied to the rise control, if the number of directions, for which the null constraint conditions are to be provided by the directional relationship to other base station, is n for example, a plurality of radiation patterns made by removing some of the null constraint conditions are prepared. At this time, the plurality of patterns are combined so that no null is directed to a certain direction with respect to at least one of the plurality of patterns when the direction is picked up. Then, by suitably switching the plurality of patterns every slot in the rise control window capable of transmitting a control channel, it is possible to receive all of control signals from the terminal in the self-cell while reducing interference. In particular, when many traffics occur in a special adjacent cell, interference with the terminal of the adjacent cell is avoided by providing a slightly larger number of slots for directing nulls toward the base station of the adjacent cell to lower the interference level in this time zone to raise throughput and by providing a slot for directing no null toward the base station of the adjacent cell, so that there is an advantage in that it is possible to receive control signals from terminals existing in this direction.

(Twelfth Preferred Embodiment)

Figure 35:
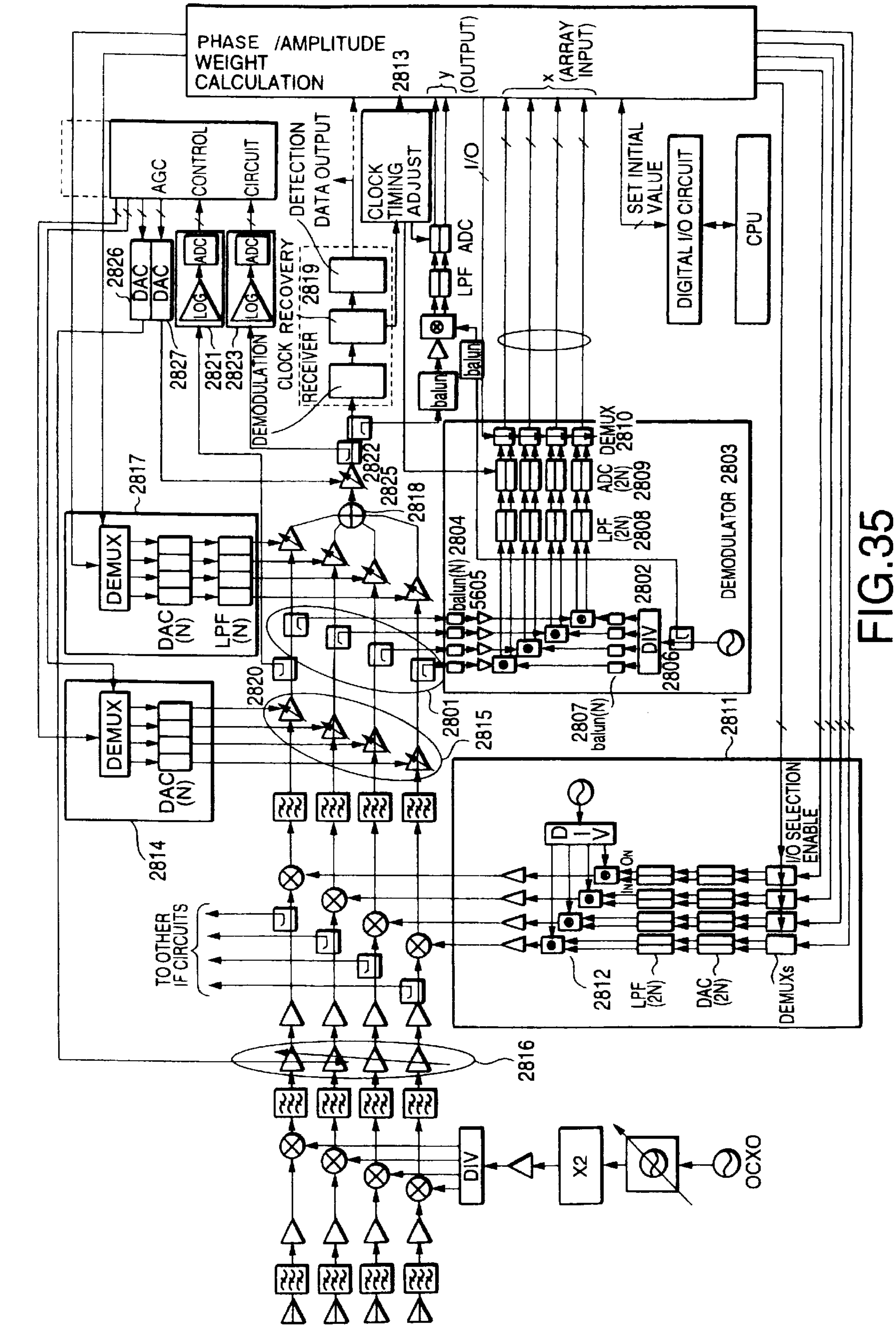
FIG. 35 is a block diagram of the twelfth preferred embodiment of an adaptive array antenna according to the present invention.

Referring to FIG. 35, the twelfth preferred embodiment of an adaptive array antenna according to the present invention will be described below. FIG. 35 shows the construction of the twelfth preferred embodiment. As shown in FIG. 35, the adaptive array antenna in the twelfth preferred embodiment comprises a plurality of antenna elements, and a high-frequency circuit connected to each of the antenna elements. The adaptive array antenna uses a quadrature modulator 2812 inputting a local frequency signal and a control signal, as a part of a local signal phase shifter circuit 2811 for changing the phase of a local signal, which is added to a frequency converter circuit in the high-frequency circuit, every high-frequency circuit for each of the antenna elements. The adaptive array antenna is characterized in that in the high-frequency circuit, there is provided a coupler 2801 for branching a part of signals from each of the antenna elements, and a quadrature demodulator 2802 for individual elements, to which signals are inputted from the coupler 5601.

The adaptive array antenna is also characterized in that in a phase/amplitude weight operating circuit 2813, there is provided a phase control signal output circuit for outputting a control signal to the quadrature modulator 2812 of the local signal phase shifter circuit 2811, a plurality of individual element signal sensors for inputting a modulated signal from the quadrature demodulator for individual elements to detect the phase and amplitude of an input signal to the individual elements, a comparator circuit for comparing signals from the plurality of individual element signal sensors to detect the difference therebetween, and compensation control means for controlling an output signal of the phase control signal output circuit on the basis of the compared results so as to compensate the phase difference based on the detected difference and the differences in the length of an antenna feeding line and other wiring lengths.

The adaptive array antenna further comprises: a first RSSI circuit for monitoring one signal level of second IF signals from the plurality of individual elements (the first RSSI circuit comprises a coupler 2820 for deriving a certain rate of signal power of a signal, and an RSSI output circuit 2821 comprising a logarithmic amplifier for amplifying the derived signal and an ADC for converting the output into a digital value); a second RSSI circuit for monitoring the signal level of the second IF signals after combining (the second RSSI circuit comprises a coupler 2822 for deriving a certain rate of signal power of a signal after combining, and an RSSI output circuit 2823 comprising a logarithmic amplifier for amplifying the derived signal and an ADC for converting the output into a digital value); N first IF variable gain amplifiers 2816 and N second IF variable gain amplifiers 2815 for allowing the relative levels of all of IF signals of each of the individual elements to vary; a post-combining variable gain amplifier 2825 for varying the signal level of the second IF signal after the signals from the individual elements are combined; and an AGC control circuit 2824 for controlling the output signal level after combining to be within a predetermined range on the basis of RSSI signals from the first RSSI circuit and second RSSI circuit, and for controlling the first IF variable gain amplifiers 2816, the second IF variable gain amplifiers 2815 and the post-combining variable gain amplifier 2825 so that the high-frequency circuit element for each of the individual elements is not saturated. In the above sentence, the term RSSI is an abbreviation of a receive signal strength indication, which is a numerical value of the strength of en electric wave signal during receiving.

In addition, in order to omit a clock recovery circuit requiring a complex, high-speed circuit for carrying out an over sampling for a baud rate, the output of a clock recovery circuit 2828 mounted in a receiver 2819 is fed to an ADC 2826 of an after combining output demodulator circuit 2829 and a plurality of ADCs 2809 of a weight determining individual element demodulator circuit 2803, via a clock timing adjusting circuit 2827 for compensating the internal delay between the receiver 2819, the post-combining output demodulator circuit 2829 and the weight determining individual element demodulator circuit 2803, if necessary, and for carrying out a timing adjustment for supplying a timing having a highest numerical aperture of eye.

Thus, it is not required to apply an over sampling to the post-combining output demodulator circuit 2829 and the weight determining individual element demodulator circuit 2803, and it is possible to lower the sampling rate of the ADCs, so that there is an advantage in that it is possible to reduce electric power consumption.

Furthermore, although the output frequency of the clock recovery circuit is generally substantially equal to the baud rate, there are some cases where it is preferably to carry out an over sampling of a relatively small multiple with respect to the ADC 2926 and the plurality of ADC 2809 in accordance with the modulation system and so forth. In such cases, a frequency of a multiple of the baud rate may be outputted from the clock recovery circuit 2828. Furthermore, the clock recovery circuit may be provided in the post-combining output demodulator circuit 2829 or the weight determining individual element demodulator circuit 2803 in place of the receiver 2819.

With this construction, in the case of a digital beam forming (DBF) adaptive antenna, if the transmission rate increases to 1 Mband or more which has been studied in the PTMP system, there is a problem in that the signal processing speed must be very high in order to carry out the real-time receiving. However, the adaptive array antenna in this preferred embodiment can weight and combine actual signals at real time using the local signal phase shifter circuit 2811, the amplitude weighting circuit 2817 and the high-frequency combiner 2818, so that there is an advantage in that the real time receiving can be carried out by a usual receiver 2819 even if a very high transmission rate is used.

In addition, it is not required to provide a high-frequency circuit constituting an array antenna, e.g., an amplifier and/or a special additional circuit (e.g., a high-frequency phase shifter) for compensating the phase difference due to the element deviation in phase distortion of a mixer, the difference in the extending length of an antenna feeding line and other differences in wiring length, and it has only to correct digital input values, so that it is possible to reduce costs. Also with respect to a local phase shifter circuit using a quadrature modulator, differences between the circuits for the individual elements may occur. In this preferred embodiment, it is possible to carry out calibration including the local phase shifter circuit.

Figure 37:
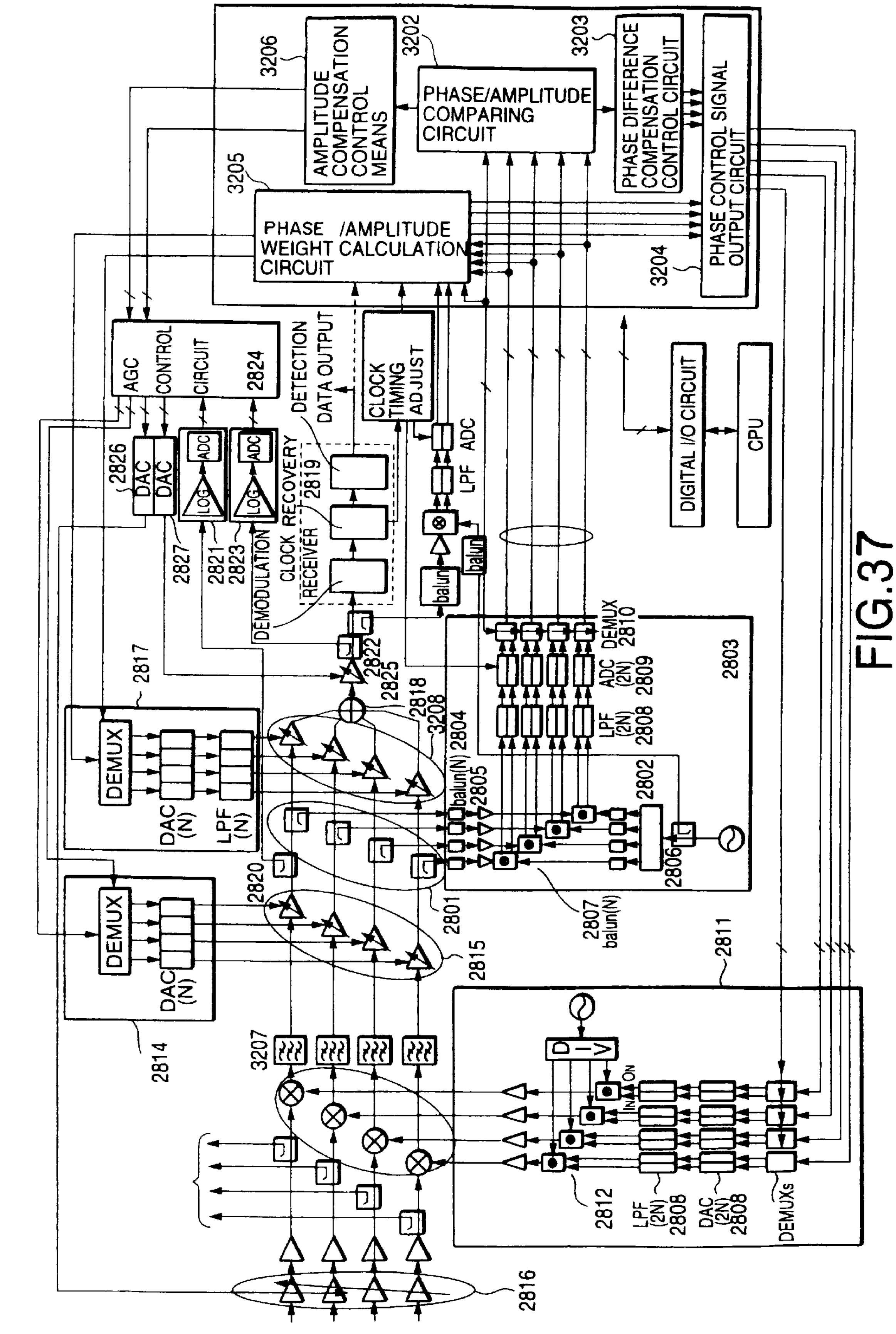
FIG. 37 is a block diagram showing a construction for compensating a phase difference and an amplitude difference in the twelfth preferred embodiment.

FIG. 37 shows an example of a construction for compensating a phase difference and an amplitude difference in the above described twelfth preferred embodiment of an adaptive array antenna according to the present invention. The adaptive array antenna comprises: a phase/amplitude comparator circuit 3202 for inputting a demodulated signal from the weight determining individual element demodulator circuit 2803 to compare the phases and amplitudes of the respective input signals to determine the differences therebetween; phase deviation compensating control means for controlling the output signal of the phase control signal output circuit so as to compensate the phase deviation due to the differences in the phase deviation, the extending length of the antenna feeding line and the wiring length, and the differences in passing phase characteristics of the amplitude weighting variable gain amplifier 3208 and the combining 2818; a phase shift control signal output circuit 3204 for outputting a control signal to the quadrature modulator of the local signal phase shifter circuit on the basis of the outputs of the phase-shifted amount of the phase deviation compensating control means 320 and phase-shifted amount/amplitude weight operating circuit 3205; and amplitude deviation compensating control means 3206 for controlling the output signal from the AGC/amplitude deviation compensating circuit 3201 to the second IF/AGC control and amplitude deviation compensating circuit 2814 so as to compensate the detected amplitude deviation, the differences in the extending length of the antenna feeding line and in other wiring lengths, and the amplitude deviation due to the passing amplitude characteristics of the amplitude weighting variable gain amplifier 3208 and combiner 2818.

In general, in the components of the RF/IF circuit and local phase shifter circuit of each of the antenna elements of the adaptive array antenna, there is dispersion in gains, losses and phase characteristics. The deviation in amplitude and phase of each of the antenna element systems due to the dispersion causes an error in radiation pattern characteristics due to the phase-shifted amount and the control of the amplitude weight.

If the deviation in amplitude and phase of each of the antenna element systems can be measured during the production of the antenna or every a certain extent of time during operation of the antenna to compensate the deviation, it is possible to suppress the error of the radiation pattern.

For example, during the production, signals having the same phase and the same amplitude are inputted to each of antenna inputs by a divider or like, or radio waves are transmitted from a sufficiently distant position in a boresite in a radio anechoic chamber or the like, so that the phase deviation and amplitude deviation of the input from each of the antenna element systems are detected by the phase/amplitude comparator circuit 3202. The compared results are inputted to the phase deviation compensating control means 3203 and amplitude compensating control means 3206, which derive a phase-shifted amount and amplitude adjusted amount for compensating the phase deviation and amplitude deviation. The derived phase-shifted amount for compensating the phase deviation, and the phase-shifted amount for controlling the radiation pattern of the antenna outputted from the phase-shifted amount/amplitude weight operating circuit 3205 are added by the phase control signal output circuit 3204 to be converted into a control signal to be outputted the quadrature modulator of the local signal phase shifter. In addition, the derived amplitude adjusted amount for compensating the amplitude deviation and the amplitude adjusted amount for carrying out the AGC are added by the AGC/amplitude deviation compensating control circuit 3201 to be converted into a digital signal for gain variation to be outputted to the second IF/AGC control and amplitude deviation compensating circuit 2814. By these control methods, it is possible to suppress the error of the radiation pattern.

In addition, during operation, a signal from a specific transmission station, the position of which has been known, is received at a timing that signals do not arrive from other transmission stations, and the deviation from the phase difference of the input from each of the antenna element systems predicted on the basis of the direction of the specific transmission station, and the amplitude deviation of the input are detected by the phase/amplitude comparator circuit 3202, so that it is possible to compensate by the same method as the above described method.

Furthermore, in accordance with the form of the IF frequency converter 3207, there are some cases where the output level of the converted signal of the IF frequency converter 3207 can be changed in accordance with the output level of the local signal phase shifter circuit 2811. In such cases, the amplitude deviation and the phase deviation may be compensated by taking the phase deviation and amplitude deviation in phase/amplitude deviation compensating control means, which is provided at a position corresponding to the phase deviation compensating control means 3203 without providing the amplitude compensating control means 3206, from the phase/amplitude comparator circuit 3202, to derive a phase-shifted amount and an amplitude adjusted amount, and adding the phase-shifted amount for controlling the radiation pattern of the antenna outputted from the phase-shifted amount/amplitude weight operating circuit 3205, to the derived phase-shifted amount for compensating the deviation, and adjusting I and Q inputs to each of the N quadrature modulators in accordance with the amplitude adjusted amount. In addition, in this example, the amplitude compensating control means 3206 may also be used for dividing the compensated amount of the amplitude deviation into the phase/amplitude deviation compensating means and the amplitude compensating control means 3206 to control the compensated amount.

Figure 38:
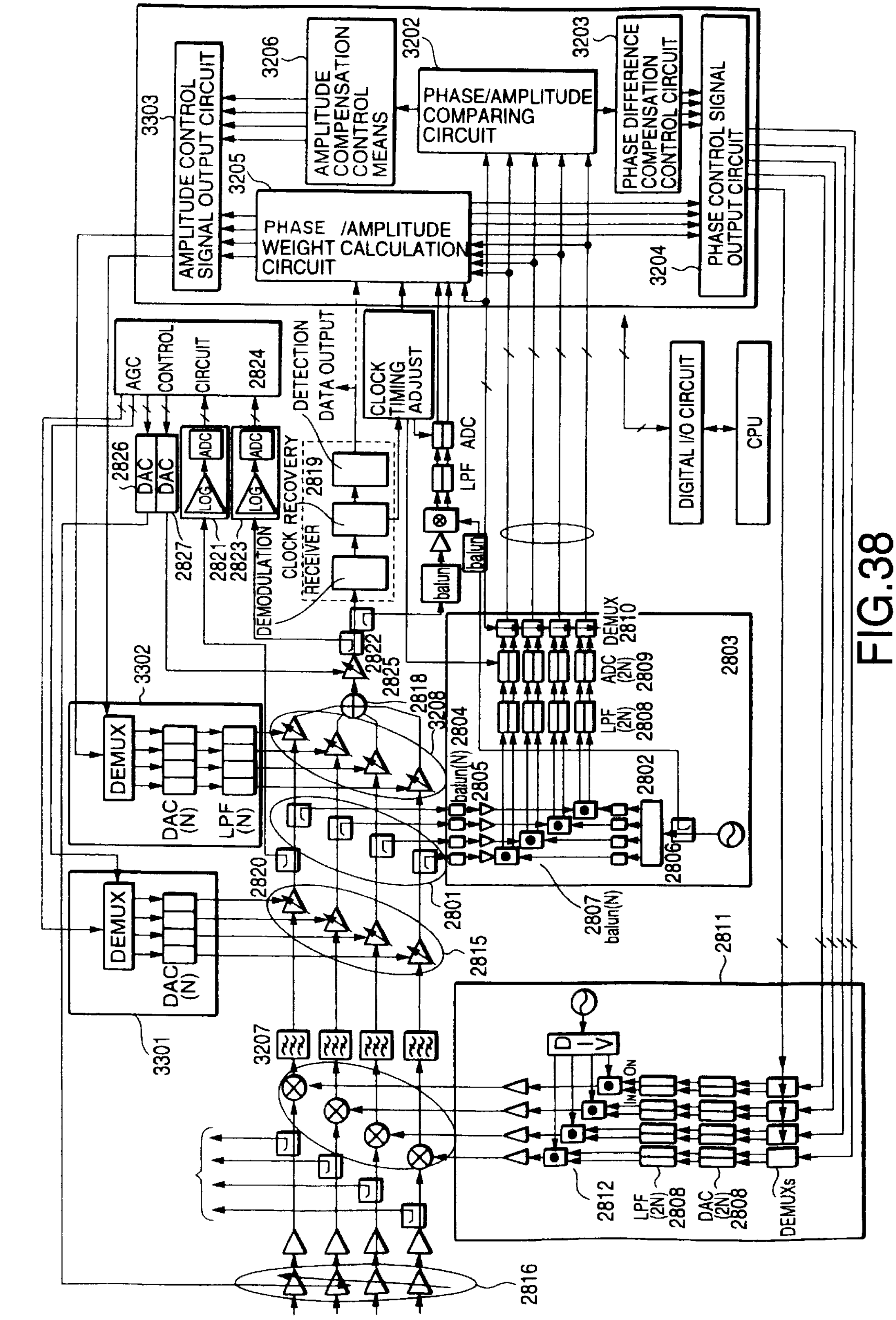
FIG. 38 is a block diagram showing a construction different from FIG. 37 in the twelfth preferred embodiment.

FIG. 38 shows another example of a construction for compensating the phase difference and the amplitude difference. FIG. 38 is different from FIG. 37 at the point that the output of the amplitude compensating control means 3206, together with the amplitude weight from the phase-shifted amount/amplitude weight operating circuit 3205, is inputted to the amplitude control signal output circuit 3303 to be added therein to be converted into a digital signal for the amplitude weighting and the gain variation of the amplitude deviation compensating circuit 3302 to be outputted. By the same control as that in the example described by the description of the operation of FIG. 37, it is possible to compensate the phase and amplitude.

The difference between the adaptive array antenna shown in FIG. 35 and a usual radio communication instrument is that it is required to monitor both of signal levels after and before combining. For example, when signals from a desired terminal are stopped in a cell to continuously vary a phase-shifted amount by a phase shifter to explore a null point, it is predicted that the dynamic range of the signal level after combining is very large, whereas the strength of the signal from each of the antennas before combining is substantially constant. In this case, if the gain of the variable gain amplifier before the combining is raised since the level of the received signal after combining decreases, saturation occurs. Therefore, the level of the received signal before combining is also monitored, and the gain is raised to such an extent that saturation does not occur before the combining, and the remaining shortage is compensated by the increase of the gain of the post-combining variable gain amplifier.

To the contrary, after the direction of the terminal can be substantially identified or after the weighting coefficient substantially converges at the optimum weighting coefficient, when beams are combined so as to be directed to that direction, the signal strength after the combining is stable so that the variation in the strength is small. On the other hand, there are some cases where the level of the signal of each of the antennas before the combining is decreased by the interference with the signals from a plurality of terminal stations.

However, since transmitted signals in a radio communication are generally scrambled so that no line spectrum rises, it can be supposed that the phase of an information signal complies with an even division in a long period of time to some extent. In addition, in the case of the PTMP system of the subscriber radio access system, the position of each of the terminal station does not move in principle. Therefore, it is considered that the phase difference between a plurality of transmitted signals is uniformly distributed if the phase difference is averaged in a far longer period of time than a symbol duration (an inverse of a transmission symbol rate Ts [Hz]) in an RSSI circuit, so that the fluctuation in RSSI output due to interference has no influence. In addition, it is considered that this characteristic is established even if the output of any one of a plurality of antennas is selected. Therefore, it is not always required to monitor all of input powers from a plurality of elements, and if the coupler 2820 for monitoring at least one input of the input powers and the RSSI circuit 2821 are used as shown in FIG. 35, it is possible to presume the average input power of the respective antennas.

Then, the above described two RSSI circuits are used, and the gains of three sets of variable gain amplifiers 2816, 2815 and 2825 are adjusted on the basis of two monitored results. That is, in the AGC control circuit, tables for deriving three gain adjusting voltage outputs are prepared for two inputs.

Figure 36:
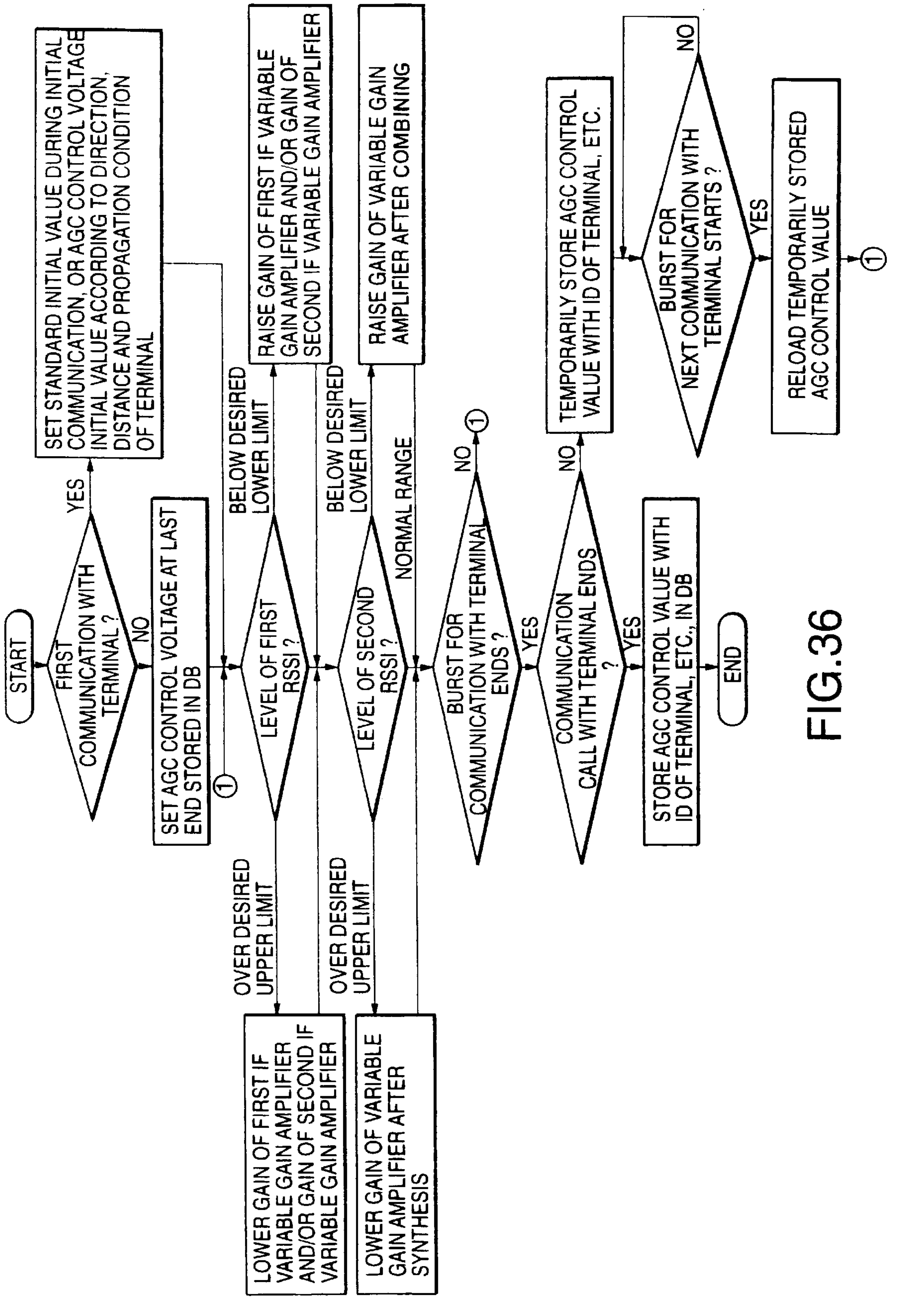
FIG. 36 is a flow chart showing an example of a control method when the twelfth preferred embodiment of an adaptive array antenna according to the present invention is used.

FIG. 36 shows an example of a method for controlling an AGC voltage to a certain terminal when the twelfth preferred embodiment of adaptive array antenna according to the present invention is used. Furthermore, although the rise and fall widths of the gain in FIG. 35 are usually set to be substantially the same as the difference between a desired lower limit and a desired upper limit, there is considered a method for gradually controlling at a fixed value which is predetermined to be a smaller value than values in a desired range, in order to simplify the control although convergence is slow.

By the above described control, there is an advantage in that it is possible to control the output signal level after combining in a predetermined range and it is possible to control so that the high-frequency circuit element for each of the indicative elements is not saturated.

Furthermore, the post-combining receiver 2819 is usually provided with an input fluctuation margin of about 12 dB. Therefore, it is considered to provide hysteresis so as to prevent the gain adjusting function from sensitively reacting against a smaller fluctuation than the input fluctuation margin to be frequently changed. Specifically, a predetermined number of output values of the past output values of the RSSI circuit are stored, and it is restricted so as to output a gain change order to the first IF variable gain amplifier 2816, the second IF variable gain amplifier 2815 and the post-combining variable gain amplifier 2825 from the AGC control circuit 2824 only when the deviation from the output values exceeds a predetermined value. Thus, the AGC control circuit 2824 excessively responds against a slight fluctuation in signal level due to noise components of the RSSI circuit and minute fading of the input RF signal, to be originally within the allowable received power range of the receiver 2819, so that there is an advantage in that it is possible to prevent an undesired control from being carried out.

In addition, when the phase-shifted amount is continuously varied by the phase shifter to measure the property of the received signal after combining at that time, it is desired that the speed of the variation in phase-shifted amount is far slower than the time constant of the RSSI. It is considered that the speed of measurement is slow if the time constant of the RSSI is a certain fixed value. In that case, it is considered that a mode for changing the time constant of the RSSI is provided.

(Thirteenth Preferred Embodiment)

Figure 39:
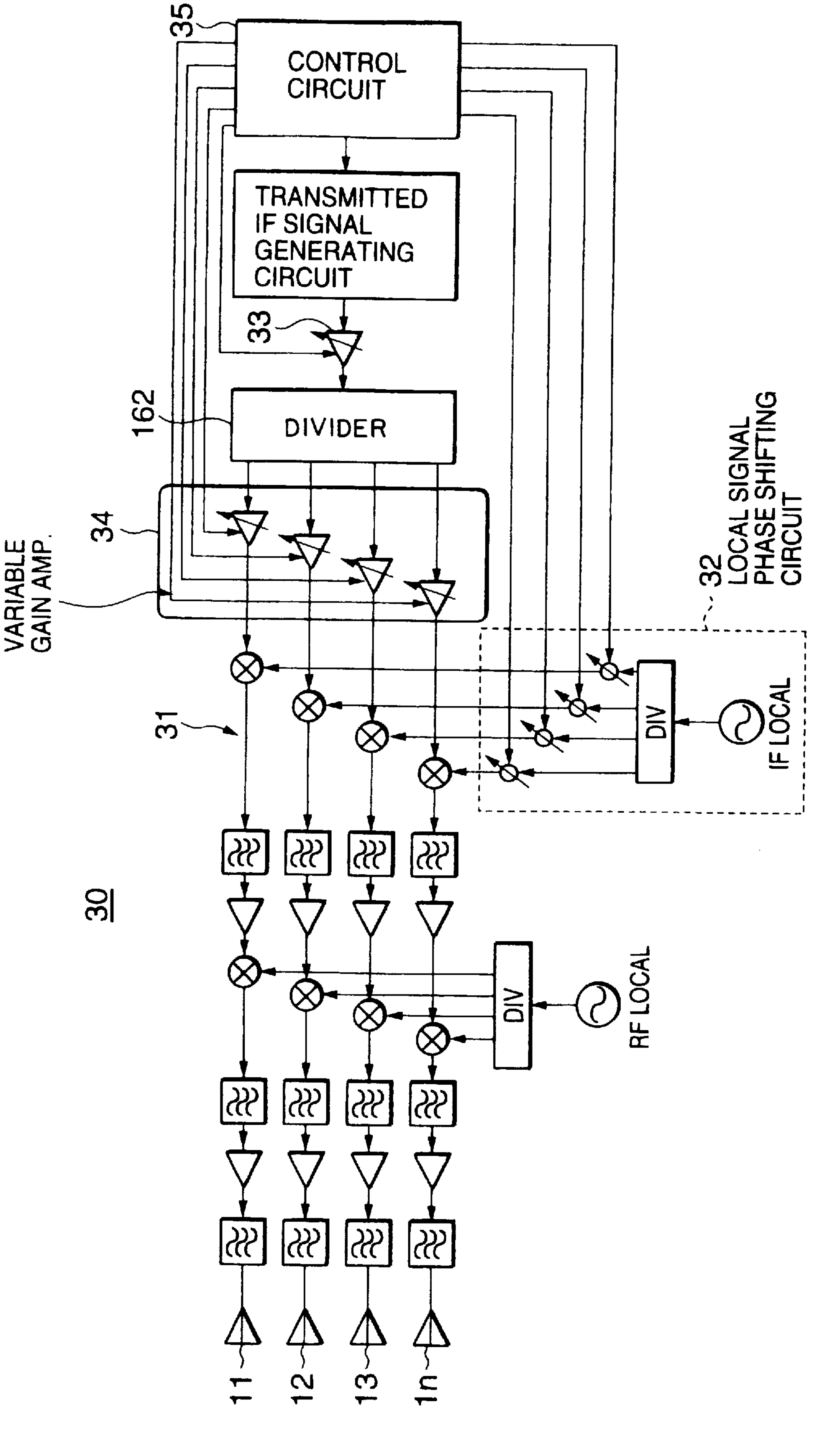
FIG. 39 is a thirteenth preferred embodiment of an adaptive array antenna according to the present invention.

Referring to FIG. 39, the thirteenth preferred embodiment of an adaptive array antenna according to the present invention will be described in detail below.

In the thirteenth preferred embodiment, the adaptive array antenna comprises: a plurality of antenna elements 11 through 1n, a plurality of high-frequency circuits 30, each of which is connected to a corresponding one of the antenna elements; a high-frequency dividing circuit 162 for dividing outputs to the plurality of high-frequency circuits; an amplitude weighting circuit 31 for weighting the amplitude of each of the antenna elements in the high-frequency circuit 30; a local signal phase shifter circuit 32 for weighting the phase of each of the antenna elements in the high-frequency circuit 30; a before division variable gain amplifier 33 for allowing the variation in signal level of a second IF signal before division to individual element; N second IF variable gain amplifiers 34 capable of varying the relative level of the second IF signal of each of N individual elements; and a gain control circuit 35 for controlling so that the effective radiation power taking account of the directional gain from the adaptive array antenna, which is presumed on the basis of the output of the amplitude weighting circuit 31, does not exceed a predetermined value, and for controlling the before division variable gain amplifier 33 and the N second IF variable gain amplifiers 34 so that the high-frequency circuit element for each of the individual elements is not saturated.

Figure 40:
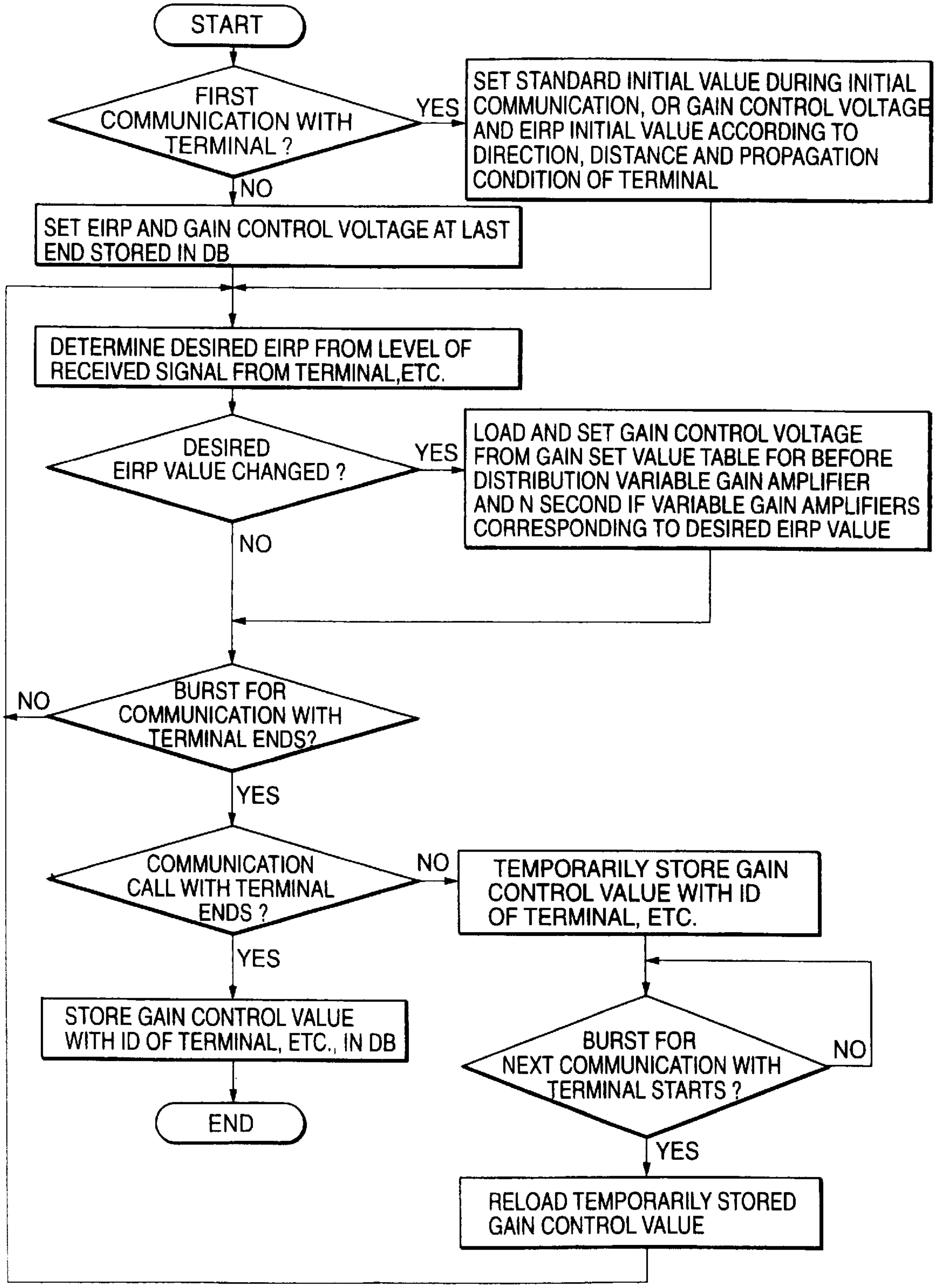
FIG. 40 is a flow chart showing an example of a control method when the thirteenth preferred embodiment of an adaptive array antenna according to the present invention is used.

FIG. 40 shows an example of a method for controlling an AGC voltage with respect to a certain terminal when the thirteenth preferred embodiment of an adaptive array antenna according to the present invention is used. Furthermore, it is considered that the N second IF variable gain amplifiers 34 after division shown in FIG. 39 is also used as a circuit for weighting the amplitude of each of the antenna elements. In this case, a gain control voltage, which corresponds to a desired ERP value in FIG. 38 and which is written in the gain set value tables of the before division variable gain amplifier and N second IF variable gain amplifiers, must be a control voltage so as to be a gain which does not produce distortion due to the shortage and saturation of NF even if taking account of the upper and lower limits of the variable range of a gain used as an amplitude weight. If this condition is not satisfied, the upper and lower limits of the variable range of the gain serving as the allowable amplitude weight are prepared as a table in addition to the gain set value table with respect to a desired ERP value. If it is important to prevent the distortion due to the shortage and saturation of NF, it is considered to refer to this table when determining the amplitude weight and to change the amplitude weight so as to be between the upper and lower limits.

According to the above described method, there is an advantage in that it is possible to realize both of an effective radiation power value of less than a predetermined value and a low distortion of a high-frequency circuit for each of individual elements. In addition, if it is required to greatly increase the control width of the transmitted power, it is required to provide a large control width by only one variable gain amplifier, so that there are some cases where it is difficult to take the input/output isolation for increasing the gain, or a construction for causing a variable gain amplifier to have an attenuation function is complicated. There is also an advantage in that such a problem can be avoided by dividing the variable gain element before and after division as this preferred embodiment.

In addition, while the amplitude weighting circuit 31 and the N second IF variable gain amplifiers 34 have been separately provided in the thirteenth preferred embodiment, these may be realized by a single circuit. In this case, there are advantages in that it is possible to further decrease the circuit scale for taking a required transmitted power control width, and it is possible to solve the above described problem, such as isolation and attenuation function.

(Fourteenth Preferred Embodiment)

Figure 41:
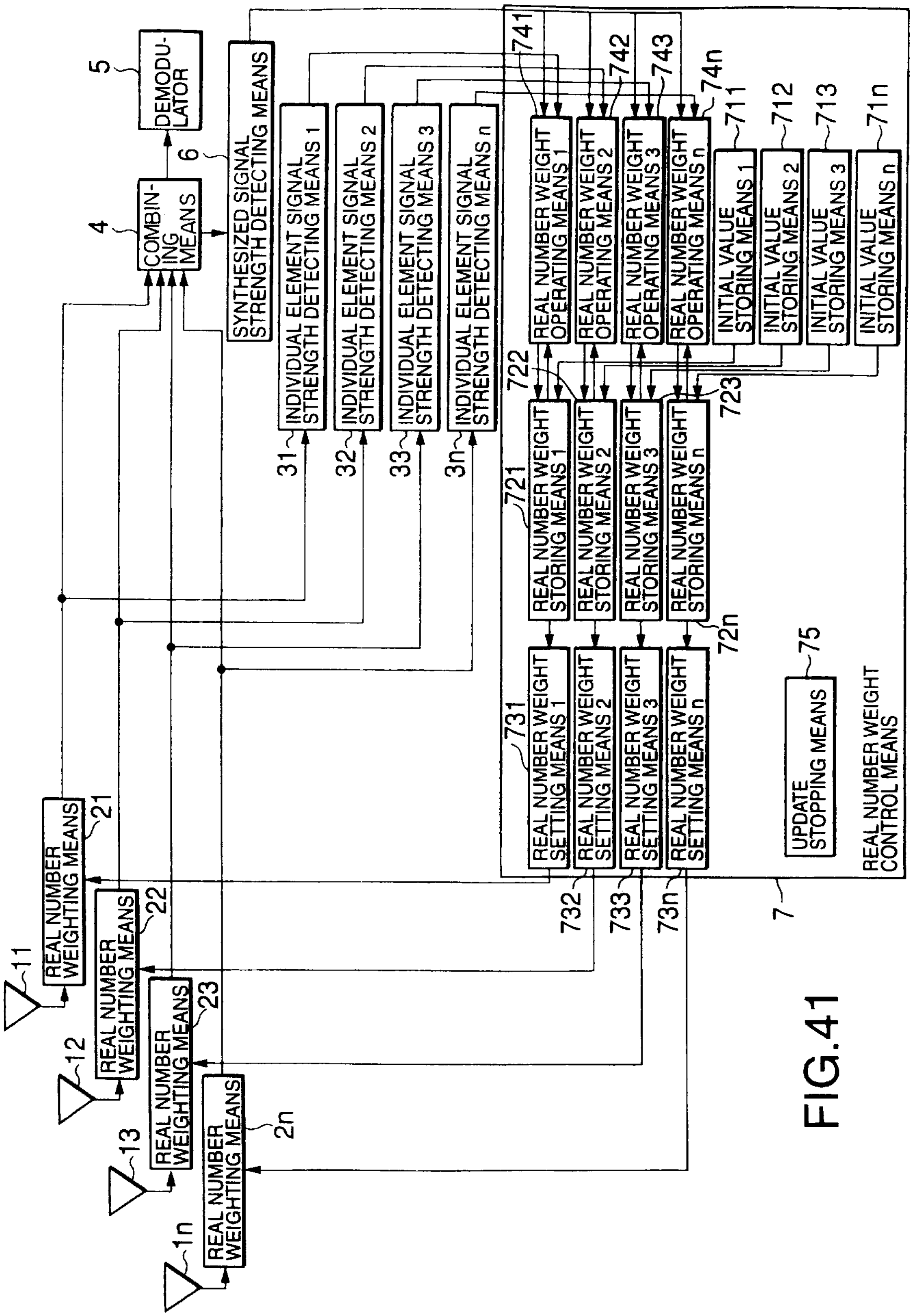
FIG. 41 is a fourteenth preferred embodiment of an adaptive array antenna according to the present invention.
Figure 42:
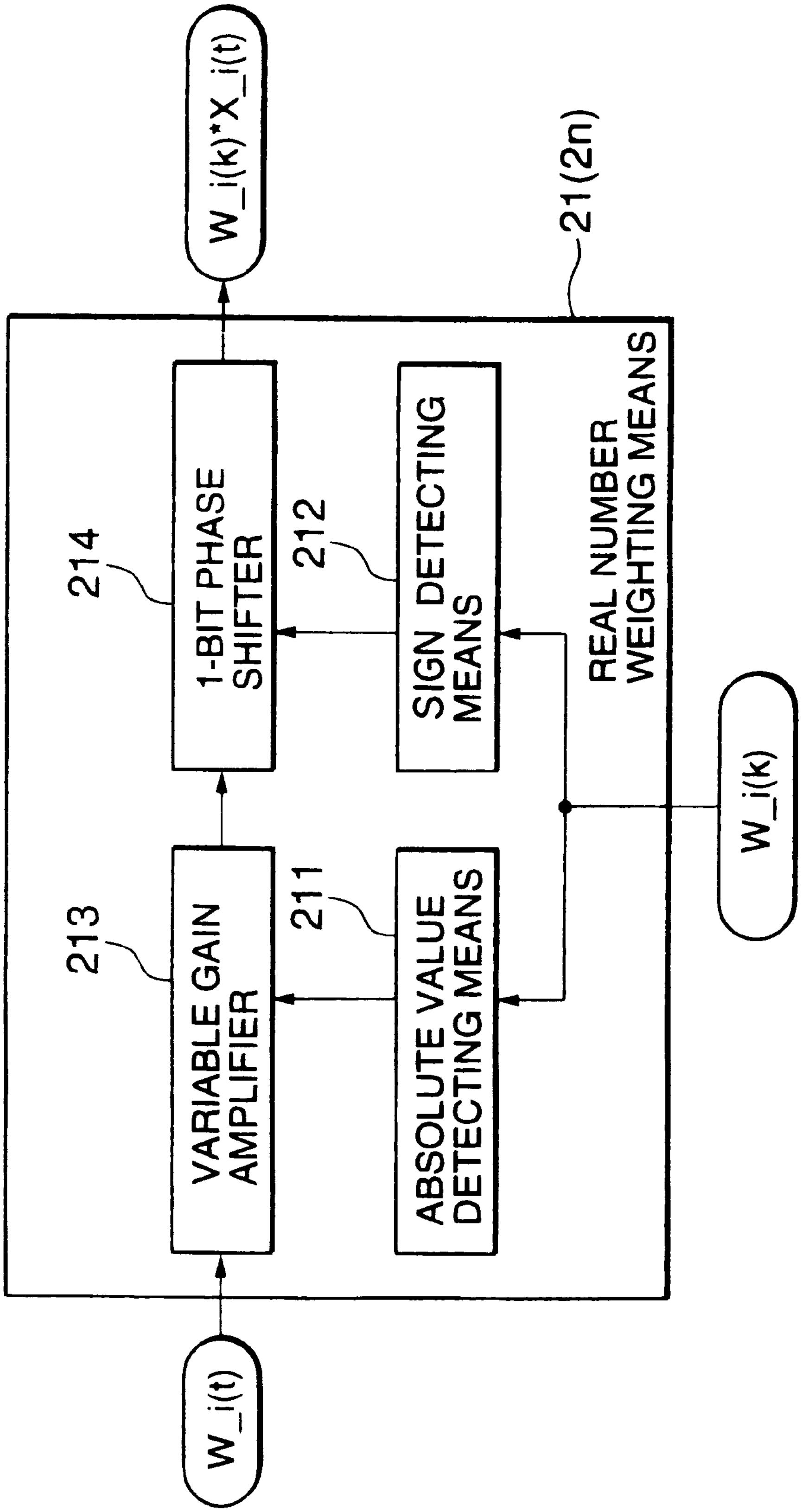
FIG. 42 is a diagram showing real number weighting means in the fourteenth preferred embodiment.
Figure 43:
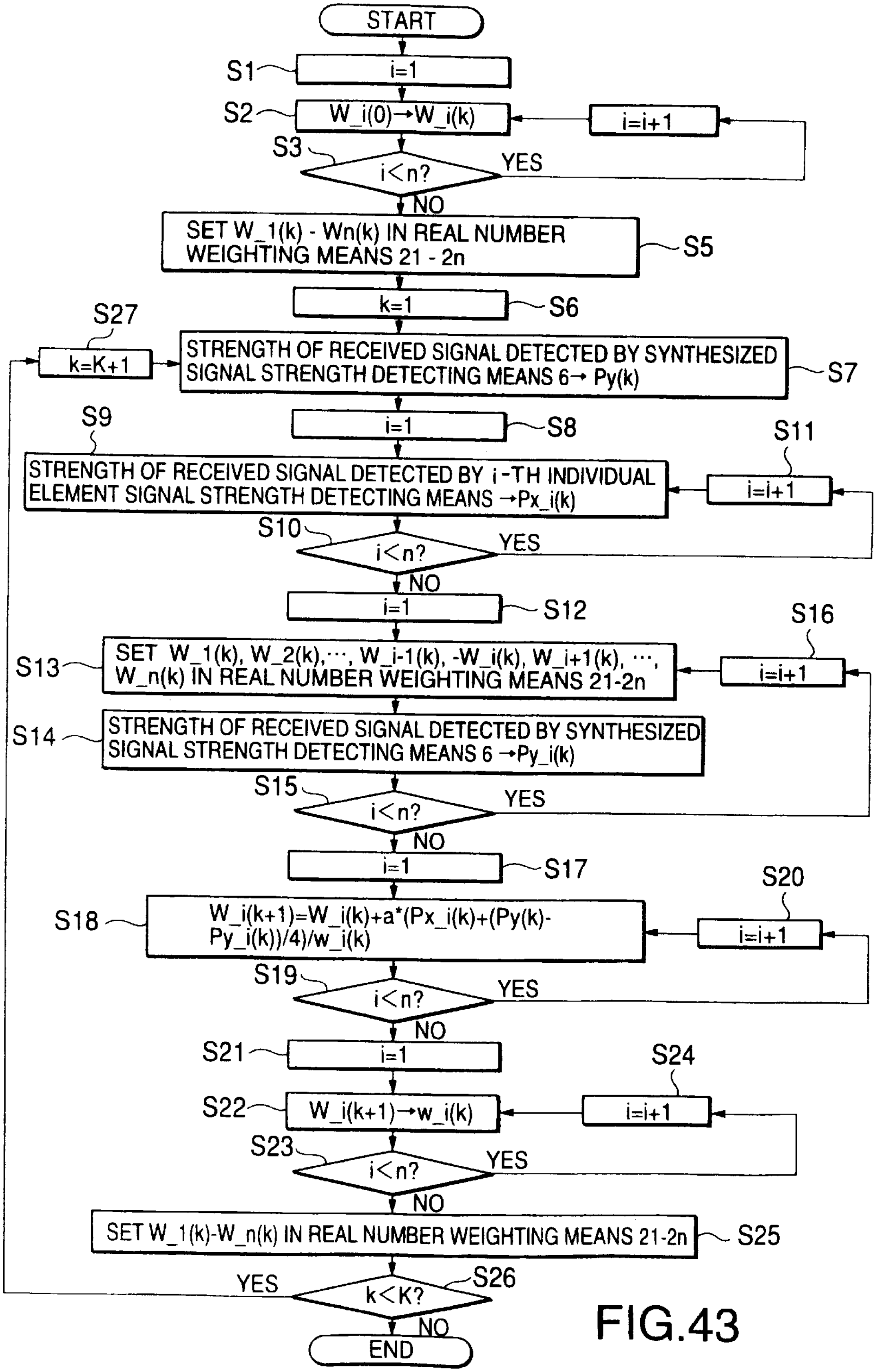
FIG. 43 is a flow chart showing the operation of the fourteenth preferred embodiment of an adaptive array antenna according to the present invention.

Referring to FIGS. 41 through 43, the fourteenth preferred embodiment of an adaptive array antenna according to the present invention will be described in detail below. Furthermore, since the detailed contents of the present invention have been described in various preferred embodiments, although there are some cases where the reference numbers in the figure showing the fourteenth preferred embodiment overlap with the reference numbers in the figures showing other preferred embodiments, it is assumed that the use of the reference numbers is limited to FIGS. 41 through 43.

In FIG. 41, reference numbers 11 through **1*n* denote antenna elements; reference numbers 21 through 2*n* denote a plurality of real number weighting means for weighting signals, which are received by each of the antenna elements 11 through 1*n*, by a real number weight which is set by real number weight control means 7 which will be described later; and reference numbers 31 through 3*n* denote a plurality of individual element signal strength detecting means for detecting the strength of the weighted received signal as an individual element signal strength. In addition, reference number 4 denotes a combining for combining the received signal weighted by the real number weighting means 21 through 2*n*; reference number 5 denotes a demodulator for demodulating the received signal combined by the combining 4; and reference number 6 denotes combined signal strength detecting means for detecting the received signal combined by the combining 5** as a combined signal strength.

Reference number 7 denotes real number weight control means for calculating a newly set real number weight on the basis of the individual element signal strength detected by each of the individual element signal strength detecting means 31 through **3*n* and the combined signal strength detected by the combined signal strength detecting means 6, and repeating a processing for setting the calculated real number weight to each of the weighting means 21 through 2*n*** by a plurality of cycles.

The real number weight control means 7 comprises: a plurality of initial value storing means 711 through **71*n* for storing initial values W_1(0) through W_n(0) (n is the number of antenna elements) which are set in the plurality of real number weighting means 21 through 2*n*; a plurality of real number weight storing means 721 through 72*n* for storing W_1(0) through W_n(0) as real number weights W_1(k) through W_n(k) (k is the number of real number weight updating operations) which are to be set in each of the plurality of real number weighting means 21 through 2***n*; a plurality of real number weight setting means 731 through 73*n* for setting any one of W_i(k) and −W_i(k) (1≦i≦n) as a real number weight of each of the plurality of real number weighting means 21 through 2*n* on the basis of W_1(k) through W_n(k) stored in the plurality of real number weight storing means 721 through 72*n*; and real number weight operating means 741 through 74*n* for calculating new real number weights W_i(k+1)=W_i(k)+a*[Px_i(k)+{Py (k)−Py_i(k)}/4]/W_i(k) (a is a constant, 1≦i≦n) to input W_1(k) through W_n(k) of the plurality of real number weight storing means 721 through 72*n*, respectively, when the combined signal strengths Py(k) detected by the combined signal strength detecting means 6 while W_1(k) through W_n(k) are set in the plurality of real number weighting means 21 through 2*n*, respectively, are inputted, respectively, and when the individual element signal strengths Px_1(k) through Px_n(k) detected by the plurality of individual element signal strength detecting means 31 through 3*n*, respectively, while W_1(k) through W_n(k) are set by the plurality of real number weighting means 21 through 2*n*, respectively, are inputted, respectively, and when the combined signal strengths Py_i(k) (1≦i≦n) detected by the combined signal strength detecting means 6, respectively, while W_1(k), W_2(k), . . . , W_i−1(k), −W_i(k) W_i+1(k), . . . , W_n(k) (1≦i≦n) are set in the plurality of real number weighting means 21 through 2*n*, respectively, are inputted, respectively.

In addition, in FIG. 41, the real number weight control means 7 has update stopping means 75 for stopping the operation of the real number weight control means 7 on the basis of a predetermined condition.

The real number weighting means 21 through 2*n* are formed as shown in, e.g., FIG. 42. In FIG. 42, the real number weighting means 21(2*n*) comprises: absolute value detecting means 211 for calculating the absolute value of a real number weight W_i(k); code detecting means 212 for calculating the sign of W_i(k); a variable gain amplifier 213 for amplifying the received signal X_i(t) on the basis of the absolute value calculated by the absolute value detecting means 211; and a 1-bit phase shifter 214 for controlling the sign of the amplified received signal on the basis of the sign calculated by the code detecting means 212.

Thus, the weighting of the real number weight does not use a multi-bit phase shifter which is required for weighting amplitude and phase weight, so that it is possible to realize a simple circuit construction. However, the present invention may be applied to a circuit construction for weighting amplitude and phase weight.

Referring to FIG. 43, the operation of the adaptive array antenna with the above described construction will be described below. FIG. 43 is a flow chart for explaining the operation of the adaptive array antenna.

First, the real number weight W_1(0) stored in the initial value storing means 711 is inputted to the real number weight storing means 721. On the basis of this, W_1(0) is stored in W_1(0) by the real number weight storing means 721 as the following formula.

$$W_1(k)=W_i(0)$$

Subsequently, the initial values W_2(0) through w_n(0) of the real number weight stored in the initial value storing means 712 through 71*n* are similarly stored in the real number weight storing means 722 through 72*n* (steps S1 through S4).

Subsequently, the initial value W_1(k) of the real number weight stored in the real number weight storing means 721 is inputted to the real number weight setting means 731. This real number weight W_1(k) is set in the real number weighting means 21 by the real number weight setting means 731.

Subsequently, the initial values W_2(k) through W_n(k) of the real number weight stored in the real number weight storing means 722 through 72n are similarly inputted to the real number weight setting means 732 through 73*n* to be set in the real number weighting means 22 through 2*n* (step S5).

For example, the initial values W_1(0) through W_n(0) of the real number weight may be set so as to maximize the directional gain in a desired wave direction.

It is assumed that signals received by the antenna elements 11 through 1*n* at time t are X_1(t) through X_n(t). These signals are weighted by the real number weighting means 21 through 2*n*. The weighted received signal are inputted to the individual element signal strength detecting means 31 through 3*n*. Assuming that the real number weights set in the real number weighting means are W_1(k) through W_n(k), individual element signal strengths Px?1 (k) through Px_n(k) detected by the individual element signal strength detecting means 31 through 3n, respectively, are expressed by formula (16).

$$P_{xi}(k)=W_i^2(k)E[|X_i(t)|^2] \tag{16}$$

wherein i meets 1<=i<=n, E[·] means an expected value operation.

Subsequently, the received signals weighted by the real number weighting means 21 through 2*n* are combined by the combining 4. The combined received signal is inputted to the combined signal strength detecting means 6. On the basis of this, the combined signal strength Py(k) detected by the combined signal strength detecting means 6 is expressed by formula (17).

$$Py(k)=\sum_{i=1}^{n}\sum_{m=1}^{n}W_i(k)Wm(k)E[X_i(t)X_m*(t)] \tag{17}$$

wherein * means a complex conjugate.

The fourteenth preferred embodiment is characterized in that the differential coefficient of the combined signal strength detected by the combined signal strength detecting means 6, with respect to the real number weight set in each of the real number weighting means 21 through 2*n* can be derived using the individual element signal strength detected by the individual element signal strength detecting means 31 through 3*n* and the combined signal strength detected by the combined signal strength detecting means 6. Using this differential coefficient, the real number weight control based on the maximum diving method is carried out.

The weight control procedure will be described below.

First, the number of real number weight updating operations is set to k=1 by the update stopping means 75 (step S6).

Then, the combined signal strengths Py(k) detected by the combined signal strength detecting means 6 while each of W_1(k) through W_n(k) is set in a corresponding one of the real number weighting means 21 through 2n are inputted to the real number weight operating means 741 through 74*n* (step S7).

Then, the individual element signal strengths Px_1(k) detected by the individual element signal strength detecting means 31 while each of W_1(k) through W_n(k) is set in a corresponding one of the real number weighting means 21 through 2$n$ are inputted to the real number weight operating means 741 through 74$n$.

Then, similarly, the individual element signal strengths Px__2(k) through Px__n(k) detected by the individual element signal strength detecting means 32 through 3$n$ while each of W__1(k) through W__n(k) is set in a corresponding one of the real number weighting means 21 through 2$n$ are also inputted to the real number weight operating means 741 through 74n (steps S8 through S11).

Subsequently, the combined signal strengths Py__1(k) detected by the combined signal strength detecting means 6 while each of −W__1(k), W__2(k), . . . , W__n(k) is set in a corresponding one of the real number weighting means 21 through 2$n$ by a corresponding one of the real number weight setting means 731 through 73$n$ are inputted to the real number weight operating means 741.

Then, the combined signal strengths Py__2(k) detected by the combined signal strength detecting means 6 while each of W__1(k), −W__2(k), W__3(k), . . . , W__n(k) is set in a corresponding one of the real number weighting means 21 through 2$n$ by a corresponding one of the real number weight setting means 731 through 73$n$ are inputted to the real number weight operating means 742.

Similarly, the combined signal strengths Py__3(k) through Py__n(k) are also inputted to the real number weight operating means 743 through 74$n$ (steps S12 through S16).

On the basis of these inputs, new real number weights W__1(k+1) through W__n(k+1), each of which is set in a corresponding one of the real number weighting means 21 through 2$n$, are calculated by the real number weight operating means 741 through 74$n$, respectively.

First, on the basis of the combined signal strength Py(k), the individual element signal strength Px__1(k) and the combined signal strength Py__1(k), a new real number weight W__1(k+1) to be set in the real number weighting means 21 is calculated by the real number weight operating means 741 as follows.

$$W_1(k+1)=W_1(k)+a\{P_{X1}(k)+(P_Y(k)-P_{Y1}(k))/4\}/W_1(k)$$

wherein a is a real number.

Then, on the basis of the combined signal strength Py(k), the individual element signal strengths Px__2(k) through Px__n(k) and the combined signal strengths Py__2(k) through Py__n(k), new real number weights W__2(k+1) through W__n(k+1) to be set in the real number weighting means 22 through 2n are similarly calculated by the real number weight operating means 742 through 74$n$ (steps S17 through S20).

Subsequently, the new real number weight W__1(k+1) calculated by the real number weight operating means 741 is inputted to the real number weight storing means 721. On the basis of this, W__1(k+1) is stored in W__1(k) by the real number weight storing means 721 as the following formula.

$$W_i(k)=W_i(k+1)$$

Similarly, the new real number weights W__2(k+1) through w__n(k+1) calculated by the real number weight operating means 742 through 74$n$ are also stored in the real number weight storing means 722 through 72$n$ (steps S21 through S24).

Then, the new real number weight w__1(k) stored in the real number weight storing means 721 is inputted to the real number weight setting means 731. This real number weight W__1(k) is set in the real number weighting means 21 by the real number weight setting means 731.

Similarly, the new real number weights W__2(k) through W__n(k) stored in the real number weight storing means 722 through 72$n$ are also inputted to the real number weight setting means 732 through 73$n$ to be set in the real number weighting means 22 through 2$n$ (step S25).

Then, it is determined by the update stopping means 75 whether the number k of real number weight updating operations is smaller than K. If k is smaller than K, k is increased by 1, and the processing at steps S7 through S25 is repeated. If k is K or more, the processing ends (steps S26 through S27).

By providing the update stopping means 75, it is possible to prevent the real number weight control means 7 from continuing to operate.

The processing ends by counting the number of the repeated real number weight updating operations. In this case, the operation of the real number weight control means 7 is completed within a predetermined period of time. There is also considered a method for completing the processing when W__i(k+1)−W__i(k) (1<=i<=n) is a predetermined value or less. In this case, it is possible to complete the operation of the real number weight control means 7 while a so-called adaptive algorithm converges.

(Px__i(k)+(Py(k)−Py__i(k))/4)/W__i(k) is expressed by formula (18).

$$\{P_{xi}(k)+(P_y(k)-P_{yi}(k))/4\}/W_i(k)=\sum_{m=1}^{n}W_m(k)\mathrm{Re}\{E[X_i(k)X_m*(k)]\} \tag{18}$$

wherein i is an integer meeting 1<=i<=n, and Re{·} is a real part.

On the other hand, the differential coefficient δPy(k)/δW__i(k) of the combined signal strength Py(k) with respect to the real number weight W__i(k) is expressed by formula (19).

$$\frac{\delta P_y(k)}{\delta W_i(k)}=2\sum_{m=1}^{n}W_m(k)\mathrm{Re}\{E[X_i(k)X_m*(k)]\} \tag{19}$$

In view of the foregoing, δPy(k)/δW__i(k)=2(Px__i(k)+(Py(k)−Py__i(k))/4)W__i(k) is established. Therefore, the processing at step S18 is equivalent to the processing expressed by formula 20.

$$W_i(k+1)=W_i(k)+\frac{\alpha\delta P_y(k)}{2\delta W_i(k)} \tag{20}$$

When the real number a is negative, the real number weights of the real number weighting means 21 through 2$n$ are updated so as to decrease the combined signal strength of the adaptive array antenna, and a real number weight of δPy(k)/δW__i(k)=0 (1<=i<=n) is finally set, so that it is possible to suppress interference waves when the interference waves exist. However, in order to avoid that all of real number weights become zero, it is required to restrict the variation in one or more real number weights from the initial value.

When such a real number weight control is applied to, e.g., a receiving adaptive array antenna of a base station, there is considered a method for controlling a real number weight of real number weighting means to calculate a real number weight suppressing the co-channel interference before a communication channel is given to a terminal station having requested communication, and thereafter, giving the communication channel to the terminal station to set the real number weight suppressing the co-channel interference in the real number weighting means 21 through 2$n$ to receive a signal transmitted from the terminal station.

When the incoming direction of a desired wave is previously known, the initial value of the real number weight is set so as to maximize the directional gain in the direction of the desired wave, and the variation of one or more real number weight from the initial value is restricted, so that it is possible to avoid the suppression of the desired wave. Each of the antenna elements 11 through in may be a directional antenna or array antenna in the direction of the desired wave although it may be omnidirectional. In the case of the directional antenna, signals received by each of the elements can be restricted by the incoming direction. In addition, in the case of the array antenna, it is possible to provide suitable directivity as quadrature beams for example.

As described above, according to the fourth preferred embodiment, by deriving the differential coefficient of the real number weight of the performance function using the plurality of individual element signal strengths, which are detected by the individual element signal strength detecting means 31 through 3*n*, and the combined signal strength which are detected by the combined signal strength detecting means 5, the real number weight control based on the maximum diving method can be carried out, so that it is possible to realize a simpler circuit construction than that in the prior art wherein the demodulated signal of each of antenna elements is used.

As described in detail above, according to the present invention, since the phase-shifted amount control based on the partial differential coefficient of the performance function with respect to the phase-shifted amount can be carried out using only the signal strength detected by the signal strength detecting means, it is possible to realize a simpler circuit construction than that in the prior art wherein the signal of each of antenna elements is used.

In addition, since the phase-shifted amount for taking account of the deviation in shifted phase to in-phase receive signals can be obtained by a simple processing in the self-station or a foreign station communicating with the self-station, using only the signal strength detected by the signal strength detecting means, there are advantages in that it is not required to set the phase-shifted amount so as to compensate the deviation in phase unlike the prior art, it is possible to realize a simple circuit construction, and the processing time is short.

In addition, in an adaptive array antenna for use in a radio communication system for providing service in an area by arranging a plurality of radio base stations for housing therein terminal stations, constraint conditions for directing nulls in the rest of directions, from which directions having a small difference from the direction of a terminal communicating with the self-base station are removed, of the respective directions of a group of other base stations than the self-base station or a part thereof, are added to control antenna beams, so that it is possible to rapidly determine the constraint directions of nulls and it is possible to reduce control processing during communication.

In addition, according to the present invention, in an adaptive array antenna which comprises a plurality of antenna elements and a high-frequency circuit connected to each of the antenna elements and wherein a quadrature modulator for inputting a local frequency signal and a control signal is used as a local signal phase shifter circuit for varying the phase of a local signal, which is added to a frequency converting circuit in the high-frequency circuit, every high-frequency circuit for each of the antenna elements or as a part thereof, a coupler for branching a part of a signal from each of the antenna elements and an individual element quadrature demodulator for inputting a signal from the coupler are provided in the high-frequency circuit, so that it is possible to easily carry out a real time receiving even if the transmission rate is high.

In addition, according to the present invention, in an adaptive array antenna which comprises a plurality of antenna elements, a plurality of high-frequency circuits, each being connected to a corresponding one of the antenna elements, and a high-frequency combining circuit for combining the outputs of the plurality of high-frequency circuits, the adaptive array antenna further comprises: at least one first RSSI circuit for monitoring at least one signal level of RF or IF signals from a plurality of individual elements; a second RSSI circuit for monitoring the signal level of the RF or IF signals after the signals from the individual elements are combined; at least (N−1) first variable gain circuits for allowing the variation in relative levels of all of the RF or IF signals of each of N individual elements; a second variable gain circuit capable of varying the signal levels of the RF or IF signals after the signals from the individual elements are combined; and a gain control circuit for controlling the output signal level after the combining to be within a predetermined range on the basis of RSSI signals from the first RSSI circuit and second RSSI circuit, and for controlling the first variable gain circuit and the second variable gain circuit so that the high-frequency circuit for each of the individual elements is not saturated. Thus, it is possible to control the output signal level after the combining to be within a predetermined range, and it is possible to control so that the high-frequency circuit for each of the individual elements is not saturated.

Moreover, according to the present invention, in an adaptive array antenna which comprises a plurality of antenna elements, a plurality of high-frequency circuits, each being connected to a corresponding one of the antenna elements, and a high-frequency dividing circuit for dividing outputs to the plurality of high-frequency circuits and wherein a weight control circuit for weighting amplitude or phase for each of the antenna elements is provided in each of the high-frequency circuits, the adaptive array antenna further comprises: at least (N−1) first variable gain circuits for allowing the variation in relative levels of all of the RF or IF signals of each of N individual elements; a second variable gain circuit capable of varying the signal levels of the RF or IF signals before the division to the individual elements; and a gain control circuit for controlling so that the effective radiation power taking account of the directional gain from the adaptive array antenna, which is presumed on the basis of the output of the weighting circuit, does not exceed a predetermined value, and for controlling the first variable gain circuit and second variable gain circuit so that the high-frequency circuit element for each of the individual elements is not saturated. Thus, it is possible to control so that the effective radiation power taking account of the directional gain from the adaptive array antenna does not exceed a predetermined value, and it is possible to control so that the high-frequency circuit element for each of the individual elements is not saturated.

As described in detail above, according to the present invention, by deriving the differential coefficient of the performance function with respect to the real number weight using the plurality of individual element signal strengths, which are detected by the individual element signal strength detecting means, and the combined signal strength which are detected by the combined signal strength detecting means, the real number weight control based on the maximum diving method can be carried out, so that it is possible to realize a simpler circuit construction than that in the prior art wherein the demodulated signal of each of antenna elements is used.

What is claimed is:

1. An adaptive array antenna comprising:

a plurality of antenna elements;

a plurality of weighting sections which weight received signals, which are received by said antenna elements, by weights which are set, respectively;

a combining section which combines the received signals weighted by said plurality of weighting sections;

a signal strength detecting section which detects the strength of the received signal combined by said combining section; and a weight control section which calculates a weight on the basis of the strength of the received signal detected by said signal strength detecting section, and which sets the calculated weight in each of said plurality of weighting sections, wherein said weight control section comprises: a changing part which changes the weight which is set in one of said plurality of weighting sections; and a setting part which calculates a weight on the basis of the variation in strength of the received signal detected by said signal strength detecting section when said weight is changed by said changing part, and for setting the calculated weight in said one of said plurality of weighting sections.

2. An adaptive array antenna as set forth in claim 1, wherein said adaptive array antenna comprises:

a plurality of antenna elements;

a plurality of phase shifting sections which control a phase of the received signals, which are received by said antenna elements, in accordance with phase-shifted amounts which are set, respectively;

a combining section which combines the received signals which are phase-controlled by said plurality of phase shifting sections;

a signal strength detecting section which detects the strength of the received signal combined by said combining section; and a phase-shifted amount control section which calculates a phase-shifted amount on the basis of the strength of the received signal detected by said signal strength detecting section, and which sets the calculated phase-shifted amount in each of said plurality of phase-shifting sections, and said phase-shifted amount control section comprises:

a phase-shifted amount operating section which operates phase-shifted amounts in said plurality of phase shifting sections on the basis of various signal strengths, which are outputted from said signal strength detecting section, and a plurality of phase-shifted amounts, by a plurality of cycles to output the operated phase-shifted amounts;

initial value storing sections which store the initial value for each of said plurality of phase shifting sections;

a first phase-shifted amount storing section which stores first phase-shifted amounts, which are operated by said phase-shifted amount operating section on the basis of said initial value stored in each of said plurality of initial value storing sections, to be set in each of said plurality of phase shifting sections;

a second phase-shifted amount storing section which stores second phase-shifted amounts, which are operated by said operating section so as to increase said first phase-shifted amounts by a predetermined angle, respectively, in said plurality of phase shifting sections;

a third phase-shifted amount storing section which stores third phase-shifted amounts, which are operated by said operating section so as to decrease said first phase-shifted amounts by a predetermined angle, respectively, in said plurality of phase shifting sections;

a plurality of phase-shifted amount setting sections which set the phase-shifted amounts of said plurality of phase shifting sections, which are operated by said phase-shifted amount operating section on the basis of the phase-shifted amounts stored in any one of said first through third phase-shifted amount storing sections;

a first signal strength storing section which stores a first signal strength detected by said signal strength detecting section while said second phase-shifted amounts are set in said plurality of phase shifting sections; and a second signal strength storing section which stores a second signal strength detected by said signal strength detecting section while said third phase-shifted amounts are set in said plurality of phase shifting sections, and wherein said phase-shifted amount operating section operates a new phase-shifted amount, which is obtained by increasing said first phase-shifted amount by a value in proportion to a difference between said first signal strength and said second signal strength, when said difference is inputted, to input the new phase-shifted amount to said first phase-shifted amount to repeat the operation by a plurality of cycles until said difference is zero, and said phase-shifting amount operating section has an update stopping section which stops the operation of said phase-shifted amount control section on the basis of a predetermined condition.

3. An adaptive array antenna as set forth in claim 2, wherein said initial value storing section stores initial values Φ1(0) through Φn(0) of said phase-shifted amount, respectively, and inputs the initial values Φ1(0) through Φn(0) to Φ1(k) through Φn(k) of said first phase-shifted amount storing section, respectively, when said phase-shifted amount control section is first operated;

said first phase-shifted amount storing section stores phase-shifted amounts Φ1(k) through Φn(k) (n is the number of antenna elements, and k is the number of phase-shifted amount updating operations), respectively, which are set in the phase shifting section;

said second phase-shifted amount storing section stores phase-shifted amounts Φ1'(k) through Φn'(k), respectively, which are calculated by increasing said Φ1(k) through Φn(k) by a predetermined angle, respectively;

said third phase-shifted amount storing section stores phase-shifted amounts Φ1"(k) through Φn"(k), respectively, which are calculated by decreasing said Φ1(k) through Φn(k) by a predetermined angle, respectively;

said phase-shifted amount setting section sets a phase-shifted amount, which is stored in any one of said first phase-shifted amount storing section, said second phase-shifted amount storing section and said third phase-shifted amount storing section, in each of said plurality of phase shifting sections;

said first signal strength storing section stores a strength Pi' serving as said first signal strength detected by said signal strength detecting section while $\Phi 1(k)$, $\Phi 2(k)$, . . . , $\Phi i-1(k)$, $\Phi i'(k)$, $\Phi i+1(k)$, . . . , $\Phi n(k)$ ($1 \leqq i \leqq n$) are set in said phase shifting section, respectively;

said second signal strength storing section stores a strength Pi" serving as said second signal strength detected by said signal strength detecting section while $\Phi 1(k)$, $\phi 2(k)$, . . . , $\Phi i-1(k)$, $\Phi i''(k)$, $\Phi i+1(k)$, . . . , $\Phi n(k)$ are set in said phase shifting section, respectively;

said phase-shifted amount operating sections calculate a new phase-shifted amount $\Phi i(k+1)$, which is obtained by increasing said $\Phi i(k)$ by a value in proportion to a difference between said signal strengths Pi' and Pi", to input the calculated phase-shifted amount to $\Phi 1(k)$ of said first phase-shifted amount storing section; and said update stopping section stops the operation of said phase-shifted amount control sections after repeating the operation of said phase-shifted amount control sections predetermined times.

4. An adaptive array antenna as set forth in claim 1, wherein said adaptive array antenna comprises:

a plurality of antenna elements;

a phase shifting section which shifts phase-controls received signals, which are received by said antenna elements, in accordance with phase-shifted amounts which are set, respectively;

a combining section which combines said received signals phase-controlled by said phase shifting section;

a reference signal generating section which generates a reference signal;

an error detecting section which outputs a difference between the received signal, which is combined by said combining section, and said reference signal which is generated by said reference signal generating section;

an error signal strength detecting section which detects the signal strength of an error signal detected by said error detecting section; and a phase-shifted amount control section which calculates a phase-shifted amount on the basis of the signal strength of said error signal detected by said error signal strength detecting section, and which sets the calculated phase -shifted amount in each of said plurality of phase shifting sections, said phase-shifted amount control section comprises:

a phase-shifted amount operating section which operates phase-shifted amounts in said plurality of phase shifting sections on the basis of various signal strengths, which are outputted from said error signal strength detecting section, and a plurality of phase-shifted amounts, by a plurality of cycles to output the operated phase-shifted amounts;

an initial value storing section which stores the initial value for each of said plurality of phase shifting sections;

a first phase-shifted amount storing section which stores first phase-shifted amounts, which are operated by said phase-shifted amount operating section on the basis of said initial value stored in each of said plurality of initial value storing sections, to be set in each of said plurality of phase shifting sections;

a second phase-shifted amount storing section which stores second phase-shifted amounts, which are operated by said operating section so as to increase said first phase-shifted amounts by a predetermined angle, respectively, in said plurality of phase shifting sections;

a third phase-shifted amount storing section which stores third phase-shifted amounts, which are operated by said operating section so as to decrease said first phase-shifted amounts by a predetermined angle, respectively, in said plurality of phase shifting sections;

a plurality of phase-shifted amount setting sections which store the phase-shifted amounts of said plurality of phase shifting sections, which are operated by said phase-shifted amount operating section on the basis of the phase-shifted amounts stored in any one of said first through third phase-shifted amount storing sections;

a first error signal strength storing section which stores a first error signal strength detected by said error signal strength detecting section while said second phase-shifted amounts are set in said plurality of phase shifting sections; and a second error signal strength storing section which stores a second error signal strength detected by said error signal strength detecting section while said third phase-shifted amounts are set in said plurality of phase shifting sections, and wherein said phase-shifted amount operating section operates a new phase-shifted amount, which is obtained by increasing said first phase-shifted amount by a value in proportion to a difference between said first error signal strength and said second error signal strength, when said difference is inputted, to input the new phase-shifted amount to said first phase-shifted amount to repeat the operation by a plurality of cycles until said difference is zero, and said phase-shifting amount operating section has an update stopping section which stops the operation of said phase-shifted amount control section on the basis of a predetermined condition.

5. An adaptive array antenna as set forth in claim 4, wherein said first phase-shifted amount storing section stores phase-shifted amounts $\Phi 1(k)$ through $\Phi n(k)$ (n is the number of antenna elements, and k is the number of phase-shifted amount updating operations), respectively, which are set in the phase shifting section;

said second phase-shifted amount storing section stores phase-shifted amounts $\Phi 1'(k)$ through $\Phi n'(k)$, respectively, which are calculated by increasing said $\Phi 1(k)$ through $\Phi n(k)$ by a predetermined angle, respectively;

said third phase-shifted amount storing section stores phase-shifted amounts $\Phi 1''(k)$ through $\Phi n''(k)$, respectively, which are calculated by decreasing said $\Phi 1(k)$ through $\Phi n(k)$ by a predetermined angle, respectively;

said phase-shifted amount setting section sets a phase-shifted amount, which is stored in any one of said first phase-shifted amount storing section, said second phase-shifted amount storing section and said third phase-shifted amount storing section, in each of said plurality of phase shifting sections;

said first error signal strength storing section stores said first error signal strength Qi' detected by said error signal strength detecting section while $\Phi 1(k)$, $\Phi 2(k)$, . . . , $\Phi i-1(k)$, $\Phi i'(k)$, $\Phi i+1(k)$, . . . , $\Phi n(k)$ ($1 \leqq i \leqq n$) are set in said phase shifting section, respectively; said second signal strength storing section stores said second error signal strength Qi" detected by said error signal strength detecting section while $\Phi 1(k)$, $\Phi 2(k)$, . . . , $\Phi i-1(k)$, $\Phi i''(k)$, $\Phi i+1(k)$, . . . , $\Phi n(k)$ are set in said phase shifting section, respectively;

said phase-shifted amount operating sections calculate a new phase-shifted amount $\Phi i(k+1)$, which is obtained by increasing said Φi(k) by a value in proportion to a difference between said first and second error signal strengths Qi' and Qi", to input the calculated phase-shifted amount to Φ1(k) of said first phase-shifted amount storing section; and said initial value storing section stores initial values Φ1(0) through Φn(0) of said phase-shifted amount, respectively, and inputs the initial values Φ1(0) through Φn(0) of said phase-shifted amount to Φ1(k) through Φn(k) of said first phase-shifted amount storing section, respectively, when said phase-shifted amount control section is first operated.

6. An adaptive array antenna as set forth in claim 1, wherein said adaptive array antenna comprises:

a plurality of antenna elements;

a plurality of signal cut-off sections which pass or interrupt received signals, which are received by said antenna elements, in accordance with control signals inputted from the outside, respectively;

a plurality of phase shifting sections which control a phase of the received signals, which pass through said signal cut-off sections, in accordance with phase-shifted amounts which are set, respectively;

a combining section which combines the received signals which are phase-controlled by said plurality of phase shifting sections;

a signal strength detecting section which detects the strength of the received signal combined by said combining section; and a phase-shifted amount control section which calculates a phase-shifted amount on the basis of the strength of the received signal detected by said signal strength detecting section, and for setting the calculated phase-shifted amount in each of said plurality of phase-shifting sections, and said phase-shifted amount control section comprises;

a signal selecting section which selectively switches said plurality of signal cut-off sections so as to set two of said plurality of signal cut-off sections on a pass side and the rest of said plurality of signal cut-off sections on a cut-off side;

a phase-shifted amount operating section which calculates a phase-shifted amount, which minimizes a strength (P) of the received signal detected by the signal strength detecting section, on the basis of said strength (P) while two of said plurality of signal cut-off sections are set on said pass side and the rest of said plurality of signal cut-off sections are set on said cut-off side; and a phase-shifted amount setting section which sets the phase-shifted amount, which is calculated by said phase-shifted amount operating section, in one of said plurality of phase shifting sections, which is connected to said signal cut-off sections set on said pass side by said signal selecting section.

7. An adaptive array antenna as set forth in claim 1, wherein said adaptive array antenna comprises:

a plurality of antenna elements;

a plurality of signal cut-off sections which pass or interrupt received signals, which are received by said antenna elements, in accordance with control signals inputted from the outside, respectively;

a plurality of phase shifting sections which control a phase of the received signals, which pass through said signal cut-off sections, in accordance with phase-shifted amounts which are set, respectively;

a combining section which combines the received signals which are phase-controlled by said plurality of phase shifting sections;

a signal strength detecting section which detects the strength of the received signal combined by said combining section; and a phase-shifted amount control section which calculates a phase-shifted amount on the basis of the strength of the received signal detected by said signal strength detecting section, and for setting the calculated phase-shifted amount in each of said plurality of phase-shifting sections, and said phase-shifted amount control section comprises;

a first signal strength storing section which stores a first strength (P1) of a received signal detected by said signal strength detecting section while desired waves and interference waves exist;

a second signal strength storing section which stores a second strength (P2) of a received signal detected by said signal strength detecting section which interference waves exist;

a signal selecting section which sets two of said plurality of signal cut-off sections on a pass side and the rest of said plurality of signal cut-off sections on a cut-off side;

a phase-shifted amount operating section which calculates a phase-shifted amount, which minimizes a difference (P1–P2) between said first strength (P1) and second strengths (P2), on the basis of said first strength (P1) and second strengths (P2) while two of said plurality of signal cut-off sections are set on said pass side and the rest of said plurality of signal cut-off sections is set on said cut-off side; and a phase-shifted amount setting section which sets the phase-shifted amount, which is calculated by said phase-shifted amount operating section, in one of said plurality of phase shifting sections, which is connected to said signal cut-off sections set on said pass side by said signal selecting section.

8. An adaptive array antenna as set forth in claim 1, wherein said adaptive array antenna comprises:

a distributing section which distributes transmitted signals;

a plurality of phase shifting sections which control a phase of the transmitted signals, which are distributed by said distributing section, in accordance with phase-shifted amounts, which are set, respectively;

a plurality of signal cut-off sections which pass or interrupt the transmitted signals, which are phase-controlled by said plurality of phase shifting sections, to circuits in the subsequent stage in accordance with control signals inputted from the outside;

antenna elements which transmit the transmitted signals passing through said plurality of signal cut-off sections;

a phase-shifted amount control section which calculates a phase-shifted amount on the basis of input information and which sets the calculated phase-shifted amount in each of said phase shifting sections; and a signal strength detecting section which detects the signal strength of the signals received in a foreign station communicating with a self-station, on the basis of the notice from said foreign station, and said phase-shifted amount control section comprises;

a signal selecting section which sets two of said plurality of signal cut-off sections on a pass side and the rest of said plurality of signal cut-off sections on a cut-off side;

a phase-shifted amount operating section which calculates a phase-shifted amount, which minimizes a strength (P) of the received signal detected by said signal strength detecting section, on the basis of said strength (P) while two of said plurality of signal cut-off sections are set on said pass side and the rest of said plurality of signal cut-off sections are set on said cut-off side; and a phase-shifted amount setting section which sets the phase-shifted amount, which is calculated by said phase-shifted amount operating section, in one of said plurality of phase shifting sections, which is connected to said signal cut-off sections set on said pass side by said signal selecting section.

9. An adaptive array antenna as set forth in claim 1, wherein said adaptive array antenna comprises:

a distributing section which distributes transmitted signals;

a plurality of phase shifting sections which control a phase of the transmitted signals, which are distributed by said distributing section, in accordance with phase-shifted amounts, which are set, respectively;

a plurality of signal cut-off sections which pass or interrupt the transmitted signals, which are phase-controlled by said plurality of phase shifting sections to circuits in the subsequent stage in accordance with control signals inputted from the outside;

antenna elements which transmit the transmitted signals passing through said plurality of signal cut-off sections;

a phase-shifted amount control section which calculates a phase-shifted amount on the basis of input information and for setting the calculated phase-shifted amount in each of said phase shifting sections; and a signal strength detecting section which detects the signal strength of the signals received in a foreign station communicating with a self-station, on the basis of the notice from said foreign station, and said phase-shifted amount control section comprises;

a first signal strength storing section which stores a first strength (P1) of a received signal detected by said signal strength detecting section while signals are transmitted from said antenna elements;

a second signal strength storing section which stores a second strength (P2) of a received signal detected by said signal strength detecting section which no signals are transmitted from said antenna elements;

a signal selecting section which sets two of said plurality of signal cut-off sections on a pass side and the rest of said plurality of signal cut-off sections on a cut-off side;

a phase-shifted amount operating section which calculates a phase-shifted amount, which minimizes a difference (P1–P2) between said first strength (P1) and second strengths (P2), on the basis of said first strength (P1) and second strengths (P2) while two of said plurality of signal cut-off sections are set on said pass side and the rest of said plurality of signal cut-off sections is set on said cut-off side; and a phase-shifted amount setting section which sets the phase-shifted amount, which is calculated by said phase-shifted amount operating section, in one of said plurality of phase shifting sections, which is connected to said signal cut-off sections set on said pass side by said signal selecting section.

10. An adaptive array antenna as set forth in claim 1, wherein said adaptive array antenna comprises:

a plurality of antenna elements;

a plurality of real number weighting sections which weight received signals, which are received by said plurality of antenna elements, by real number weights which are set, respectively;

a plurality of individual element signal strength detecting sections which detect the strength of each of the received signals, which are weighted by said plurality of real number weighting sections, as an individual element signal strength;

a combining section which combines the received signals weighted by said plurality of real number weighting sections;

a signal strength detecting section which detects the strength of the received signal, which is combined by said combining section, as a combined signal strength; and a plurality of real number weight control sections which calculate a real number weight on the basis of the variation in said combined signal strength and said plurality of individual element signal strengths when the sign of the real number weight set in at least one of said plurality of weighting sections is changed, and for repeating a processing for setting the calculated real number weight in each of said plurality of real number weighting sections by a plurality of cycles.

11. An adaptive array antenna as set forth in claim 10, wherein said real number weight control section comprises:

a plurality of initial value storing sections which store initial values W__1(O) through W__n(O) (n is the number of antenna elements) which are set in said plurality of real number weighting sections;

a plurality of real number weight storing sections which store said W__1(O) through W__n(O) as real number weights W__1(k) through W__n(k) (k is the number of real number weight updating operations), which are to be set in each of said plurality of real number weighting sections, when said real number weight control section is first operated;

a plurality of real number weight setting sections which set any one of W__i(k) and −W__i(k) ($1 \leqq i \leqq n$) as a real number weight of each of said plurality of real number weighting sections on the basis of W__1(k) through W__n(k) stored in said plurality of real number weight storing sections; and real number weight operating sections which calculate new real number weights W__i(k+1)=W__i(k)+a*[Px__i(k)+{Py(k)−Py__i(k)}/4]W__i(k) (a is a constant, and $1 \leqq i \leqq n$) to input the calculated new real number weights to W__1(k) through W__n(k) of said plurality of real number weight storing sections, respectively, when the combined signal strengths Py(k) detected by said combined signal strength detecting section while W__1(k) through W__n(k) are set in said plurality of real number weighting sections, respectively, are inputted, respectively, and when the individual element signal strengths Px__1(k) through Px__n(k) detected by said plurality of individual element signal strength detecting sections, respectively, while W__1(k) through W__n(k) are set by said plurality of real number weighting sections, respectively, are inputted, respectively, and when the combined signal strengths Py__i(k) ($1 \leqq i \leqq n$) detected by said combined signal strength detecting section, respectively, while W__1(k), W__2(k), . . . , W__i−1(k), −W__i(k), W__i+1(k), . . . , W__n(k) ($1 \leqq i \leqq n$) are set in said plurality of real number weighting sections, respectively, are inputted, respectively.

12. An adaptive array antenna as set forth in claim 10, wherein said real number weight control section further comprises an update stopping section which stops the operation of said real number weight control section, on the basis of a predetermined condition.

13. An adaptive array antenna as set forth in claim 12, wherein said update stopping section stops the operation of said real number weight control section after repeating the operation of said real number weight control section predetermined times.

14. An adaptive array antenna as set forth in claim 12, wherein said update stopping section stops the operation of said real number weight control section when a falling amount of a real number weight set in said real number weighting section is a predetermined value or less.

15. An adaptive array antenna as set forth in claim 10, wherein each of said plurality of antenna elements comprises a directional antenna.

16. An adaptive array antenna as set forth in claim 10, wherein each of said plurality of antenna elements comprises an array antenna.

17. An adaptive array antenna comprising:

a plurality of element antennas;

a plurality of high-frequency circuits, each of which is connected to a corresponding one of said element antennas; and a local signal phase-shifting circuit for varying the phase of a local signal, which is added to a frequency converting circuit in said high-frequency circuit, every one of said high-frequency circuits for each of said element antennas, wherein each of said plurality of high-frequency circuits has a coupler which branches a part of signals from each of said element antennas, and an orthogonal demodulator for an individual element antenna, to which signals are inputted from said coupler.

18. An adaptive array antenna as set forth in claim 17, wherein said local signal phase circuit has an orthogonal modulator which inputs a local frequency signal and a control signal, as at least a part thereof.

19. An adaptive array antenna as set forth in claim 18, which further comprises:

a phase/amplitude comparator circuit for inputting a demodulated signal from said orthogonal demodulator for the individual element antenna, and for comparing the phase and amplitude of each of the input signals to each other to detect a difference therebetween;

a phase deviation compensating control section which controls an output signal of a phase control signal output circuit so as to compensate a phase deviation due to the detected difference, differences in extending length of an antenna feeding line and another wiring length, and a difference in a pagging phage characteristic of a component provided in the subsequent stage of said coupler which branches a part of signals from each of said antenna elements, on the basis of the compared result of said phase/amplitude comparator circuit; and a phase shift control signal output circuit which outputs a control signal to said orthogonal modulator of said local signal phase shifter circuit on the basis of at least the output of said phase deviation compensating control section.

20. An adaptive array antenna comprising:

a plurality of antenna elements;

a plurality of high-frequency circuits, each of which is connected to a corresponding one of said antenna elements;

a high-frequency combining circuit for combining the outputs of said plurality of high-frequency circuits;

at least one first RSSI circuit which monitors at least one signal level of RF and IF signals from a plurality of individual antenna elements;

a second RSSI circuit which monitors the signal level of said RF or IF signal after combining signals from said individual antenna elements;

(N−1) first variable gain circuits which allow the variation in relative levels of all of RF or IF signals of each of individual elements;

a second variable gain circuit which varies the signal level of the RF or IF signal after combining signals from said individual elements; and a gain control circuit which controls the output signal level after synthesis to be within a predetermined range on the basis of RSSI signals from said first RSSI circuit and second RSSI circuit, and which controls said first variable gain circuit and said second variable gain circuit so as to prevent a high-frequency circuit element for each of said individual elements from being saturated.

21. An adaptive array antenna as set forth in claim 20, which further comprises:

a storing section which stores a predetermined number of past output values of said RSSI circuits; and a gain changing section which outputs a gain change order to said first variable gain circuit or said second variable gain circuit only when a difference between an input value and a predetermined number of output values stored in said storing section exceeds a certain predetermined value.

22. An adaptive array antenna comprising:

a plurality of antenna elements;

a plurality of high-frequency circuits, each of which is connected to a corresponding one of said antenna elements;

a high-frequency distributing circuit which distributes outputs to the plurality of high-frequency circuits;

an amplitude weighting circuit which weights the amplitude of each of said antenna elements in the high-frequency circuit;

(N−1) first variable gain circuit which allows the variation in the relative levels of all of RF or IF signals of each of individual antenna elements;

a second variable gain circuit which varies the signal level of an RF or IF signal before distribution to said individual antenna elements; and a gain control circuit which controls said (N−1) first variable gain circuit and said second variable gain circuit so that the effective radiation power taking account of the directional gain from said adaptive array antenna, which is presumed on the basis of the output of said amplitude weighting circuit, does not exceed a predetermined value, and which controls said first and second variable gain circuits so that each of said high-frequency circuits of each of said individual antenna elements is not saturated.

* * * * *